Jan. 21, 1964     E. E. HOELLEN     3,118,549

STORAGE CONVEYOR SYSTEM

Filed Aug. 30, 1960     18 Sheets-Sheet 2

Jan. 21, 1964  E. E. HOELLEN  3,118,549
STORAGE CONVEYOR SYSTEM
Filed Aug. 30, 1960  18 Sheets-Sheet 12

Fig. 16

Jan. 21, 1964  E. E. HOELLEN  3,118,549
STORAGE CONVEYOR SYSTEM
Filed Aug. 30, 1960  18 Sheets—Sheet 18

Inventor
Carl E. Hoellen
By Wm. A. Autio
Attorney

United States Patent Office 3,118,549
Patented Jan. 21, 1964

3,118,549
STORAGE CONVEYOR SYSTEM
Earl E. Hoellen, Hales Corners, Wis., assignor to Cutler-Hammer, Inc., Milwaukee, Wis., a corporation of Delaware
Filed Aug. 30, 1960, Ser. No. 52,846
16 Claims. (Cl. 214—16)

This invention relates to storage conveyor systems and more particularly to systems for selectively controlling storage of a multiplicity of articles on a plurality of storage conveyors and for controlling withdrawal of articles from selected storage conveyors in a desired order.

While not limited thereto, the invention is especially applicable to conveyor systems for controlling the storage of automobile bodies or the like awaiting conveyance thereof into a production line.

An object of the invention is to provide an improved conveyor system.

Another object of the invention is to provide an improved storage conveyor control system for controlling the storage of articles of diverse types on a plurality of storage conveyors such that each storage conveyor will store articles of only one type which articles are received in succession in mixed order from an incoming conveyor and for controlling withdrawal of articles from selected storage conveyors onto an outgoing conveyor in a sequence such that the articles are arranged in succession on the outgoing conveyor in the selected order and are thereby conveyed to an assembly line whereby the storage conveyors provide a collection area affording a supply of a given type or types of articles to maintain operation of the assembly line during times when other types of articles cannot be utilized therein.

A more specific object of the invention is to provide an improved conveyor control system for controlling selective storage of articles on a plurality of storage conveyors.

Another specific object of the invention is to provide an improved conveyor control system for controlling selective storage of articles on and selective withdrawal of articles from a plurality of storage conveyors.

Another specific object of the invention is to provide an improved conveyor control system for controlling selective storage of articles on a plurality of storage conveyors in any desired distribution which articles are received in sequence from an incoming conveyor.

Another object of the invention is to provide an improved conveyor control system for controlling selective storage of random articles on and selective withdrawal of articles from a plurality of storage conveyors onto an outgoing conveyor in a sequence such that the articles are arranged in succession on the outgoing conveyor in accordance with the selection.

A further object of the invention is to provide an improved conveyor system for controlling storage of articles on a plurality of storage conveyors and for controlling withdrawal of an article from each of said plurality of storage conveyors concurrently onto an outgoing conveyor.

A related object of the invention is to provide in such control system selectable automatic and manual control means for controlling the aforementioned functions.

In accordance with the invention, there is provided an incoming conveyor for conveying articles in succession toward a storage area, an accumulator conveyor for accumulating a predetermined number of articles from the incoming conveyor awaiting storage, an entry shuttle conveyor having access from the accumulator conveyor and operable to travel past the entry ends of a plurality of storage conveyors for conveying articles to the latter in a selected order, an exit shuttle conveyor operable to travel past the exit ends of the storage conveyors for receiving articles from the latter, an outgoing conveyor having access from the exit shuttle conveyor for conveying withdrawn articles to an assembly line, and appropriate transfer rams or transfer conveyors for effecting transfer of the articles between the aforementioned conveyors. A control system is provided for controlling admission to and withdrawal of articles from the storage conveyors, such control system being under the control of a plurality of entry and exit control pushbutton and limit switches. Such control system is operable to control the aforementioned conveyors or transfer rams and is also operable to control a plurality of article stops at various points in the conveyor system to control the movement of the articles. Also, such control system is transferable between automatic and manual control to afford flexibility in its operation.

The aforementioned and other objects and advantages of the invention and the manner of obtaining them will best be understood by reference to the following detailed description of an exemplary embodiment of a storage conveyor system and control system therefor taken in conjunction with the accompanying drawings, wherein.

Figure 1:
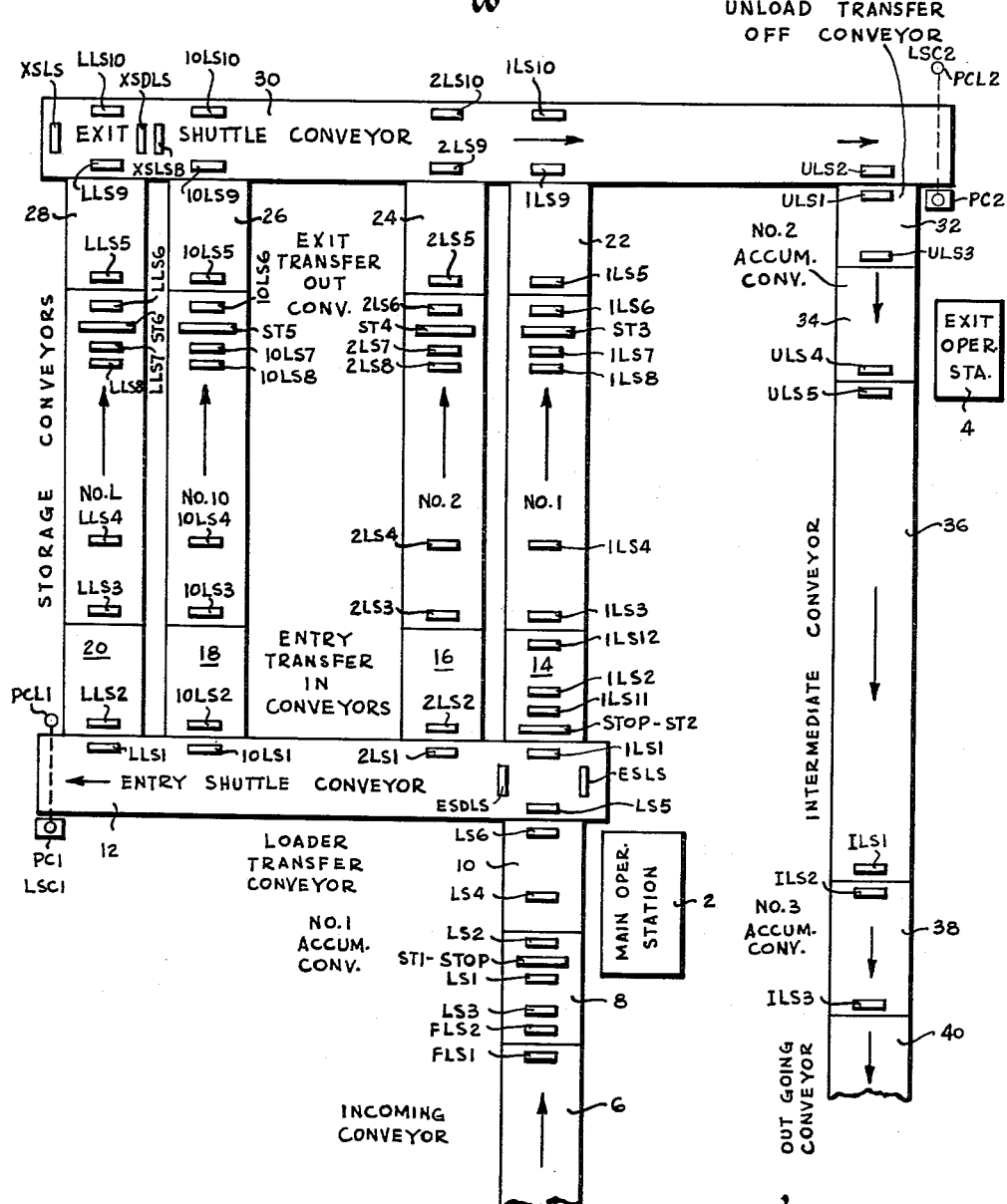
FIGURE 1 is a schematic illustration of a conveyor system layout constructed in accordance with the invention.
Figure 3:
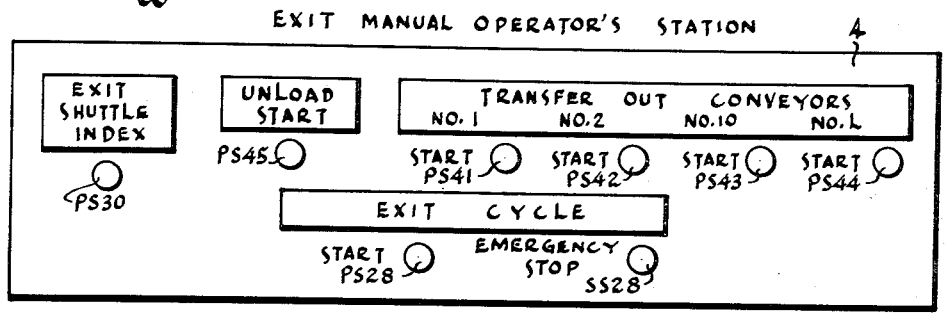

FIG. 3 is an illustration of an exit manual operator's station and control devices thereon; and FIGS. 4 through 19 diagrammatically show the control circuits for controlling the conveyor system of FIG. 1; FIGS. 4 through 13 showing various conveyor motor control circuits and the circuits for controlling the entry or storage cycle while FIGS. 13 through 19 show the circuits for controlling the exit cycle, that is, the withdrawal of articles from storage.

Referring to FIG. 1, there is shown a storage conveyor system layout having a main operator's station provided with a control panel 2 for controlling entry or storage of articles and exit or withdrawal of articles and an exit operator's station having a control panel 4 for controlling exit or withdrawal of articles from storage under manual controls.

The conveyor system comprises an incoming conveyor 6 for conveying articles toward the storage area. Incoming conveyor 6 has direct access to a No. 1 accumulator conveyor 8 whereon a predetermined number of articles are accumulated and temporarily stored awaiting movement thereof to the storage conveyors. Accumulator conveyor 8 in turn has direct access to a ram type loader transfer conveyor 10 for successively transferring articles from accumulator conveyor 8 onto an entry shuttle conveyor 12. A plurality of storage conveyors Nos. 1, 2, 10 and L are equally spaced along shuttle conveyor 12 and arranged transversely relative to the latter and a corresponding plurality of entry transfer-in conveyors 14, 16, 18 and 20 are arranged between shuttle conveyor 12 and the respective storage conveyors for transferring articles from the shuttle conveyor onto the respective storage conveyors. While four storage conveyors have been shown for ease of illustration, it will be apparent that any desired number thereof can be provided, L being indicative of the total number of and the last storage conveyor.

A plurality of ram type exit transfer-out conveyors 22, 24, 26 and 28 are provided between the exit ends of the respective storage conveyors Nos. 1, 2, 10 and L and an exit shuttle conveyor 30, these transfer-out conveyors being equally spaced along and having access to the exit shuttle conveyor. The latter has direct access to an unload transfer-off conveyor 32 for transferring articles from exit shuttle conveyor 30 onto a No. 2 accumulator conveyor 34. Accumulator conveyor 34 is provided for transferring articles from unload transfer-off conveyor 32 to intermediate conveyor 36 which conveys the articles away from the storage area. At the exit end of intermediate conveyor 36, there is provided another No. 3 accumulator conveyor 38 which functions to gather the articles, that is, to eliminate any gaps therebetween before such articles enter upon an outgoing conveyor 40.

All of the conveyors shown in FIG. 1 are adapted for supporting and moving therealong four-wheeled trucks which support the articles being conveyed such as auto bodies or the like. Incoming conveyor 6, No. 1 accumulator conveyor 8, loader transfer conveyor 10, entry transfer in conveyors 14, 16, 18 and 20, storage conveyors Nos. 1, 2, 10 and L and exit transfer out conveyors 22, 24, 26 and 28 move the article-supporting trucks in the forward direction. Entry shuttle conveyor 12 moves the trucks sideways in the left-hand direction and exit shuttle conveyor 30 moves the trucks sideways in the right-hand direction in FIG. 1. Unload transfer off conveyor 32, No. 2 accumulator conveyor 34, intermediate conveyor 36, No. 3 accumulator conveyor 38 and outgoing conveyor 40 moves the trucks in the reverse direction. Therefore, if the articles are positioned on the trucks on the incoming conveyor in the reverse direction, they will come out on the outgoing conveyor in the forward direction, the conveyor system effecting turning of the trucks 180 degrees.

Incoming conveyor 6, entry transfer in conveyors 14, 16, 18 and 20, unload transfer off conveyor 32, intermediate conveyor 36 and outgoing conveyor 40 are preferably of similar type. In accordance with the detailed description of operation of the conveyor control system hereinafter appearing, each of these conveyors is disclosed as being of a type which positively moves the truck when the conveyor is running and stops moving the truck when the conveyor is stopped. While conveyors for doing this may take various forms, for exemplary purposes, each of these conveyors is preferably provided with a roadway comprising a pair of spaced, parallel tracks along which the trucks may be rolled and a motor-driven device for pushing the trucks along the tracks. This device may be an endless chain moved by motor-driven sprockets and having one or more projections or dogs thereon. The dogs are mounted on the chains for engaging the undercarriage of the trucks, to push the same along the tracks. Incoming conveyor 6 may be provided with a plurality of dogs secured to the chain in spaced relation for pushing a series of trucks. Each entry transfer in conveyor is preferably provided with a single dog on its chain for moving one truck at a time. When an entry transfer in conveyor is started running as hereinafter described, the dog on the chain thereof hooks the front end of the truck and pulls the truck off the entry shuttle conveyor and pushes it onto the associated storage conveyor. Unload transfer off conveyor 32 is similarly provided with a single dog on the chain thereof so that when this conveyor is started running, such dog hooks the undercarriage at the rear end of the truck and pulls it off the extreme right-hand end of the exit shuttle conveyor and pushes it onto No. 2 accumulator conveyor 34. Intermediate conveyor 36 is like the incoming conveyor and is preferably provided with a plurality of dogs spaced apart on its chain. Each time a truck reaches the idle point hereinafter described adjacent the entry end of the intermediate conveyor, the next dog on the chain hooks this truck and pushes it along the intermediate conveyor. This conveyor 36 normally runs continuously except that it is stopped whenever No. 3 accumulator conveyor 38 is full as hereinafter described. Outgoing conveyor 40 is preferably like the incoming conveyor and the intermediate conveyor and is provided with a plurality of dogs on its chain, these dogs being spaced apart in accordance with the lengths of the trucks as desired. So long as No. 3 accumulator conveyor 38 is not empty, each successive dog on the outgoing conveyor pusher chain will hook a truck and move the trucks in equally spaced relation to the assembly line. As will be apparent, the purpose of the No. 3 accumulator conveyor is to maintain a constant supply of article trucks at the entry end of the out-going conveyor whereby to gather the articles and eliminate any spaces therebetween.

No. 1 accumulator conveyor 8, storage conveyors Nos. 1, 2, 10 and L, No. 2 accumulator conveyor 34 and No. 3 accumulator conveyor 38 are preferably of similar type except that conveyor 34 is not provided with an article stop and is additionally provided with an "idle" or inactive portion at the exit end thereof. In accordance with the detailed description of operation of the control system hereinafter appearing, each of these conveyors is disclosed as being of the type which runs continuously and conveys the trucks therealong. Since these conveyors with the exception of the No. 2 accumulator conveyor are each provided with an article stop hereinafter described, provision is made for permitting these conveyors to continue running after the article is stationary against the stop. While conveyors for doing this may take various forms, for exemplary purposes, each of these conveyors is provided with a pair of spaced apart, motor driven chain-type conveyor belts. The respective pairs of side wheels of the trucks are supported by the belts of such pair thereof and the moving belts convey the truck along each such conveyor. When the truck engages the stop on those conveyors having such stop, the belts continue to move and turn the truck wheels but the truck remains stationary against the stop. No. 2 accumulator conveyor 34 similarly conveys a truck therealong to the "idle" portion thereof immediately adjacent the entry end of the intermediate conveyor. This idle roll portion or transfer portion permits free entry of a truck conveyed thereto by the accumulator conveyor belts but does not move the truck therefrom. Thus, each truck will idle or rest on this portion of the conveyor whenever the intermediate conveyor is stopped and until it is pulled therefrom by a dog on the intermediate conveyor chain when the intermediate conveyor is restarted.

Loader transfer conveyor 10 and exit transfer out conveyors 22, 24, 26 and 28 are preferably of similar type. In accordance with the description of operation of the control system hereinafter appearing, each of these conveyors is disclosed as being of a type which positively pushes a truck arriving thereon all the way onto the associated shuttle conveyor. While conveyors for doing this may take various forms, for exemplary purposes, each of these conveyors is preferably provided with a pair of spaced apart and parallel roadway tracks on which the truck rolls and a ram or the like for pushing the truck therealong and off and beyond the exit end thereof onto the associated entry or exit shuttle conveyor.

Entry shuttle conveyor 12 and exit shuttle conveyor 30 are preferably of similar type and are adapted for supporting and conveying the article supporting trucks sideways, that is, in the left-hand direction and in the right-hand direction, respectively, according to FIG. 1. These shuttle conveyors must also be capable of having trucks rolled thereon when pushed by the loader transfer ram and the exit transfer out rams, respectively. While conveyors for this purpose may take various forms, for exemplary purposes, each shuttle conveyor is preferably a slat-type conveyor having a series of slats or flats pivotally connected to one another in series in an endless chain. In this manner, the slats provide a flat surface onto which a truck can be rolled and the conveyor is sectionalized so that it can move around the turns at each end when driven by an electric motor.

All of the aforementioned conveyors are of known types and the details thereof have not been shown to avoid complicating the drawings. While only four storage conveyors have been shown in FIG. 1, any desired number of additional storage conveyors could similarly be arranged between storage conveyors Nos. 2 and 10.

The conveyors of FIG. 1 are also provided with a plurality of limit switches for controlling operation of the system. These limit switches are mounted on the conveyors in the positions shown in FIG. 1 so as to be operated in their proper order. Certain of these limit switches are operated by a portion of the undercarriage of the article supporting trucks as the latter pass thereover and others of these limit switches are operated by the conveyor operating mechanisms. These limit switches and the manner of operating the same will be more fully described in connection with the description of the control system shown in FIGS. 4 through 19.

No. 1 accumulator conveyor 8 is provided with a truck stop ST1 at its exit end. This stop is a member such as a bar or the like which is raised to engage a truck to stop the latter and which is lowered to disengage the truck to permit the latter to move forward. Stop ST1 is operated by compressed air between its raised and lowered positions under the control of a solenoid operated valve. Entry transfer in conveyor 14 is provided with a similar stop ST2 at its entry end normally to prevent entry of those article supporting trucks thereon which are assigned to storage conveyors Nos. 2, 10 and L. When an article supporting truck is assigned to storage conveyor No. 1, stop ST2 is lowered to permit such truck to pass thereover. Storage conveyors Nos. 1, 2, 10 and L are provided with similar stops ST3, ST4, ST5 and ST6, respectively, at their exit ends. The aforementioned stops are of known construction and the details thereof have not been shown to avoid complicating the drawings.

Entry shuttle conveyor 12 is provided at its left-hand end with a limit stop control device LSC1 and exit shuttle conveyor 30 is provided at its right-hand end with a limit stop control device LSC2 for stopping the respective shuttle conveyors if they should travel beyond their stopping positions. Limit stop control LSC1 is provided with a light source PCL1 and a photocell PC1 and limit stop control device LSC2 is provided with a light source PCL2 and a photocell PC2 for detecting an overshoot condition of the respective shuttle conveyors as more fully hereinafter described.

Figure 2:
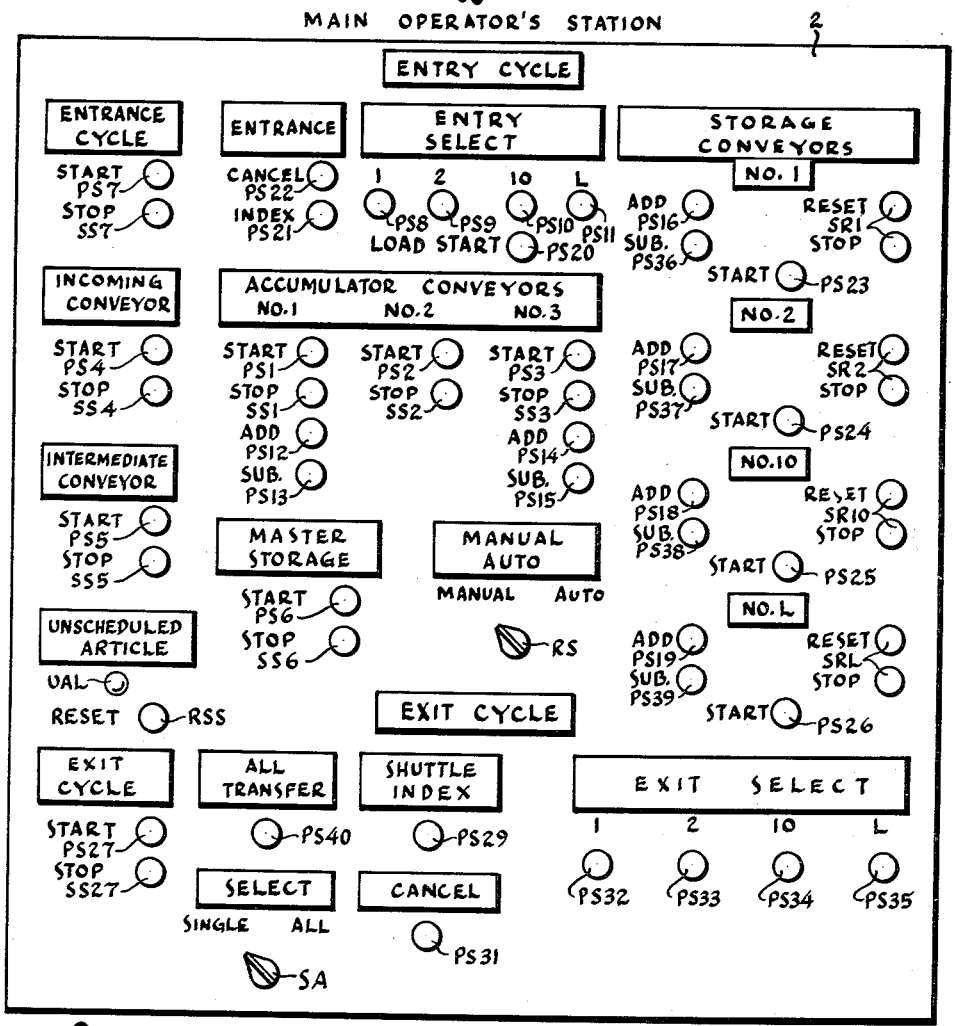
FIG. 2 is an illustration of a main operator's station and control devices thereon.

Referring to FIGS. 2 and 3, there are shown a main operator's station control panel 2 and an exit manual operator's station control panel 4 which are also shown schematically in FIG. 1. These control panels have mounted thereon a plurality of pushbutton and selector devices which are manually controllable by the main and exit operators for causing the system to perform the various control functions hereinafter described.

Control panel 2 is provided with a start switch PS1 and stop switch SS1 for controlling accumulator conveyor 8 identified also as No. 1, a start switch PS2 and a stop switch SS2 for controlling accumulator conveyor 34 identified also as No. 2 and a start switch PS3 and a stop switch SS3 for controlling accumulator conveyor 38 identified also as No. 3. A start switch PS4 and a stop switch SS4 are provided for controlling incoming conveyor 6. A start switch PS5 and a stop switch SS5 are provided for controlling intermediate conveyor 36. A start switch PS6 and a stop switch SS6 are provided for controlling the storage conveyors Nos. 1, 2, 10 and L in unison. A start switch PS7 and a stop switch SS7 are provided for controlling the entrance cycle, that is, for conditioning the system so that storage of articles on the storage conveyors can be initiated. A plurality of select switches PS8, PS9, PS10 and PS11 are provided for assigning articles to storage conveyors Nos. 1, 2, 10 and L, respectively. An add switch PS12 and a subtract switch PS13 are provided for manually operating or positioning the counter of accumulator conveyor No. 1. An add switch PS14 and a subtract switch PS15 are provided for manually operating or positioning the counter of accumulator conveyor No. 3. Add switches PS16, PS17; PS18 and PS19 are provided for manually operating or positioning the counters of storage conveyors Nos. 1, 2, 10 and L, respectively. A load start switch PS20 is provided for starting the storage of an article after a selection is made under manual control. An entry index switch PS21 is provided for manually controlling movement of entry shuttle conveyor 12. An entry cancel switch PS22 is provided for canceling the storage of an article after it has been initiated. A No. 1 start switch PS23, a No. 2 start switch PS24, a No. 10 start switch PS25 and a No. L start switch PS26 are provided for manually controlling starting of entry transfer in conveyors 14, 16, 18 and 20, respectively. A selective manual-auto rotary switch RS is provided for transferring the system between manual and automatic operation. A plurality of two-button stop-reset switches SR1, SR2, SR10 and SRL are provided for selectively controlling stopping and starting of the respective storage conveyors Nos. 1, 2, 10 and L, respectively.

At the lower portion of control panel 2 there are provided a plurality of control devices for controlling the exit cycle portion of the system, that is for controlling withdrawal of articles from the storage conveyors. An exit cycle start switch PS27 and an exit cycle stop switch SS27 are provided for controlling the exit cycle, that is, for conditioning the system so that withdrawal of articles from the storage conveyors can be selectively initiated. Another start switch PS28 and another stop switch SS28 are provided on exit manual operator's station control panel 4 in FIG. 3 for performing the same functions under manual control as switches PS27 and SS27 are capable of performing under automatic control. A single-all selective rotary switch SA is provided at the lower portion of panel 2 for transferring the system from a condition wherein an article can be withdrawn from a single storage conveyor at a time to a condition wherein one article can be withdrawn from all the storage conveyors at once. Switches PS29 and PS30 are provided on panels 2 and 4, respectively, for manually controlling indexing or movement of exit shuttle conveyor 30 from the two locations. A cancel switch PS31 is provided on panel 2 for controlling cancellation after an exit selection has been made. Exit select switches PS32, PS33, PS34 and PS35 are provided for making exit selections, that is, for initiating withdrawal of articles from storage conveyors Nos. 1, 2, 10 and L, respectively. Subtract switches PS36, PS37, PS38 and PS39 are provided for operating or positioning the counters of the respective storage conveyors. An all transfer switch PS40 is provided for controlling the transfer of articles from all the storage conveyors onto the exit shuttle conveyor. A No. 1 start switch PS41, a No. 2 start switch PS42, a No. 10 start switch PS43 and a No. L start switch PS44 are provided for manually controlling exit transfer-out conveyors 22, 24 26, and 28, respectively, and the release of articles from the respective storage conveyors. An unload start switch PS45 is provided for controlling unload transfer-off conveyor 32 manually whenever an article is at the exit end of exit shuttle conveyor 30. An unscheduled article indicator lamp UAL and reset switch RSS are provided on panel 2 for indicating an unscheduled article at storage conveyor No. L and for resetting the circuit. The circuit connections for the aforementioned pushbutton and selector switches are shown in FIGS. 4 through 19.

Figure 4:
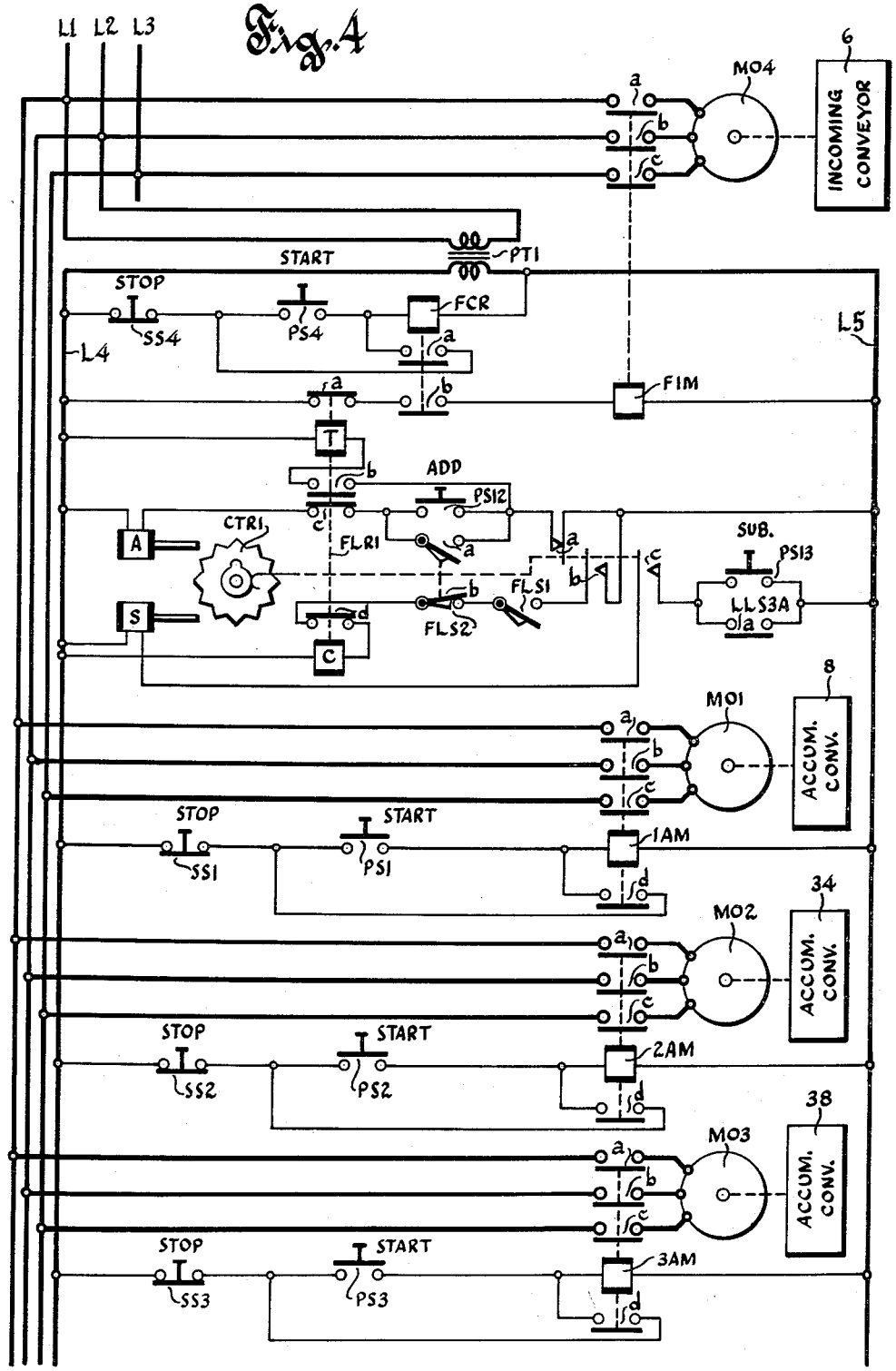
Figure 12:
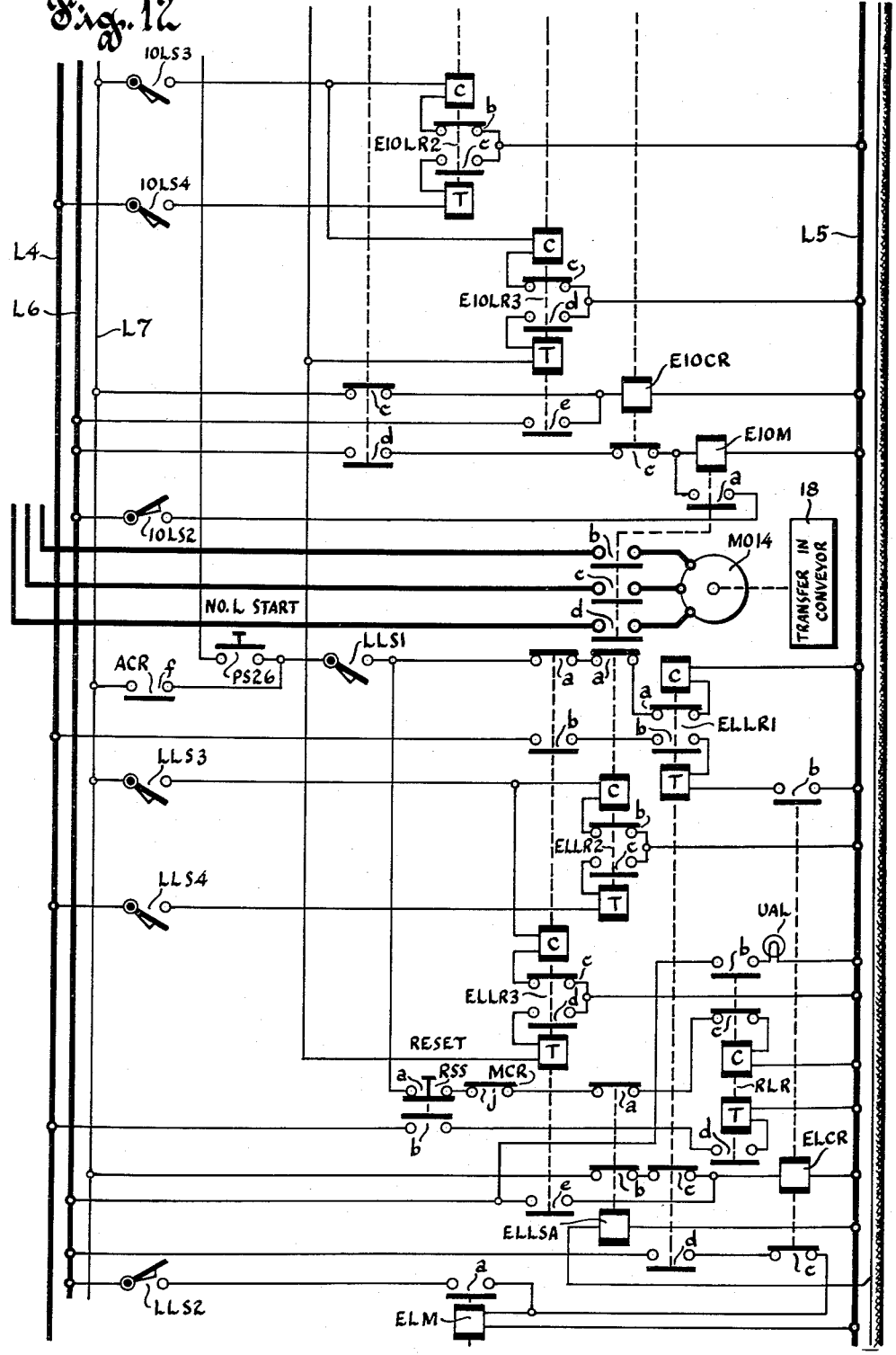
Figure 13:
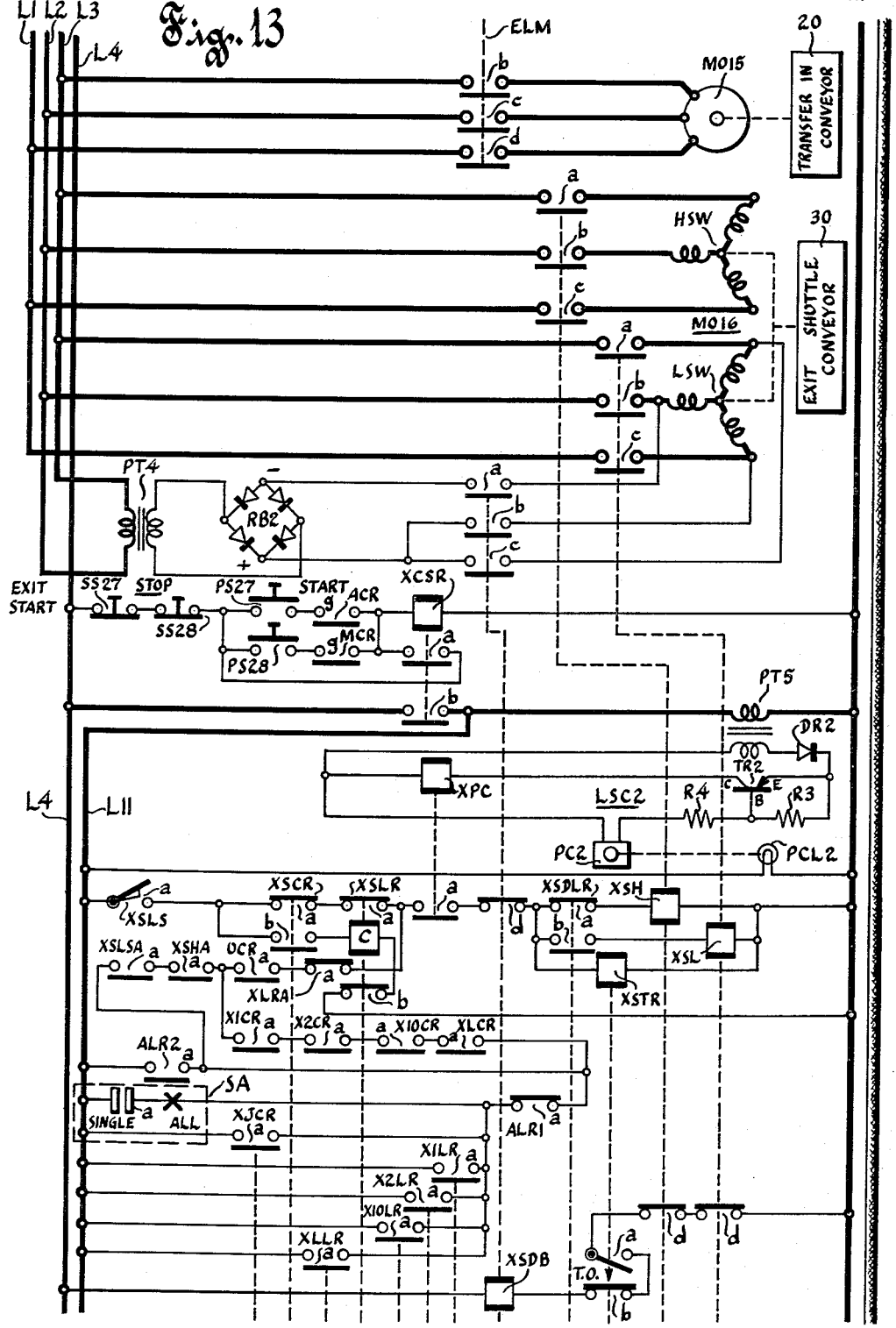

The control circuits for the storage conveyor system of FIG. 1 are shown in FIGS. 4 through 19. FIGS. 4 through 12 and the upper portion of FIG. 13 show the control circuits for the motors which drive the various portions of the conveyor system and the control circuits for the entry cycle while FIGS. 13 through 19 show the control circuits for the exit cycle. Power supply lines L1, L2 and L3 are connectable to the three-phase power supply source. Lines L1 and L2 are connected through a voltage reducing transformer PT1 to conductors L4 and L5. There are shown in FIG. 4, motors MO1, MO2 and MO3 for driving accumulator conveyors 8, 34 and 38, respectively. Motor MO1 is provided with a start switch PS1 and a stop switch SS1 for controlling a main power contactor 1AM whereby the motor is connected through power supply lines L1, L2 and L3 to a three-phase power supply source. In a similar manner, motor MO2 is provided with a start switch PS2 and a stop switch SS2 for controlling a main power contactor 2AM whereby the motor is connected to power supply lines L1, L2 and L3. Likewise, motor MO3 is provided with a start switch PS3 and a stop switch SS3 for controlling a main power contactor 3AM whereby the motor is connected to power supply lines L1, L2 and L3. A motor MO4 is provided for driving incoming conveyor 6. Motor MO4 is provided with a start switch PS4 and a stop switch SS4 for controlling an incoming conveyor control relay FCR which in turn controls a main power contactor F1M whereby the motor is connected to power supply lines L1, L2 and L3. An add-subtract counter CTR1 is provided for counting the articles entering and leaving accumulator conveyor 8. Counter CTR1 is provided with an add coil A for stepping the counter in the clockwise direction one step for each article entering accumulator conveyor 8 and a subtract coil S for stepping the counter in the counter-clockwise direction one step for each article leaving accumulator conveyor 8. Counter CTR1 is also provided with switches $a$, $b$ and $c$ for performing control functions hereinafter described. A control relay FLR1 having a closing coil C and a tripping coil T and a plurality of contacts is provided for stopping incoming conveyor 6 when a predetermined number of articles have been accumulated on accumulator conveyor 8 and for restarting the incoming conveyor when an article is released from the accumulator conveyor.

Figure 5:
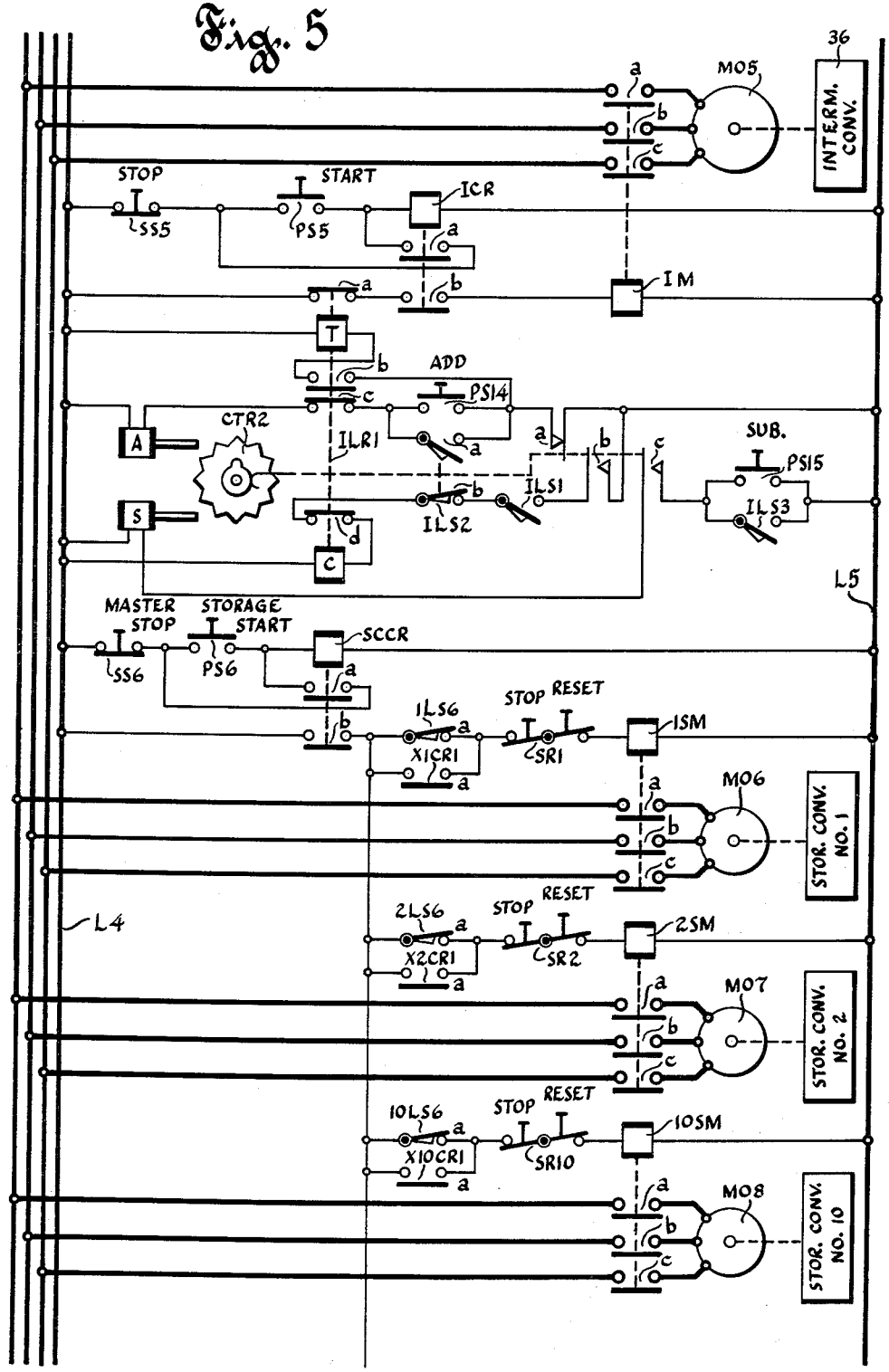
Figure 6:
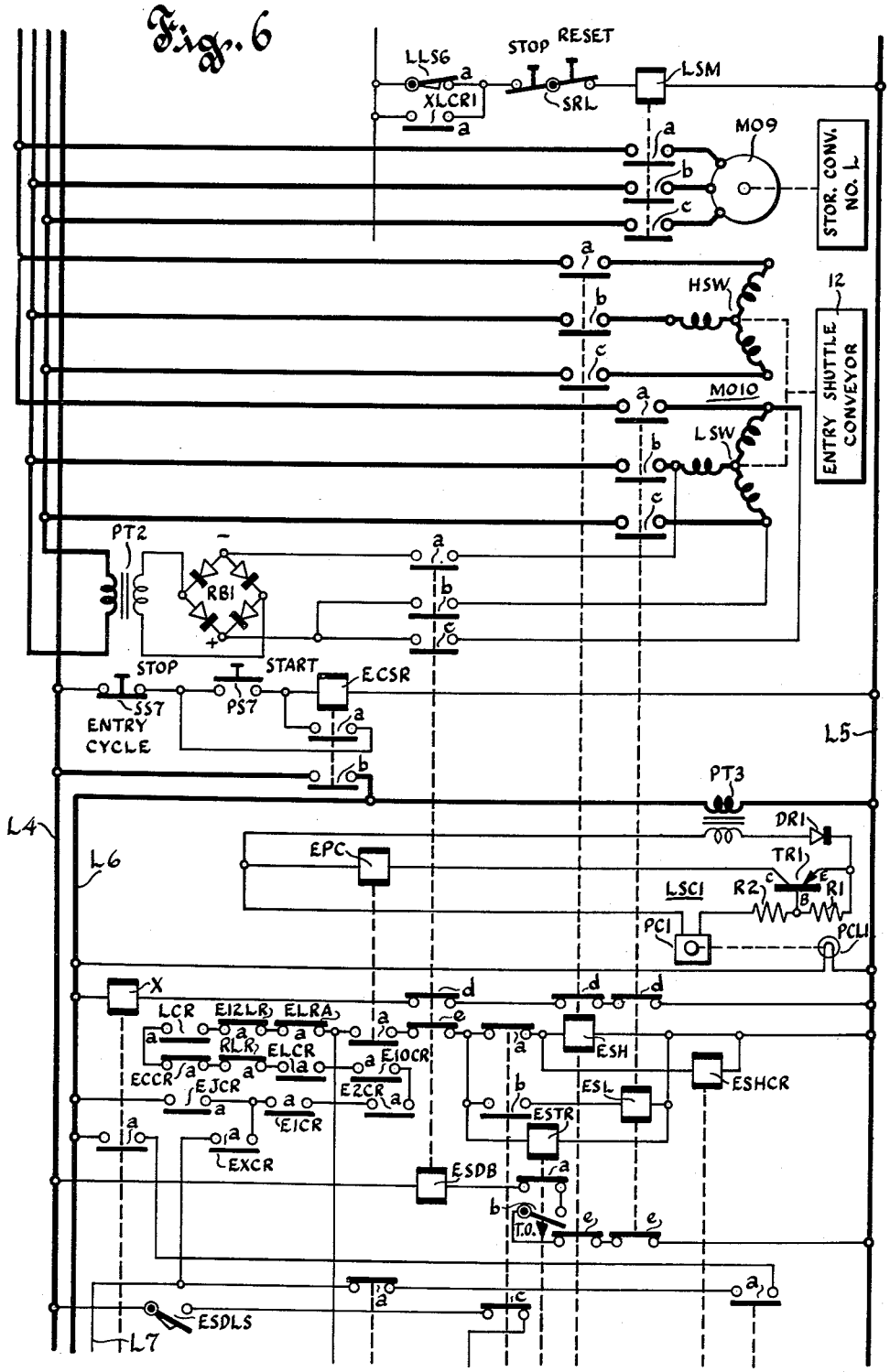

An electric motor MO5 shown in FIG. 5, is provided for driving intermediate conveyor 36. Motor MO5 is provided with a start switch PS5 and a stop switch SS5 for controlling an intermediate conveyor control relay 1CR which in turn controls main contactor IM whereby the motor is connected to power supply lines L1, L2 and L3. An add-subtract counter CTR2 is provided for counting the number of articles entering and leaving accumulator conveyor 38. Counter CTR2 is provided with an add coil A for stepping the counter in the clockwise direction one step for each article entering accumulator conveyor 38 and a subtract coil S for stepping the counter in the counterclockwise direction one step for each article leaving accumulator conveyor 38. Counter CTR2 is also provided with switches $a$, $b$ and $c$ for performing control functions hereinafter described. A control relay ILR1 having a closing coil C and a tripping coil T and a plurality of contacts is provided for stopping intermediate conveyor 36 when a predetermined number of articles have been accumulated on accumulator conveyor 38 and for restarting the intermediate conveyor when an article is removed from accumulator conveyor 38. Storage conveyors Nos. 1, 2, 10 and L are provided with driving motors MO6, MO7, MO8 and MO9, respectively. Motor MO6 is provided with a stop-reset switch SR1 for controlling its main power contactor 1SM whereby the motor is connected to power supply lines L1, L2 and L3. Similarly, motor MO7 is provided with a stop-reset switch SR2 for controlling its main power contactor 2SM whereby the motor is connected to power supply lines L1, L2 and L3. Similarly, motor MO8 is provided with a stop-reset switch SR10 for controlling its main power contactor 10SM whereby the motor is connected to power supply lines L1, L2 and L3. Likewise, motor MO9 in FIG. 6 is provided with a stop-reset switch SRL for controlling its main power contactor LSM whereby the motor is connected to power supply lines L1, L2 and L3. There are also provided a master start switch PS6 and a master stop switch SS6 in FIG. 5 for controlling the aforementioned storage conveyor motors in unison. A storage conveyor control relay SCCR under the control of the aforementioned master start and stop switches in FIG. 5 is provided for controlling the supply of power to main contactors 1SM, 2SM, 10SM and LSM.

Entry shuttle conveyor 12 in FIG. 6 is provided with a driving motor MO10 having a high speed winding HSW and a low speed winding LSW. A high speed main power contactor ESH is provided for connecting high speed winding HSW to the three-phase power supply lines and a low speed main power contactor ESL is provided for connecting low speed windings LSW to the power supply lines. Motor MO10 is also provided with a dynamic breaking circuit whereby power is connected from supply lines L2 and L3 to the primary winding of a transformer PT2, the secondary winding of which is connected to the input terminals of a rectifier bridge RB1. The positive and negative output terminals of bridge RB1 are connectable to low speed windings LSW under the control of an entry shuttle dynamic breaking contactor ESDB. An entry shuttle high speed control relay ESHCR and an entry shuttle timing relay ESTR and a control relay X are provided for performing control functions which will become apparent from the following description of operation. An entry shuttle low speed control relay ESDLR in FIG. 7 is provided for changing the shuttle drive from high speed to low speed.

An entry cycle start switch PS7 and an entry cycle stop switch SS7 are provided in FIG. 6 for starting the entry cycle, that is, for conditioning the system so that an article can be assigned to one of the storage conveyors. These switches control an entry cycle start relay ECSR for connecting power from conductor L4 to conductor L6 and for energizing a photoelectric type limit stop control device LSC1 through a voltage reducing transformer PT3. Device LSC1 comprises a unidirectional diode DR1 for supplying direct current thereto, a controllable semi-conductor device of the solid element type such as a transistor TR1 for controlling a relay EPC, a light source such as a lamp PCL1, a photocell PC1 and a pair of voltage control resistors R1 and R2 for controlling transistor TR1. There are also provided in FIG. 7 an entry shuttle limit switch controlled relay ESLSA and entry shuttle override control relays ESCR, ESLRA and ESLR, the latter being of the latching type having a closing coil C and a tripping coil T. A relay ESHA and a latching relay ELR are provided for controlling counters CTR3, CTR4, CTR5 and CTR6, in FIGS. 7 and 8. These counters count and maintain a registration of the number of articles on the respective storage conveyors. Each such counter is provided with an add coil A and a subtract coil S for stepping the counter in reverse directions. These counters are also provided with respective switches E1C, E2C, E10C and ELC for controlling the entry select circuits at the bottom of FIG. 7 and top of FIG. 8. These counters are further provided with respective switches X1C, X2C, X10C and XLC shown in FIGS. 14 and 15 for controlling the exit select circuits as hereinafter described. An entry memory device timing relay EHTR is provided in FIG. 7 for initiating the operation of an entry memory device EMD in FIG. 9, and for insuring that device EMD is set before the select relay is tripped. A manual-auto rotary switch RS is provided in FIG. 7 for controlling either an automatic control relay ACR or a manual control relay MCR.

Figure 7:
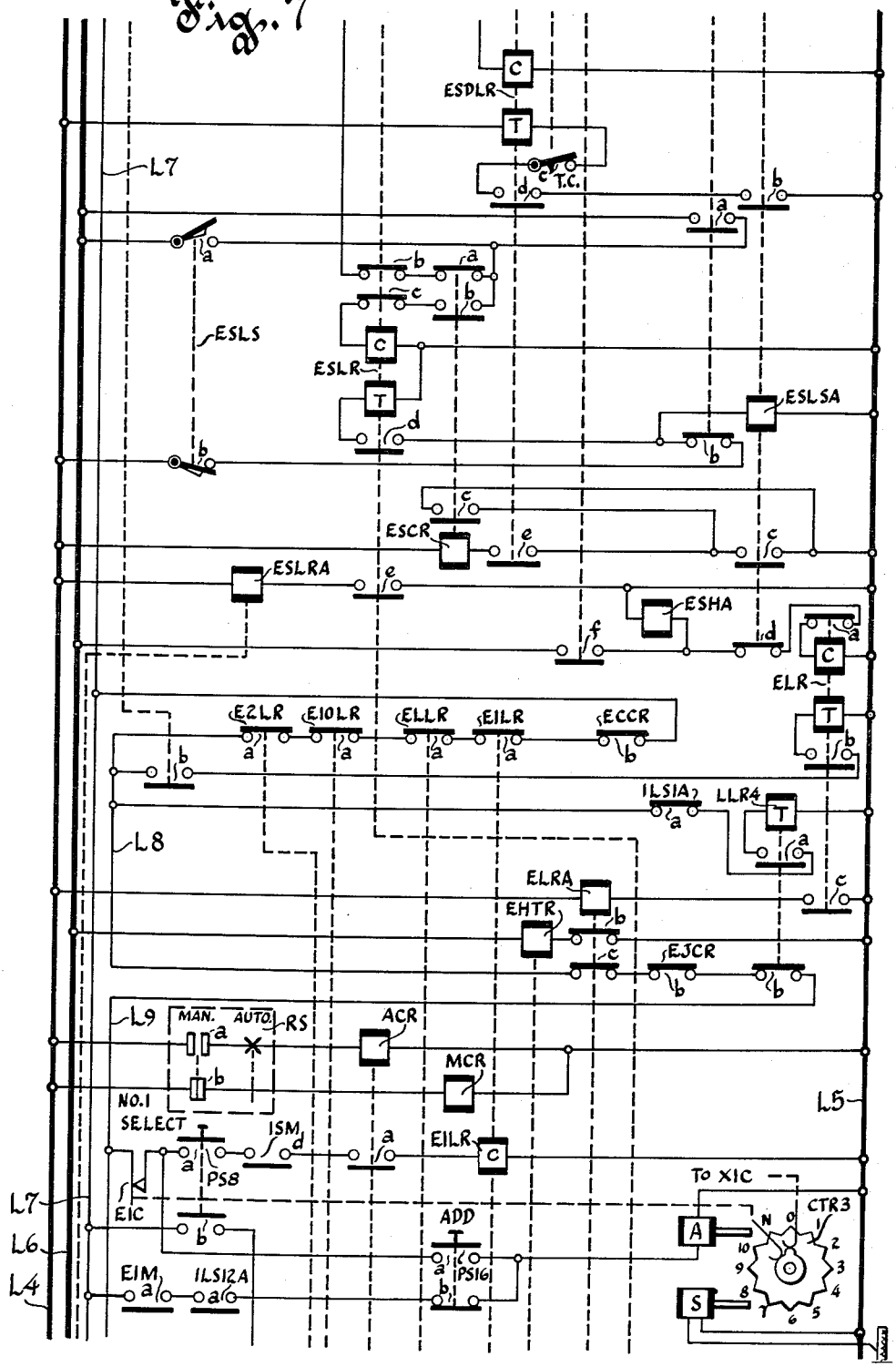
Figure 8:
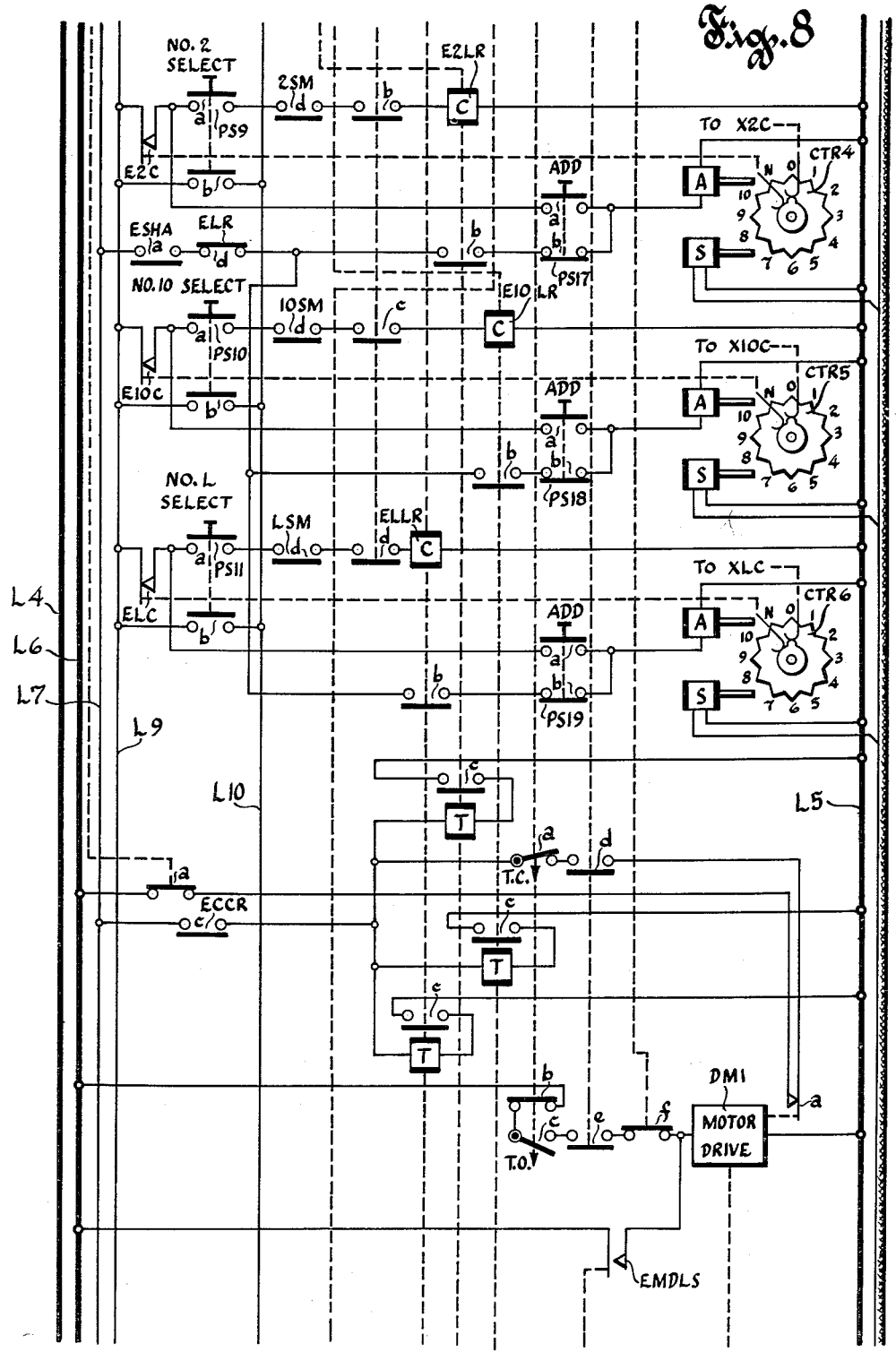

At the bottom of FIG. 7 and top of FIG. 8, a plurality of entry select pushbutton switches PS8, PS9, PS10 and PS11 are provided for controlling latching select relays E1LR, E2LR, E10LR and ELLR to control the storage of articles on the respective storage conveyors Nos. 1, 2, 10 and L.

Figure 9:
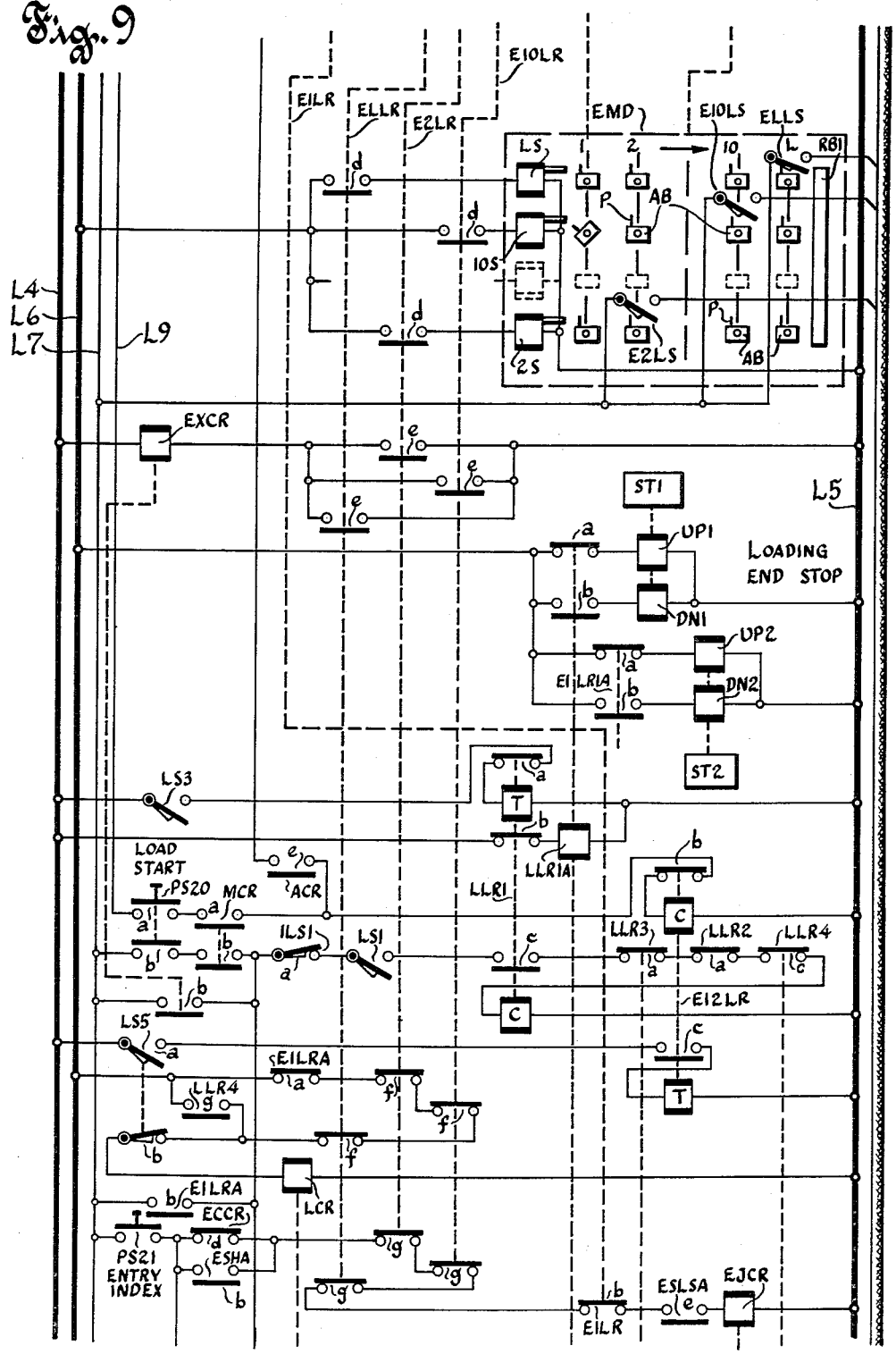

Entry memory device EMD at the top of FIG. 9 is provided with a drive motor mechanism DM1, shown in FIG. 8, for controlling intermittent rotary movement or stepping of the same in step with entry shuttle conveyor 12. Memory device EMD is of the rotary type and is shown in layout development to facilitate understanding thereof. It is provided with a column of stationary solenoids 2S, 10S and LS, one for each storage conveyor except the first. Each such solenoid is provided with an actuator and a row of actuator blocks AB, the number of actuator blocks in each row being equal to the number of storage conveyors and each actuator block AB having a pin P extending therefrom whereby the actuator block is pivoted by the associated solenoid actuator after the memory device starts to rotate. The actuator blocks of each horizontal row are arranged in a circle on a rotary drum which rotates on a vertical axis under the control of drive motor DM1. A plurality of stationary limit switches E2LS, E10LS and ELLS, one for each storage conveyor except the first, are provided for operation by pivoted actuator blocks AB. These limit switches are mounted on support members around the periphery of the drum so that in each operating position of the drum an actuator block, if it has been pivoted, reaches a position wherein it is operable to close a limit switch. Each limit switch corresponding to a storage conveyor is mounted adjacent an actuator block in the same row as the corresponding solenoid and the limit switches corresponding to the respective storage conveyors are arranged around the drum in the same order as the storage conveyors are arranged along the entry shuttle conveyor. In this manner, the memory device is operative to retain a memory as to which articles on the entry shuttle conveyor is assigned for which storage conveyor and to initiate a transfer of the article to the latter when it reaches such storage conveyor. A reset bar RB1 is mounted just ahead of the solenoids for resetting the actuator blocks to their normal positions.

In FIG. 9, a control relay EXCR, a latching relay LLR1 and a control relay LLR1A are provided for controlling stop ST1 at the exit end of accumulator conveyor 8 by way of up solenoid UP1 and down solenoid DN1. Stop ST2 is provided with an up solenoid UP2 and a down solenoid DN2 and is operable by a relay in FIG. 10 hereinafter described to control movement of articles from entry shuttle conveyor 12 onto storage conveyor No. 1. A relay E12LR and a relay LCR are provided for controlling entry shuttle conveyor 12. A relay EJCR is provided for controlling entry shuttle conveyor 12 under manual control.

Figure 10:
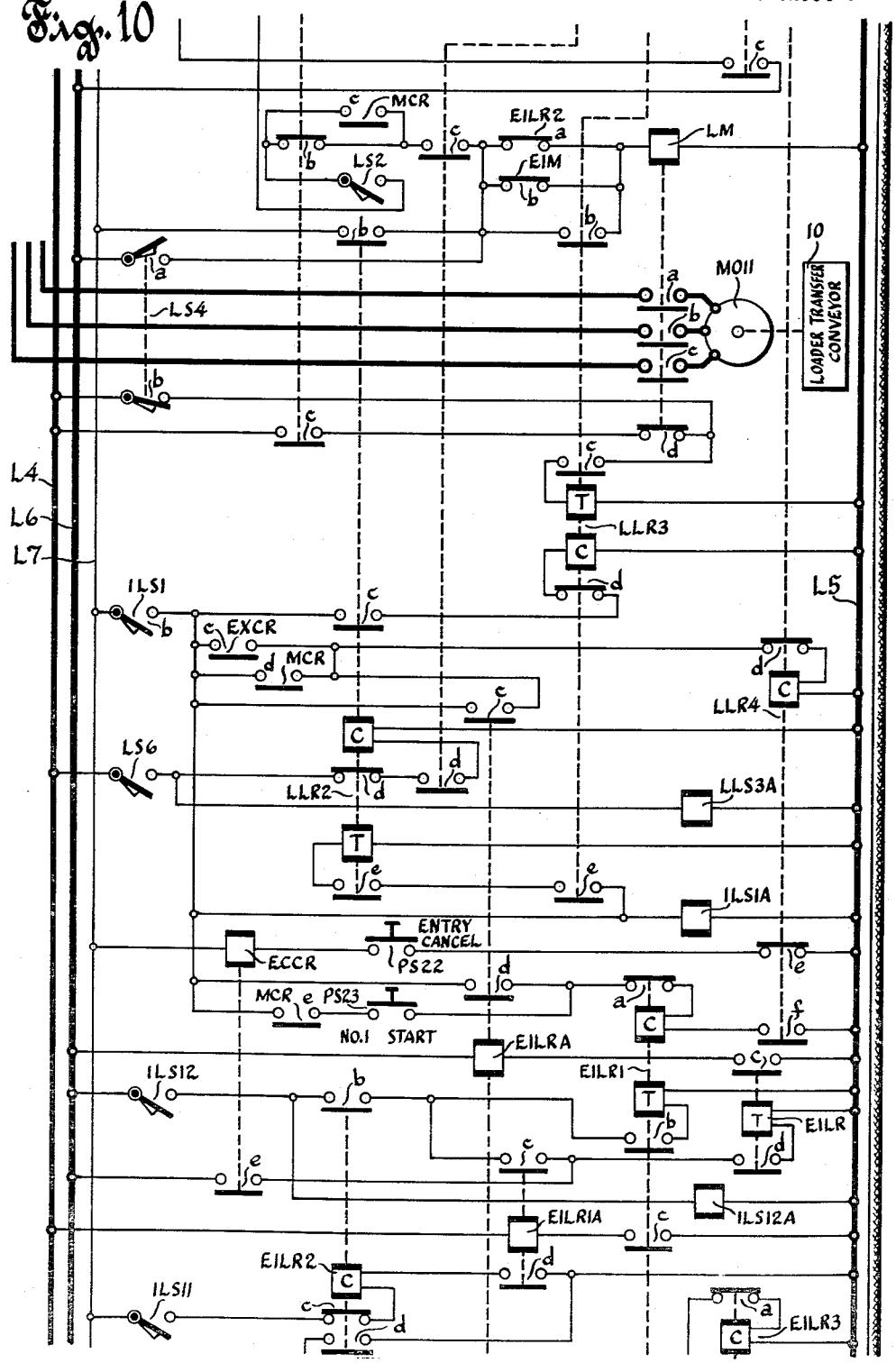

In FIG. 10, there is shown a motor MO11 for operating loader transfer conveyor 10 under the control of main contactor LM. Control relays LLR2, LLR3 and LLR4 of the latching type perform various functions in connection with the conveyance of articles onto entry shuttle conveyor 12 hereinafter described, each such relay having a closing coil C and a tripping coil T, the tripping coil T of relay LLR4 being shown in FIG. 7. Relay 1LS1A controls relay LLR4. Relay LLS3A controls subtract coil S of counter CTR1 to count the number of articles leaving accumulator conveyor 8. Entry cycle cancel relay ECCR is provided for controlling cancellation of the storage of an article. In the lower portion of FIG. 10 and the upper portion of FIG. 11, a plurality of latching relays E1LR1, E1LR2 and E1LR3 and auxiliary relays E1CR, E1LRA and 1LS12A are provided for controlling storage of articles from entry shuttle conveyor 12 onto storage conveyor No. 1. Relay E1LR1A is provided for controlling stop ST2 shown in FIG. 9, this stop being at the entry end of transfer-in conveyor 14. The lower portion of FIG. 10 also shows tripping coil T of select relay E1LR, the closing coil C of which appears at the lower portion of FIG. 7.

Figure 11:
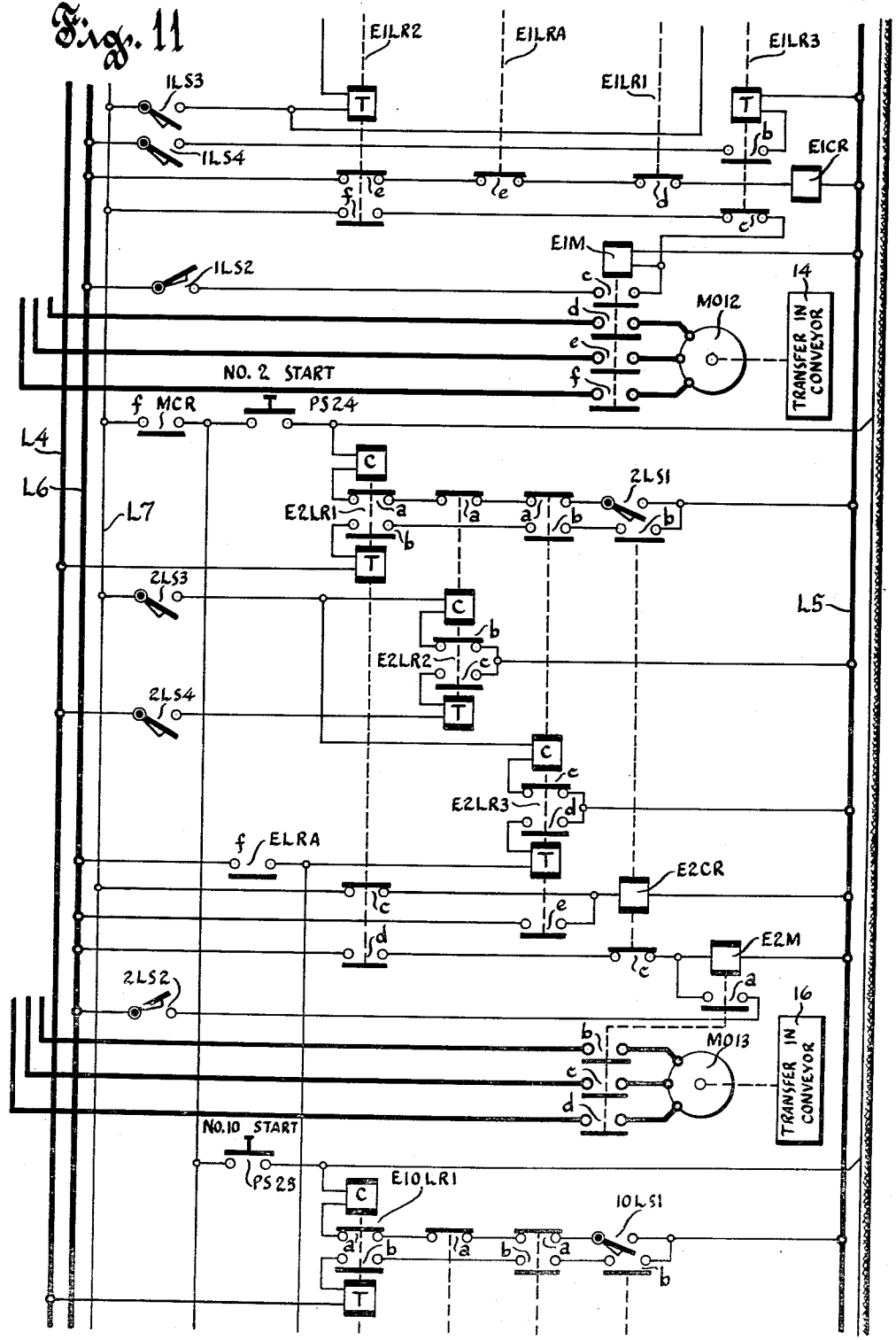

In FIG. 11, there is shown a motor MO12 for operating transfer-in conveyor 14 under the control of main contactor E1M. FIG. 11 also shows latching relays E2LR1, E2LR2 and E2LR3, an auxiliary relay E2CR and a main contactor E2M for operating a motor MO13 to run transfer-in conveyor No. 16. The lower portion of FIG. 11 and the upper half of FIG. 12 show latching relays E10LR1, E10LR2 and E10LR3, an auxiliary relay E10CR and a main contactor E10M for operating a motor MO14 to run transfer-in conveyor 18. FIG. 12 shows latching relays ELLR1, ELLR2 and ELLR3, an auxiliary relay ELCR and a main contactor ELM for operating a motor MO15, shown at the upper portion of FIG. 13, to run the last transfer-in conveyor 20. A latching relay RLR is provided in FIG. 12 for stopping the shuttle conveyor and indicating at a lamp UAL an unscheduled article at storage conveyor No. L. The aforementioned latching relays are of a type having a closing coil C and a tripping coil T and a plurality of closed and open contacts. A relay of this type may be normally tripped or normally closed. If such relay is normally tripped and its closing coil is energized, each open contact closes and each closed contact opens. The relay then latches in its closed condition and remains closed in this condition until its tripping coil is energized. Likewise, if such relay is normally closed and its trippng coil is energized, each closed contact opens and each open contact closes. The relay then latches in its tripped condition and remains tripped in this condition until its closing coil is energized. These relays are of known construction and the latching details thereof have not been illustrated to avoid complicating the drawings.

The entry cycle portion of the system also comprises a plurality of limit switches for performing various control functions, these limit switches being also shown in FIG. 1. In FIG. 4, limit switch FLS1 controls stopping of incoming conveyor 6 when a predetermined number of articles, for example three articles, have been accumulated on accumulator conveyor 8. Limit switch FLS2 controls add coil A of counter CTR1 to count the number of articles on accumulator conveyor 8. In FIG. 5, limit switch ILS1 controls stopping of intermediate conveyor 36 when a predetermined number of articles have been accumulated on accumulator conveyor 38. Limit switch ILS2 controls add coil A of counter CTR 2 to count the number of articles entering accumulator conveyor 38. Limit switch ILS3 controls restarting of intermediate conveyor 36 each time an article is removed from accumulator conveyor 38.

In FIG. 9, limit switch LS3 controls relay LLR1A to raise stop ST1 when articles enter accumulator conveyor 8. Limit switch LS1 in FIG. 9 conditions the system for storage whenever an article is resting against stop ST1 and is available for storage. At the top portion of FIG. 10, limit switch LS2 controls starting of loader transfer conveyor 10 when stop ST1 is lowered. In FIG. 10, limit switch LS4 maintains loader transfer conveyor 10 running until its cycle of operation is completed. Limit switch LS6 initiates the movement of another article into accumulator conveyor 8 when an article is removed therefrom for storage. Limit switch LS5 in FIG. 9 prevents operation of entry shuttle conveyor 12 while an article is being transferred thereto. Limit switch 1LS1 having a contact $a$ in FIG. 9 and a contact $b$ in FIG. 10 detects the presence of an article on the entry shuttle conveyor. Limit switches ESLS and ESDLS in FIGS. 7 and 6, respectively, control movement of entry shuttle conveyor 12 one space at a time, one space being defined as the distance required to move an article from one transfer-in conveyor to another.

Each storage line including a storage conveyor No. 1, 2, 10 and L and respectively associated transfer-in conveyor 14, 16, 18 and 20 is provided with a plurality of limit switches for controlling the system. The first storage line is provided with a limit switch 1LS11 shown at the bottom portion of FIG. 10 for controlling starting of transfer-in conveyor 14 when stop ST2 is lowered. Limit switch 1LS2 in FIG. 11 maintains transfer-in conveyor 14 running until it has completed its cycle of operation. Limit switch 1LS12 at the lower portion of FIG. 10 controls add coil A of counter CTR3 in FIG. 7 to count each article entering storage conveyor No. 1. Limit switches 1LS3 and 1LS4 at the top of FIG. 11 control certain relays in the manner hereinafter described. The remaining limit switches on storage conveyor No. 1 will be described in connection with the exit cycle control circuit diagrams.

The remaining storage lines corresponding to storage conveyors Nos. 2, 10 and L are provided with limit switches 2LS1, 10LS1 and LLS1 for detecting the presence of an article thereat, these limit switches being shown in FIGS. 11 and 12. Of these, limit switches 2LS1 and 10LS1 control start of the associated transfer-in conveyors 16 and 18 in conjunction with limit switches E2LS and E10LS of memory device EMD. Limit switches 2LS3, 10LS3, LLS3 and 2LS4, 10LS4, LLS4 control certain relays in FIGS. 11 and 12 in the control circuits of transfer-in conveyors 16, 18 and 20, respectively, as hereinafter described in more detail in connection with the description of operation of the entry cycle system. The remaining limit switches on storage conveyors Nos. 2, 10 and L will be described in connection with the exit cycle control circuit diagrams. The locations of the aforementioned limit switches are shown in FIG. 1.

There are also provided a plurality of pushbutton switches for manually controlling individual portions of the system. In FIG. 4, there are provided an add switch PS12 and a subtract switch PS13 for stepping counter CTR1 in reverse directions in the event it should get out of step with the number of articles actually on accumulator conveyor 8. Similarly, in FIG. 5 there are provided an add switch PS14 and a subtract switch PS15 for stepping counter CTR2 in reverse directions if it should get out of step with the number of articles actually on accumulator conveyor 38. At the lower portion of FIG. 7 and FIG. 8, there are provided add switches PS16, PS17, PS18, and PS19 for manually controlling the stepping of counters CTR3, CTR4, CTR5 and CTR6 of the respective storage conveyors in the clockwise add direction in the event they should get out of step with the number of articles actually on the storage conveyors. In FIG. 9, a load start pushbutton switch PS20 is provided for controlling release of articles from accumulator conveyor 8 to entry shuttle conveyor 12. At the lower left-hand portion of FIG. 9, entry index pushbutton switch PS21 affords manual control of the operation of entry shuttle conveyor 12. In FIG. 10, entry cancel pushbutton switch PS22 is provided for canceling a selected storage of an article before such article has reached entry shuttle conveyor 12 and actuated limit switch 1LS1. Also in FIG. 10, a No. 1 start pushbutton switch PS23 is provided for controlling the transfer of an article from entry shuttle conveyor 12 to storage conveyor No. 1. Similarly, No. 2 start, No. 10 start and No. L start pushbutton switches PS24, PS25 and PS26 are provided in FIGS. 11 and 12 for initiating the transfer of articles from entry shuttle conveyor 12 to storage conveyors Nos. 2, 10 and L, respectively.

While control circuits for only four storage conveyors have been shown, it will be apparent that additional storage conveyors can be utilized in the system by adding additional sets of relays and control devices such as those corresponding to either storage conveyor No. 2 or storage conveyor No. 10.

FIGS. 13 through 19 show control circuits for controlling operation of the exit cycle portion of the conveyor system. In FIG. 13, there is shown a motor MO16 having high speed winding HSW and low speed winding LSW for operating exit shuttle conveyor 30. A high speed main contactor XSH is provided for connecting windings HSW through lines L1, L2 and L3 to the three-phase power supply source. A low speed main contactor XSL is provided for connecting windings LSW to the power supply lines. A dynamic braking circuit for motor MO16 extends from lines L3 and L2 through a transformer PT4 to the input terminals of a full-wave rectifier bridge RB2 and then from the positive and negative output terminals of bridge RB2 through contacts of a dynamic braking control contactor XSDB to low speed windings LSW.

Limit stop control device LSC2 is supplied from conductors L4 and L5 through a voltage reducing transformer PT5. Device LSC2 comprises a unidirectional conducting device such as a diode DR2, a solid element semiconductor device such as a transistor TR2, a relay XPC, resistors R3 and R4, a photocell PC2 and a light source such as a lamp PCL2 connected in the same manner as the corresponding elements of limit stop control device LSC1 in FIG. 6. An exit cycle start relay XCSR under the control of start switches PS27 and PS28 and stop switches SS27 and SS28 is provided for conditioning the system so that an exit selection can be made. An exit shuttle timing relay XSTR is provided for controlling dynamic braking contactor XSDB.

Figure 14:
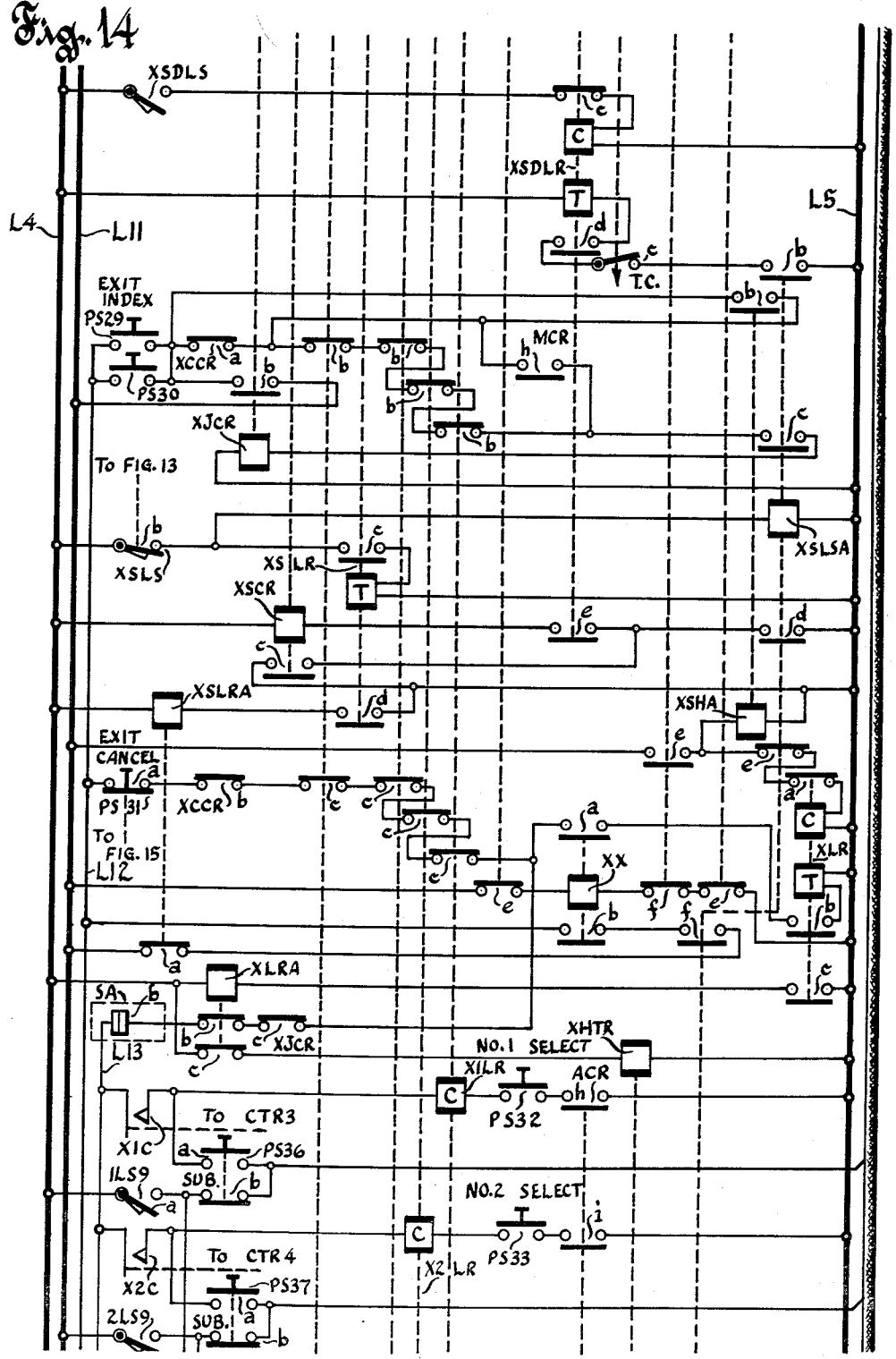
Figure 15:
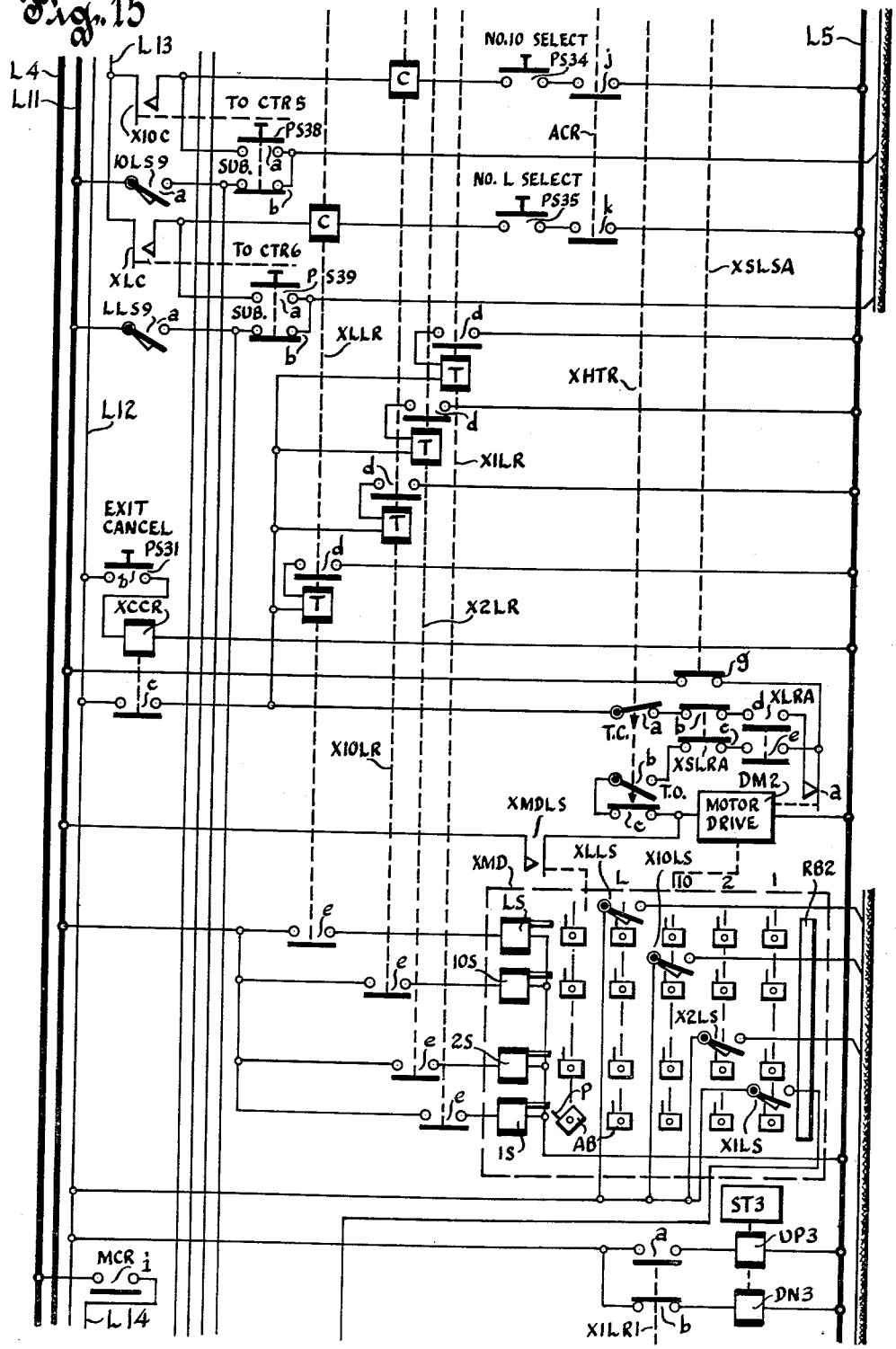

In FIG. 14, a latching relay XSDLR is provided for transferring motor MO16 from high speed to low speed. A control relay XJCR under the control of pushbutton switches PS29 and PS30 affords manual control of indexing the exit shuttle conveyor, that is, movement of the exit shuttle conveyor one space at a time. Such one space of movement of the exit shuttle conveyor is defined as a distance required to move an article from a point directly opposite one storage conveyor to a point directly opposite the next storage conveyor. A relay XSLSA under the control of exit shuttle operated limit switch XSLS is provided for controlling stopping of the exit shuttle conveyor. A latching relay XSLR and relays XSCR and XSLRA are provided for controlling the exit shuttle conveyor in the event it overrides a stopping position. A relay XX is provided for energizing conductor L12 in conjunction with relay XSLSA. A latching relay XLR and a relay XLRA are provided for performing various control functions hereinafter described when the exit shuttle is started. A timing relay XHTR is provided for initiating the operation of drive motor DM2 of exit memory device XMD, and for insuring that device XMD is set before the select relay is tripped. At the lower portion of FIG. 14 and the upper portion of FIG. 15, there are shown a plurality of exit select control relays X1LR, X2LR, X10LR and XLLR under the control of exit select switches PS32, PS33, PS34 and PS35, respectively. Counter switches X1C, X2C, X10C and XLC shown in FIGS. 14 and 15 are operable by counters CTR3, CTR4, CTR5 and CTR6, respectively, shown in FIGS. 7 and 8 to lock out the exit select circuits when the respective storage conveyors are empty. In FIGS. 14 and 15, subtract pushbutton switches PS36, PS37, PS38 and PS39 are connected through the conductors extending along the right-hand sides of FIGS. 8 through 14 to subtract coils S of counters CTR3, CTR4, CTR5 and CTR6, respectively, to afford manual control of operation of these counters in the counterclockwise direction.

In FIG. 15, an exit cycle cancel relay XCCR under the control of exit cancel switch PS31, the other contact of this switch being shown in FIG. 14, is provided for canceling an exit selection that has been made and being effective only during the time when a previously selected article is being transferred onto the exit shuttle conveyor. Exit memory device XMD is provided with a plurality of stationary solenoids 1S, 2S, 10S and LS, one for each storage conveyor, having actuators for engaging pins P of actuator blocks AB to pivot or set the latter into their operating positions when the memory device starts to rotate. A plurality of limit switches X1LS, X2LS, X10LS and XLLS, one for each storage conveyor, are mounted on stationary supports around the rotary drum which carries the actuator blocks. These limit switches are arranged in the vertical columns and horizontal rows so that a limit switch corresponding to a given storage conveyor is operable by an actuator block whenever a reserved space on the exit shuttle conveyor reaches a point directly opposite such storage conveyor as hereinafter more fully described. A resetting bar RB2 is provided just ahead of the vertical column of solenoids to reset the actuator blocks to their normal positions. Exit memory device XMD is provided with a number of columns of actuator blocks AB equal to the number of storage conveyors plus 1 for reasons hereinafter described. Stop ST3 in the lower portion of FIG. 15 is provided with an up solenoid UP3 and a down solenoid DN3 for controlling raising and lowering of the stop on storage conveyor No. 1.

Figure 16:
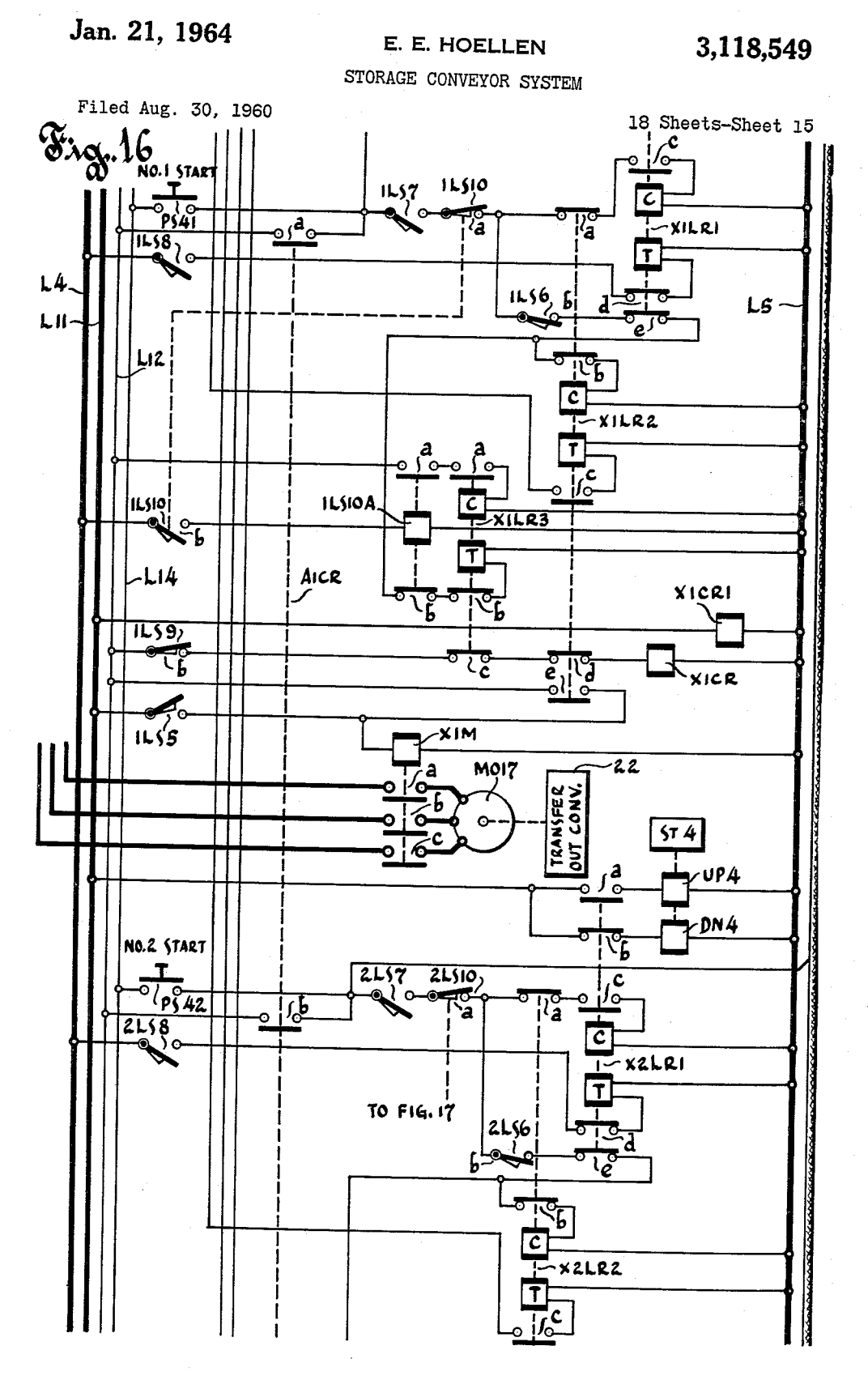

In FIG. 16, in addition to the stop shown in FIG. 15, storage line No. 1 is provided with latching relays X1LR1, X1LR2 and X1LR3, control relays 1LS10A, X1CR1 and X1CR and a main contactor X1M for controlling motor MO17 of exit transfer-out conveyor 22. A limit switch 1LS8 is provided for causing stop ST3 to be raised when an article approaches the latter. Limit switch 1LS7 indicates the presence of an article against stop ST3 on storage conveyor No. 1 to permit lowering of stop ST3. Limit switch 1LS6 is operated by stop ST3 to permit starting of exit transfer-out conveyor 22 when the stop is lowered. Limit switch 1LS5 maintains operation of exit transfer-out conveyor 22 until it has completed its cycle of operation. Limit switch 1LS9 having another contact at the lower left-hand portion of FIG. 14 controls subtract coil S of counter CTR3 and performs additional control functions hereinafter described. Limit switch 1LS10 prevents restarting of exit transfer out conveyor 22 until exit shuttle conveyor 30 has removed the released article from the position adjacent storage conveyor No. 1.

In the lower portion of FIG. 16 and the upper portion of FIG. 17, there is shown a control circuit for stop ST4 and exit transfer-out conveyor 24 of storage line No. 2 similar to that hereinbefore described in connection with storage line No. 1. This control circuit includes stop ST4 and its up solenoid UP4 and down solenoid DN4, latching relays X2LR1, X2LR2 and X2LR3, control relays 2LS10A, X2CR and X2CR1 and main contactor X2M for controlling motor MO18 of exit transfer-out conveyor 24. Limit switches 2LS5, 2LS6, 2LS7, 2LS8, 2LS9 and 2LS10 are provided for preforming functions like those described in connection with the limit switches having like suffix numbers in storage line No. 1.

Figure 17:
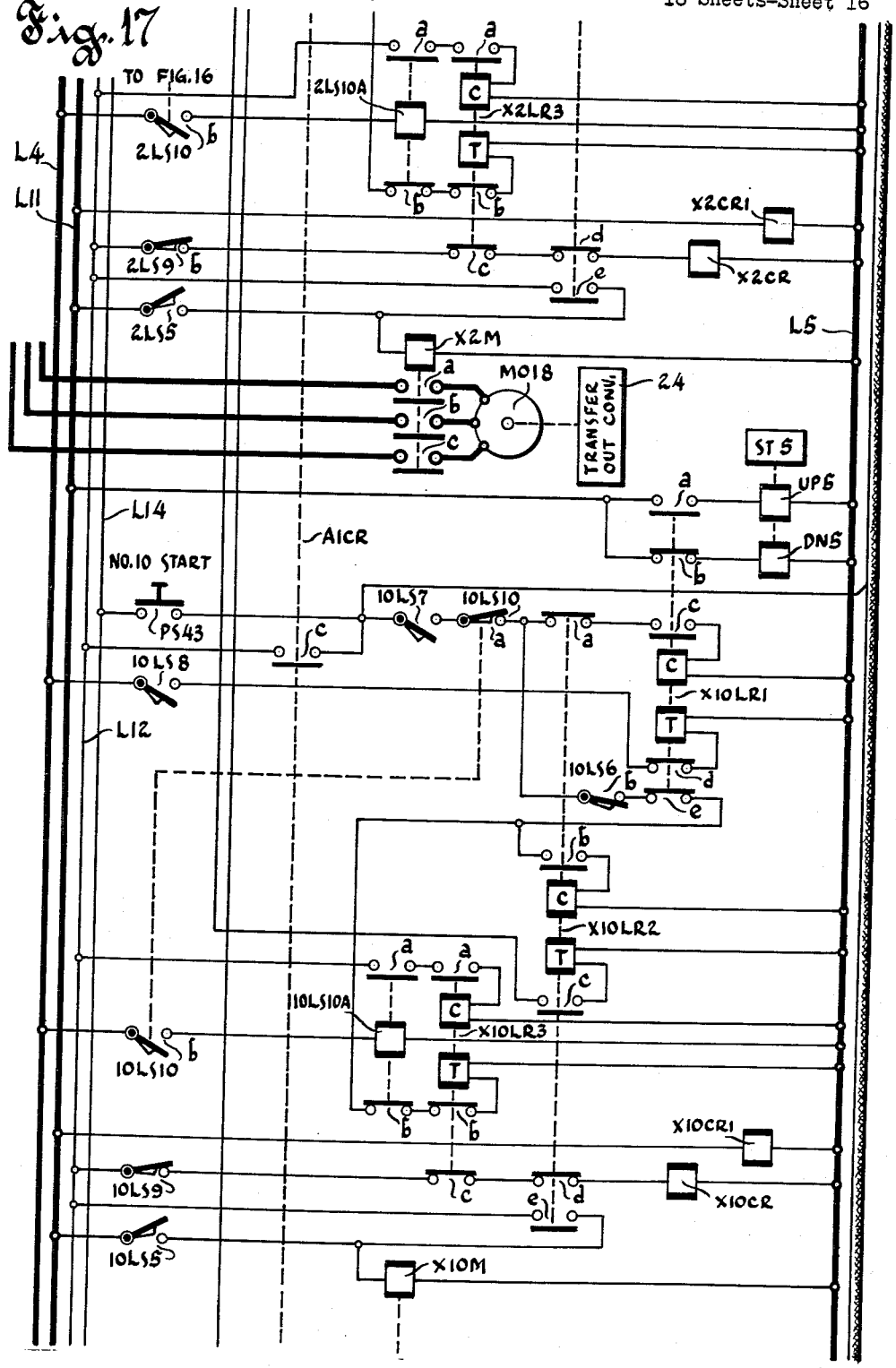

In the lower portion of FIG. 17, there is shown a control circuit for stop ST5 and exit transfer-out conveyor 26 of storage line No. 10 similar to that hereinbefore described. This control circuit includes stop ST5 and its up solenoid UP5 and down solenoid DN5, latching relays X10LR1, X10LR2 and X10LR3 control relays 10LS10A, X10CR and X10CR1 and main contactor X10M for controlling motor MO19 of exit transfer-out conveyor 26. Limit switches 10LS5, 10LS6, 10LS7, 10LS8, 10LS9 and 10LS10 are provided for performing functions like those described in connection with the limit switches having like suffix numbers in storage lines Nos. 1 and 2.

Figure 18:
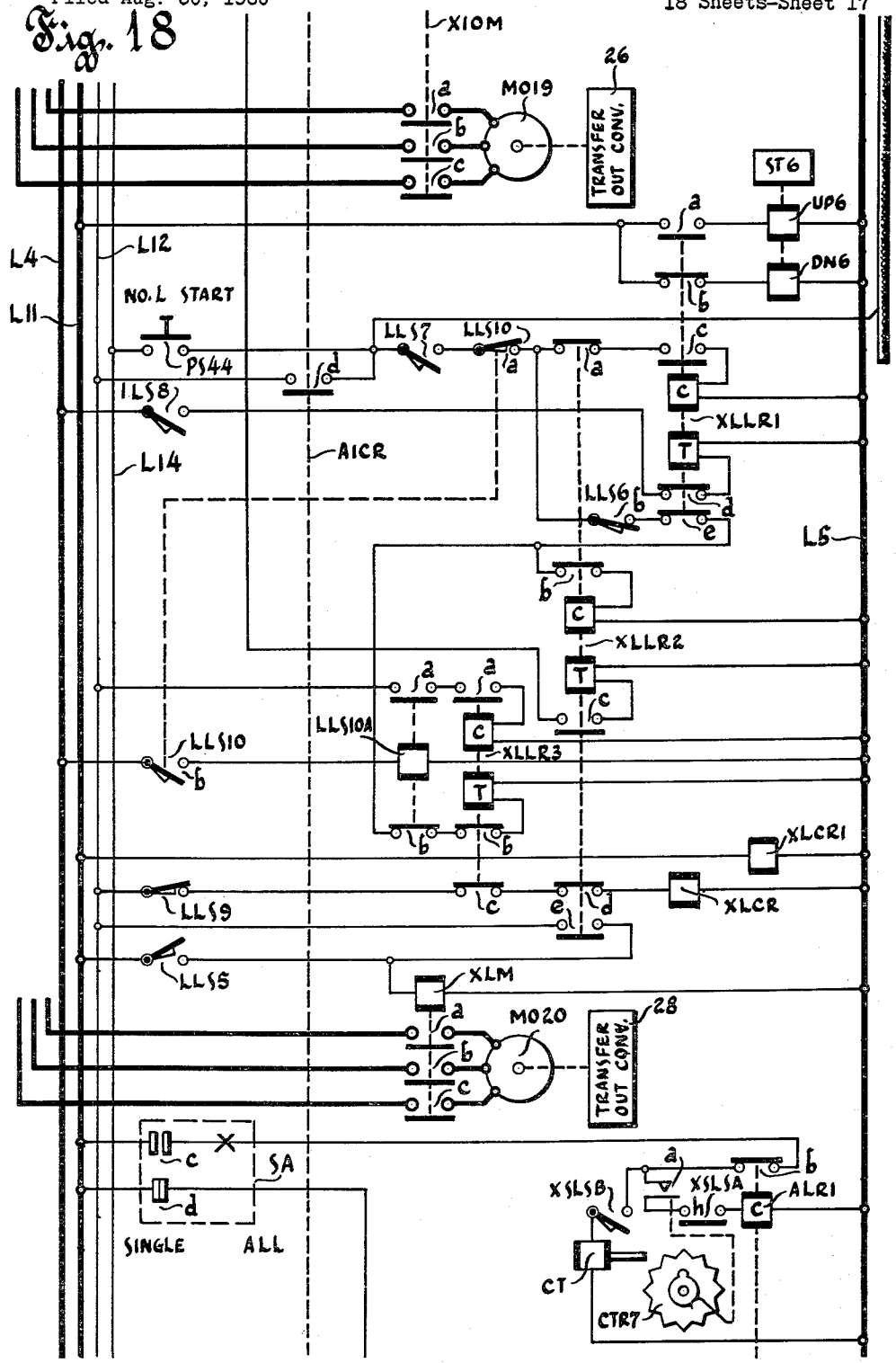

In FIG. 18, there is shown a control circuit for stop ST6 and exit transfer-out conveyor 28 of storage line No. L similar to those hereinbefore described. This control circuit includes stop ST6 and its up solenoid UP6 and down solenoid DN6, latching relays XLLR1, XLLR2, and XLLR3, control relays LLS10A, XLCR and XLCR1 and main contactor XLM for controlling motor MO20 of exit transfer out conveyor 28. Limit switches LLS5, LLS6, LLS7, LLS8, LLS9 and LLS10 are provided for performing functions like those described in connection with the limit switches having like suffix numbers in storage lines Nos. 1, 2 and 10.

Figure 19:
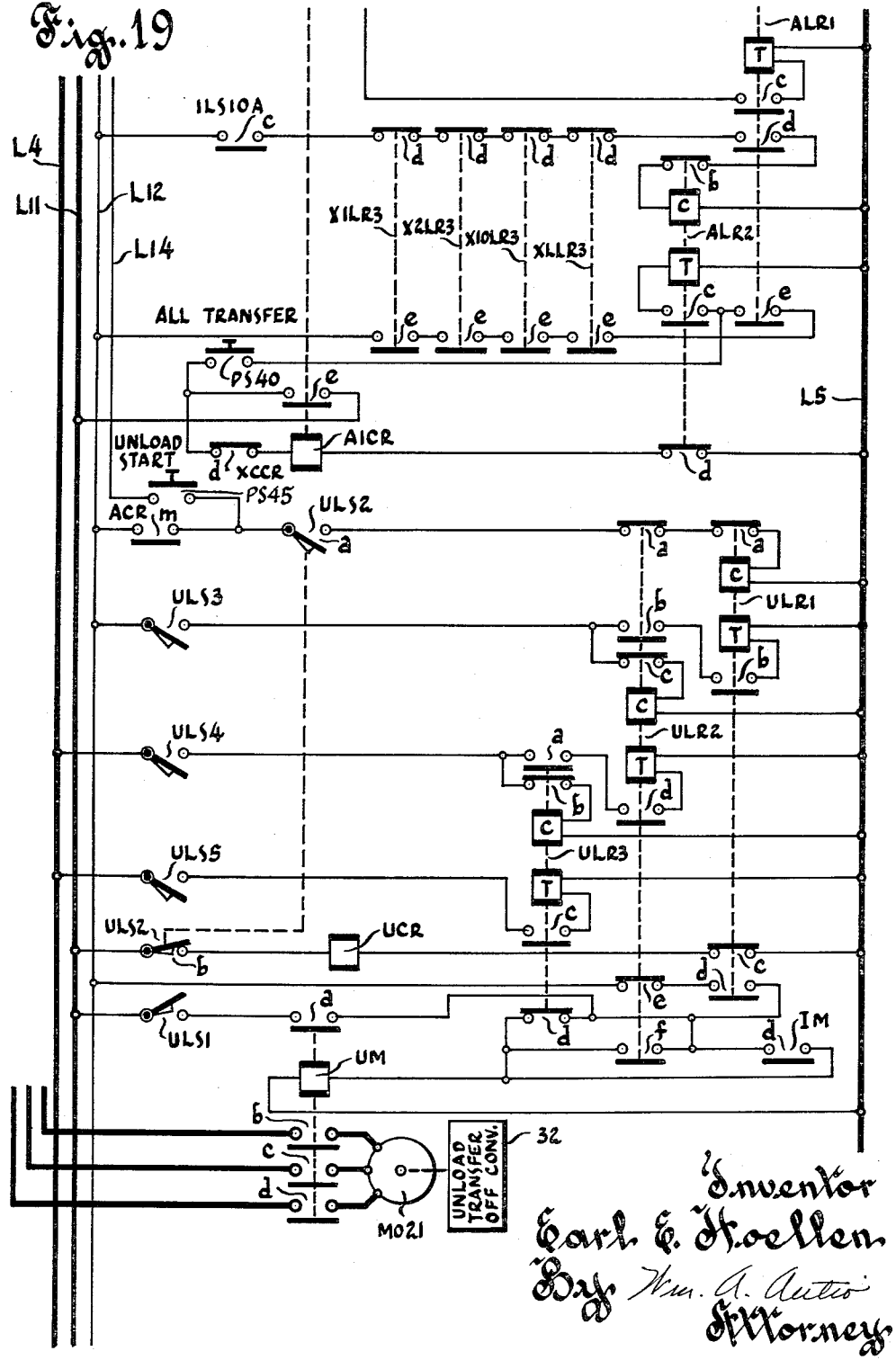

At the lower portion of FIG. 18 and the upper portion of FIG. 19, there is shown an all transfer control circuit for controlling transfer of an article from each storage conveyor onto the exit shuttle conveyor at the same time. This circuit includes a counter CTR7 for counting the movements of the exit shuttle conveyor, latching relays ALR1 and ALR2 and a control relay A1CR.

The lower portion of FIG. 19 shows a control circuit for controlling unload transfer-off conveyor 32 when limit switch ULS2 detects the presence of an article at the right-hand end of exit shuttle conveyor 30 at least one space beyond exit transfer-out conveyor 22. This circuit includes latching relays ULR1, ULR2, and ULR3, a control relay UCR and main contactor UM for controlling motor MO21 of unload transfer-off conveyor 32. Limit switch ULS1 maintains operation of motor MO21 until the unload transfer-off conveyor has completed its cycle of operation. Limit switches ULS3, ULS4 and ULS5 perform control functions hereinafter described.

The operation of the system to effect selective storage of articles on the plurality of storage conveyors Nos. 1, 2, 10 and L and to effect selective withdrawal of articles from the latter will now be described. The control circuits which perform these functions are shown in FIGS. 4 through 19.

Referring to FIG. 4, let it be assumed that a source of three-phase electrical power is connected to power supply lines L1, L2 and L3 in the upper left-hand portion of FIG. 4. To condition the system for starting, it may be assumed that relay LLR1 in FIG. 9 is in its closed condition as shown wherein contacts $a$ and $b$ are closed and contact $c$ is open. Let it also be assumed that relays X1LR1, X2LR1, X10LR1 and XLLR1 in the exit control portion of the system in FIGS. 16, 17 and 18 are in their closed condition wherein contacts $b$, $d$ and $e$ of each such relay are closed and contacts $a$ and $c$ of each such relay are open as shown. Let it further be assumed that relays X1LR3, X2LR3, X10LR3 and XLLR3 in the exit control portion of the system in FIGS. 16, 17 and 18 are in their closed condition wherein contacts $b$, $c$ and $d$ of each such relay are closed and contacts $a$ and $e$ of each such relay are open, contacts $d$ and $e$ of these relays being shown at the upper portion of FIG. 19.

In the following description, certain contacts of the relays which contacts are not shown connected by broken lines to the relay windings are identified by the associated relay reference character such as ACR in the middle of FIG. 13 and also by the contact reference character such as $g$, this contact being the seventh contact of relay ACR.

When power is applied to supply lines L1, L2 and L3, voltage reducing transformer PT1 in FIG. 4 is energized to supply power therethrough to conductors L4 and L5. As a result, relay ESLSA in FIG. 7 and relay LLR1A in FIG. 9 and relay XSLSA in FIG. 14 are energized. The circuit for relay ESLSA extends from conductor L4 through contact $b$ of limit switch ESLS, contact $b$ of relay ESHCR and the operating coil of relay ESLSA to conductor L5. The circuit for relay LLR1A extends from conductor L4 through contact $b$ of relay LLR1 and the operating coil of relay LLR1A to conductor L5. The circuit for relay XSLSA extends through contact $b$ of limit switch XSLS across conductors L4 and L5. Energization of relay ESLSA effects closure of contacts $a$, $b$ and $c$ and opening of contact $d$ thereof. Energization of relay LLR1A causes opening of contact $a$ and closure of contact $b$ in FIG. 9 and closure of contacts $c$ and $d$ in FIG. 10. As will be apparent, contact $b$ of relay LLR1A closes a point in the energizing circuit of down solenoid DN1 of loading end stop ST1 which is shown in FIG. 1 adjacent the exit end of accumulator conveyor 8. Relay XSLSA closes contacts $a$, $b$, $c$, $d$, and $f$ in FIGS. 13 and 14 and opens contacts $e$ and $g$ thereof in FIGS. 14 and 15.

*Automatic Operation*

For automatic operation of the system, the MAN-AUTO selector switch RS in FIG. 7 is turned to its AUTO operating position to close contact $a$ and open contact $b$. This causes energization of relay ACR across conductors L4 and L5 in FIG. 7 and closure of contacts $a$, $b$, $c$ and $d$ in the energizing circuits of the closing coils of select control relays E1LR, E2LR, E10LR and ELLR, respectively, in FIGS. 7 and 8. Contact e of relay ACR in FIG. 9 closes a point in the energizing circuit of closing coil C of relay E12LR. Contact f of relay ACR closes a point in the energizing circuit of relay ELLR1 in FIG. 12 and contact g of relay ACR closes a point in the exit cycle start circuit in FIG. 13. Contacts h, i, j and k close points in the exit cycle select relay circuits, respectively, in FIGS. 14 and 15. Contact m of relay ACR closes a point in the energizing circuit of exit start unload relay ULR1 in FIG. 19.

Pushbutton start switches PS1, PS2 and PS3 in FIG. 4 are pressed to start accumulator conveyors 8, 34 and 38 running. As shown in FIG. 4, closure of switch PS1 causes energization of contactor 1AM through stop switch SS1 across conductors L4 and L5. Contactor 1AM closes contacts a, b and c to connect three-phase power to motor MO1 and thereby to start accumulator conveyor 8 running. Contact d of contactor 1AM closes in shunt of start switch PS1 to maintain contactor 1AM energized. Similarly, closure of start switch PS2 causes energization of contactor 2AM through stop switch SS2 across conductors L4 and L5. Contactor 2AM closes contacts a, b and c to connect three-phase power to motor MO2 and thereby to start accumulator conveyor 34 running. Contact d of contactor 2AM closes in shunt of start switch PS2 to maintain contactor 2AM energized. In like manner, closure of start switch PS3 causes energization of contactor 3AM through stop switch SS3 across conductors L4 and L5. Contactor 3AM closes contacts a, b and c to connect three-phase power to motor MO3 and thereby to start accumulator conveyor 38 running. Contact d of contactor 3AM closes in shunt of start switch PS3 to maintain contactor 3AM energized.

In FIG. 4, start switch PS4 is pressed to start incoming conveyor 6 running. Closure of start switch PS4 causes energization of relay FCR through stop switch SS4 across conductors L4 and L5. Relay FCR closes contact a in shunt of start switch PS4 to maintain relay FCR energized. Contact b of relay FCR closes to complete an energizing circuit for contactor F1M through contact a of relay FLR1 across conductors L4 and L5. Contactor F1M closes contacts a, b and c to connect three-phase power to motor MO4 and thereby to start incoming conveyor 6 running.

In FIG. 5, start switch PS5 is pressed to start intermediate conveyor 36 running. Closure of start switch PS5 causes energization of relay ICR through stop switch SS5 across conductors L4 and L5. Relay ICR closes contact a in shunt of start switch PS5 to maintain relay ICR energized. Contact b of relay ICR closes an energizing circuit for contactor IM through contact a of relay ILR1 across conductors L4 and L5. Contactor IM closes contacts a, b and c to connect three-phase power to motor MO5 and thereby to start intermediate conveyor 36 running. Contact d of contactor IM in FIG. 19 also closes to complete a point in the maintaining circuit for contactor UM which controls unload transfer off conveyor motor MO21.

In FIG. 5, master storage conveyor start switch PS6 is pressed to start all of the storage conveyors running. Closure of start switch PS6 causes energization of storage conveyors control relay SCCR through stop switch SS6 across conductors L4 and L5. Relay SCCR closes contact a in shunt of start switch PS6 to maintain relay SCCR energized. Contact b closes to complete parallel energizing circuits in FIGS. 5 and 6 for contactors 1SM, 2SM, 10SM and LSM across conductors L4 and L5. The circuit for contactor 1SM extends through contact a of No. 1 storage conveyor stop controlled limit switch 1LS6 and stop-reset switch SR1. The circuits for contactors 2SM, 10SM and LSM extend through similar contacts a of limit switches 2LS6, 10LS6 and LLS6 and similar stop-reset switches SR2, SR10 and SRL, respectively, associated with the other storage conveyors.

Contactor 1SM closes contacts a, b and c to connect three-phase power to motor MO6 and thereby to start storage conveyor No. 1 running. Similarly, contactors 2SM, 10SM and LSM each closes its contacts a, b and c to connect three-phase power to motors MO7, MO8 and MO9 and thereby to start storage conveyors Nos. 2, 10 and L, respectively, running. Contacts d of contactors 1SM, 2SM, 10SM and LSM close points in the energizing circuits of entry select relays E1LR, E2LR, E10LR and ELLR, respectively, in FIGS. 7 and 8.

In FIG. 6, the entry cycle is started by pressing pushbutton switch PS7. Closure of switch PS7 causes energization of entry cycle start relay ECSR through stop switch SS7 across conductors L4 and L5. Relay ECSR closes contact a in shunt of switch PS7 to maintain relay ECSR energized. Contact b of relay ECSR closes to connect conductor L4 to conductor L6 and thereby to energize the latter. As a result, the photocell light source, that is, lamp PCL1 in FIG. 6 lights. The light impinging on photocell PC1 causes energization of the latter to effect current flow from the right-hand end of the secondary winding of transformer PT3 through unidirectional current conducting diode DR1, resistors R1 and R2 and photocell PC1 to the left-hand end of the secondary winding. The voltage drop across resistor R1 is applied to bias emitter E of transistor TR1 of the P-N-P conductivity type positive relative to base B thereof to render the transistor conducing. Current flows through emitter E and collector C of transistor TR1 and the operating coil of relay EPC to energize the latter and to close its contact a. As will be apparent, contact a closes a point in the energizing circuit of entry shuttle conveyor 12 power contactors ESH and ESL.

Relay X in FIG. 6 energizes in a circuit extending from conductor L6 through contacts d of contactors ESDB, ESH and ESL. Contact a of relay X closes to connect power from conductor L6 through contacts a of relays ESLSA and ESLR to conductor L7. Contact b of relay X in FIG. 7 closes. Energization of conductor L7 causes energization of conductor L8 through contact b of relay ECCR and contacts a of relays E1LR, ELLR, E10LR and E2LR. Energization of conductor L8 causes energization of conductor L9 through contacts c and b of relays ELRA and LLR4, respectively, and contact b of relay EJCR.

The aforementioned energization of conductor L6 effects energization of solenoid DN1 of stop ST1 in FIG. 9, through contact b of relay LLR1A. This causes stop ST1 to be lowered at the exit end of accumulator conveyor 8. Also, solenoid UP2 of stop ST2 energizes through contact a of relay E1LR1A from conductor L6 to conductor L5. As a result, stop ST2 is raised to block the entry end of entry transfer-in conveyor 14.

Entry memory device timer relay EHTR in FIG. 7 energizes through contact b of relay ELRA from conductor L6 to conductor L5. Relay EHTR opens contacts a and b and closes contact c.

In FIG. 9, relay LCR energizes in a circuit extending from conductor L6 through contact a of relay E1LRA, contacts f of relays E2LR, E10LR and ELLR, respectively, and contact b of limit switch LLS5 to conductor L5. Relay LCR closes contact a in FIG. 6 in the energizing circuit of contactor ESH. Relay LCR opens contact b in circuit of contactor LM and closes contact c in the trip coil T circuit of relay LLLR3.

In FIG. 11, relay E1CR energizes in a circuit extending from conductor L6 through contacts e of relays E1LR2 and E1LRA and contact d of relay E1LR1. As a result, contact a of relay E1CR in FIG. 6 closes. In FIG. 11, relay E2CR energizes in a circuit extending from conductor L7 through contact c of relay E2LR1 to conductor L5. This causes closure of contact a of relay E2CR in FIG. 6 in the circuit of contactor ESH, closure of contact b of relay E2CR in FIG. 11 and opening of contact c of relay E2CR to prevent energization of contactor E2M.

Relay E10CR in FIG. 12 energizes in a circuit extending from conductor L7 through contact c of relay E10LR1 to conductor L5. Contact a of relay E10CR in FIG. 6 and contact b of relay E10CR in FIG. 11 close and contact c of relay E10CR opens to prevent energization of contactor E10M. Relay ELCR in FIG. 12 energizes from conductor L7 through contacts b and c of relays ELLSA and ELLR1, respectively, to conductor L5. This causes closure of contact a of relay ELCR in FIG. 6 and contact b in FIG. 12 and opening of contact c in FIG. 12 to prevent energization of contactor ELM.

In FIG. 13, the exit cycle is started by pressing pushbutton switch PS27. Closure of switch PS27 causes energization of exit cycle start relay XCSR through stop switches SS27 and SS28 and contact g of automatic control relay ACR across conductors L4 and L5. Relay XCSR closes contact a thereof to complete a self-maintaining circuit in shunt of switch PS27 and contact g of relay ACR. Relay XCSR also closes contact b thereof to energize the primary winding of transformer PT5 across conductors L4 and L5. Contact b of relay XCSR also connects conductor L4 to conductor L11 to energize the latter.

The aforementioned energization of conductor L11 causes the photocell light source, that is, the lamp PCL2 in FIG. 13 to light. The light impinging on photocell PC2 causes energization of the latter to effect current flow from the right-hand end of the secondary winding of transformer PT5 through unidirectional current conducting diode DR2, resistors R3 and R4 and photocell PC2 to the left-hand of the secondary winding. The voltage drop across resistor R3 is applied to bias emitter E of transistor TR2 positive relative to base B thereof to render the transistor conducting, the latter being of the P-N-P conductivity type or the like. Current flows through emitter E and collector C of transistor TR2 and the operating coil of relay XPC to energize the latter and to close its contact a. As will be apparent, contact a closes a point in the energizing circuit of exit shuttle conveyor power contactors XSH and XSL. Relay XX in FIG. 14 energizes in a circuit extending from conductor L11 through contact e of relay XSDB and contacts f and e of contactors XSH and XSL to conductor 5 and closes contacts a and b thereof, the latter contact connecting power from conductor L11 through contact a of relay XSLRA and contact f of relay XSLSA to conductor L12.

Energization of conductor L12 causes energization of conductor L13 in FIG. 14 in a circuit extending from conductor L12 through exit cancel switch PS31, contact b of relay XCCR, contacts c of relays X1LR, X2LR, X10LR and XLLR, contact c of relay XJCR, contact b of relay XLRA and contact b of switch SA to conductor L13.

The aforementioned energization of conductor L12 effects energization of solenoids DN3, DN4, DN5 and DN6 through contacts b of relays X1LR1, X2LR1, X10LR1 and XLLR1, respectively, to cause stops ST3, ST4, ST5 and ST6 of storage conveyors No. 1, 2, 10 and L, respectively, to be lowered. Relay XHTR in FIG. 14 energizes in a circuit extending from conductor L4 through contact c of relay XLRA to conductor L5. Relay XHTR opens contacts a and c and closes contact b, contact a thereof being of the timed closing type as indicated by T.C. adjacent thereto and contact b being of the timed opening type as indicated by T.O. adjacent thereto. Relays X1CR1, X2CR1, X10CR1 and XLCR1 energize across conductors L11 and L5. As a result, contacts a of relays X1CR1, X2CR1, X10CR1 and XLCR1 in FIGS. 5 and 6 close to complete points in the energizing circuits of power contactors 1SM, 2SM, 10SM and LSM, respectively, of the storage conveyor motors. Relays X1CR, X2CR, X10CR and XLCR energize across conductors L12 and L5 and close their contacts a in FIG. 13. The circuit for relay X1CR extends through limit switch 1LS9 in FIG. 16, contact c of relay X1LR3 and contact d of relay X1LR2. The circuit for relay X2CR extends through limit switch 2LS9, contact c of relay X2LR3 and contact d of relay X2LR2. The circuit for relay X10CR extends through limit switch 10LS9, contact c of relay X10LR3 and contact d of relay X10LR2. The circuit for relay XLCR extends through limit switch LLS9, contact c of relay XLLR3 and contact d of relay XLLR2. Relay UCR in FIG. 19 energizes through contact b of limit switch ULS2 and contact c of relay ULR1 across conductors L11 and L5 and closes contact a in FIG. 13 in the circuit of the exit shuttle conveyor main contactors XSH and XSL.

The conveyor system is now ready to receive articles and to effect storage thereof selectively on the storage conveyors.

When articles approach along incoming conveyor 6, these articles are conveyed onto accumulator conveyor 8 and are accumulated against loading end article stop ST1. When a predetermined number of articles have been so accumulated, the incoming conveyor is stopped. This accumulation of articles is accomplished in the following manner. As each article reaches the exit end of incoming conveyor 6, it successively engages limit switches FLS1 and FLS2 in FIG. 4. As a result, limit switch FLS1 closes. Contact a of limit switch FLS2 closes and contact b thereof opens. Closure of contact a of limit switch FLS2 completes an energizing circuit for add coil A of accumulator conveyor 8 counter CTR1 through contact c of relay FLR1 and switch a of the counter. Add coil A actuates its operating member to step counter CTR1 one step in the clockwise add direction to operating position 1. As the leading article entering accumulator conveyor 8 engages limit switch LS3 in FIG. 9 to close its contact, tripping coil T of relay LLR1 is energized through contact a of the latter to open contacts a and b and to close contact c thereof. Opening of contact b of relay LLR1 interrupts energization of relay LLR1A thereby to close contact a and to open contact b of the latter. Closure of contact a of relay LLR1A causes energization of up solenoid UP1 of of stop ST1. As a result, stop ST1 is raised to stop the articles thereagainst as they are accumulated on accumulator conveyor 8. In a similar manner, the second article steps counter CTR1 in FIG. 4 to operating position 2. When the third article engages limit switch FLS1 to step counter CTR1 to operating position 3, switch a of the counter opens and switches b and c thereof close. Opening of switch a prevents further energization of add coil A of the counter. Closure of switch b completes a point in the circuit of closing coil C of relay FLR1. When the fourth article engages limit switch FLS1 to close the same, and before such article engages limit switch FLS2, closing coil C of relay FLR1 is energized through contact d of relay FLR1 contact b of limit switch FLS2 and switch b of the counter. As a result, relay FLR1 opens contact a thereof to interrupt the circuit of contactor F1M whereupon contacts a, b and c of the latter open to disconnect power from motor MO4 and to stop the incoming conveyor. Relay FLR1 closes contact b and opens contacts c and d thereof. The incoming conveyor remains stopped until an article is released from accumulator conveyor 8.

As the leading article engages stop ST1, limit switch LS1 in FIG. 9 is actuated to close the same. The system is now ready for selected storage of articles on the storage conveyors.

An operator at main operator's staton control panel 2 assigns the articles resting against stop ST1 to selected ones of the storage conveyors. Each succeeding article is assigned in its order by pressing one of the entry select pushbutton switches at the main operator's station. Pressing any select switch causes the first article to be moved onto shuttle conveyor 12 at a point opposite storage conveyor No. 1. Shuttle conveyor 12 then moves one space so that the first article is positioned opposite storage conveyor No. 2, assuming that the first article was not assigned to storage conveyor No. 1. Memory device EMD is also moved one step to indicate and register the location of the first article. If the first article has been assigned to storage conveyor No. 1, it would be moved thereon directly without movement of shuttle conveyor 12, or stepping of memory device EMD. This is for the reason that the articles enter shuttle conveyor 12 at a point directly opposite storage conveyor No. 1.

As each additional article is asigned to a storage conveyor, the aforedescribed operations are repeated. When the first article reaches a point directly opposite the storage conveyor to which it is assigned in its travel along shuttle conveyor 12, entry memory device EMD functions to activate the corresponding entry transfer-in conveyor 14, 16, 18 or 20 to move such article from shuttle conveyor 12 onto the selected storage conveyor. The stored articles are accumulated against a stop on each storage conveyor. When a given storage conveyor is full, a counter locks out the corresponding selecting circuit so that additional articles cannot be assigned thereto until such time as at least one article is withdrawn therefrom.

An operator at main operator's station 2 also assigns or withdraws articles from the storage conveyors to a production line through an outgoing conveyor 40. This is done by pressing appropriate exit select pushbutton switches at the main operator's station. Pressing any such exit select switch causes a space immediately on the left side of the space opposite storage conveyor No. L to be reserved for the article on exit shuttle conveyor 30. The exit shuttle conveyor 30 then moves one space to position the reserved space opposite storage conveyor No. L and exit memory device XMD moves one step to indicate and register the location of the first selected article. When the reserved space on exit shuttle conveyor 30 reaches a point opposite the storage conveyor from which an article was selected, an article is automatically moved into such reserved space on the exit shuttle conveyor by the corresponding exit transfer out conveyor 22, 24, 26 or 28.

As each additional article is reserved or marked for withdrawal, the aforedescribed operations are repeated and successive spaces are reserved. As a result, the articles are arranged on the exit shuttle conveyor in the order in which they are selected for movement through the outgoing conveyor. When the first and each succeeding article reaches the exit end of shuttle conveyor 30 at least one space beyond transfer-out conveyor 22, unload transfer-off conveyor 32 is activated to move the article onto accumulator conveyor 34. As the latter is running continuously, it moves the articles to an idling point at intermediate conveyor 36.

The function of accumulator conveyor 38 is to gather the articles received from the intermediate conveyor and thereby to eliminate any spaces therebetwen. Accumulator conveyor 38 is provided with a counter which stops the intermediate conveyor when a predetermined number of articles have been accumulated and restarts the intermediate conveyor when this number is reduced. This action prevents pileups of articles at this location. The articles travel from accumulator conveyor 38 through outgoing conveyor 40 to a production line or the like.

The aforementioned functions will now be described in detail.

*Entry Cycle*

The storage of articles on the storage conveyors is initiated by an operator pressing one of the entry select pushbutton switches PS8, PS9, PS10 or PS11 in FIGS. 7 and 8 corresponding respectively, to storage conveyors Nos. 1, 2, 10 and L. For example, if switches PS8, PS9, PS10 and PSL are pressed in that order, the first article will be conveyed to storage conveyor No. 1, the second article will be assigned to storage conveyor No. 2, the third article will be assigned to storage conveyor No. 10 and the fourth article will be assigned to the last storage conveyor No. L. The actual delivery of each article to the storage conveyor to which it is assigned will take place when the entry shuttle conveyor has been intermittently operated in incremental steps corresponding to the spacing of the storage conveyors along the entry shuttle conveyor such that a given article is opposite the storage conveyor to which it is assigned.

For purposes of description of operation of the entry cycle, let it be assumed that the first article is to be stored on storage conveyor No. 10. For this purpose, the main operator presses select switch PS10 in FIG. 8 to close contacts $a$ and $b$ thereof. This causes energization of closing coil C of relay E10LR from conductor L9 through switch E10C of counter CTR5, contact $a$ of select switch PS10, contact $d$ of contactor 10SM and contact $c$ of relay ACR. It will be apparent that contact $d$ is a normally open contact of main power contactor 10SM of storage conveyor No. 10 motor MO8 and that a storage selection cannot be made unless the corresponding storage conveyor is running. It will be apparent that switch E10C of counter CTR5 opens when a predetermined number N of articles have been stored on storage conveyor No. 10 and, therefore, additional articles cannot be assigned thereto when it is full. Closing coil C of relay E12LR energizes in a circuit extending from conductor L9 through contact $b$ of select switch PS10, conductor L10, contact $e$ of relay ACR and contact $b$ of relay E12LR. The latter opens its contact $a$ in FIG. 6 to lock out the entry shuttle conveyor drive during operation of loader transfer conveyor 10 hereinafter described. Relay E12LR also opens its contact $b$ to interrupt the energizing circuit of its closing coil C and closes its contact $c$ to complete a point in the energizing circuit of its tripping coil T. Relay E10LR opens its contacts $a$, $f$ and $g$ and closes its contacts $b$, $c$, $d$ and $e$. Contact $e$ of relay E10LR energizes relay EXCR in FIG. 9 across conductors L4 and L5. Its contact $f$ deenergizes relay LCR. Its contact $d$ energizes solenoid 10S of entry memory device EMD across conductors L6 and L5. Its contact $b$ in FIG. 8 closes a point in the circuit of add coil A of counter CTR5. Its contact $c$ closes a point in the circuit of its tripping coil T. Its contact $a$ disconnects conductor L8 from conductor L7 to lock out the select circuits and to deenergize its closing coil C. Its contact $g$ locks out entry index pushbutton switch PS21.

Deenergization of load cycle control relay LCR at the lower portion of FIG. 9 effects opening of its contact $a$ in FIG. 6 to lock out the entry shuttle conveyor drive. Its contact $c$ opens the bypass circuit of tripping coil T of relay LLR3 and its contact $b$ closes a point in the circuit of main contactor LM of loader transfer conveyor motor MO11. Solenoid 10S of entry cycle memory device EMD in FIG. 9 acts upon the projecting pin extending from actuator block AB in column 1 to pivot or set the latter counter clockwise to a position wherein it will close limit switch E10LS when the actuator block reaches a position adjacent such limit switch as hereinafter described.

The aforementioned energization of relay EXCR at the left side of FIG. 9 causes closure of its contact $a$ in FIG. 6 to complete a point in the circuit of the entry shuttle conveyor motor main contactor ESH. Relay EXCR also closes its contact $b$ in FIG. 9 to energize closing coil C of relay LLR1 in a circuit extending from conductor L7 through contact $a$ of limit switch 1LS1 and limit switch LS1, contacts $c$ of relays LLR1 and LLR4 and contacts $a$ of relays LLR2 and LLR3. In this circuit, limit switch LS1 is closed since an article is resting against stop ST1. Relay EXCR further closes its contact $c$ in FIG. 10 to close a point in the circuit of closing coil C of relay LLR4. Relay LLR1 closes contacts $a$ and $b$ and opens contact $c$, the latter deenergizing its closing coil C. Its contact $b$ energizes relay LLR1A across conductors L4 and L5. Relay LLR1A opens contact $a$ to deenergize up solenoid UP1 and closes contact $b$ to energize down solenoid DN1 across conductors L6 and L5. Energization of solenoid DN1 causes stop ST1 to be lowered thereby to permit an article to pass thereover. Relay LLR1A also closes its contact *c* in FIG. 10 to complete a point in the circuit of main contactor LM of the loader transfer conveyor motor. Relay LLR1A also closes its contact *d* in FIG. 10 in the circuit of closing coil C of relay LLR2 to prepare the latter for energization as hereinafter described. When stop ST1 reaches its lower position, it engages limit switch LS2 in FIG. 10 to close the latter. As a result, main contactor LM is energized in a circuit extending from conductor L7 in FIG. 9 through contact *b* of relay EXCR, limit switch LS2, contact *b* of relay LCR in FIG. 10, contact *c* of relay LLR1A and contact *a* of relay E1LR2 to conductor L5. Contactor LM closes its contacts *a*, *b* and *c* to connect motor MO11 to the three-phase power supply source and thereby to start loader transfer conveyor 10 running. Contactor LM also opens its contact *d* to maintain open the bypass circuit for tripping coil T of relay LLR3.

When stop ST1 was lowered as hereinbefore described, accumulator conveyor 8 which runs continuously conveyed the first article over the stop and onto loader transfer conveyor 10. When the first article is thus moved onto the entry end of loader transfer conveyor 10, the latter engages such article and moves the same onto entry shuttle conveyor 12 adjacent storage conveyor No. 1. When loader transfer conveyor 10 is started it disengages limit switch LS4 in FIG. 10 to permit the latter to open its contact *b* without effect at this time and to close its contact *a* to complete a maintaining circuit for contactor LM from conductor L6 through contact *a* of relay E1LR2. In this manner, limit switch LS4 maintains contactor LM energized and motor MO11 operating until loader transfer conveyor 10 has completed its cycle of operation and reopens contact *a* of limit switch LS4.

When the first article is moved forward by loader transfer conveyor 10, such article engages limit switch LS6 in FIG. 10 to close the latter and to complete an energizing circuit for closing coil C of relay LLR2 in a circuit extending from conductor L4 through contact *d* of relay LLR1A and contact *d* of relay LLR2 to conductor L5. Limit switch LS6 also completes an energizing circuit for relay LLS3A across conductors L4 and L5. Relay LLS3A closes its contact *a* in FIG. 4 to complete an energizing circuit through switch *c* of counter CTR1 for subtract coil S of counter CTR1. As a result, subtract coil S steps the counter one step in the counterclockwise direction thereby to reclose switch *a* and to reopen switches *b* and *c* thereof, the latter interrupting energization of subtract coil S. Reclosure of switch *a* of counter CTR1 completes an energizing circuit for tripping coil T of relay FLR1 through contact *b* of the latter, whereby relay FLR1 restores its contact *a*, *b*, *c* and *d* to the positions shown in FIG. 4. Contact *a* of relay FLR1 reenergizes main contactor F1M through contact *b* of relay FCR. As a result, contactor F1M closes its contacts *a*, *b* and *c* to restart incoming conveyor 6 which moves a further article onto accumulator conveyor 8.

When such fourth article engages limit switch LS3 in FIG. 9 to close the latter, tripping coil T of relay LLR1 is energized through contact *a* of the latter across conductors L4 and L5. As a result, contacts *a* and *b* open and contact *c* of relay LLR1 closes. Contact *b* of relay LLR1 interrupts energization of relay LLR1A thereby to close contact *a* and to open contact *b* of the latter. Opening of contact *b* deenergizes down solenoid DN1 and closure of contact *a* reenergizes up solenoid UP1 of stop ST1 whereby the stop is raised to engage the second article and to stop the same on accumulator conveyor 8. The aforementioned energization of closing coil C of relay LLR2 in FIG. 10 closes its contact *b* to complete a maintaining circuit through contact *a* of relay E1LR2 for main contact LM. Relay LLR2 opens its contact *a* in FIG. 9 to prevent energization of closing coil C of relay LLR1. Relay LLR2 opens its contact *d* to interrupt energization of its closing coil C and closes its contact *e* to complete a point in the energizing circuit of its tripping coil T. Relay LLR2 further closes its contact *c* to complete a point in the circuit of closing coil C of relay LLR3.

When the first article enters upon entry shuttle conveyor 12, it engages limit switch LS5 in FIG. 9 to close contact *a* and to open contact *b* thereof. Opening of contact *b* of limit switch LS5 maintains relay LCR deenergized. Contact *a* of limit switch LS5 completes an energizing circuit for tripping coil T of relay E12LR through contact *c* of the latter. Relay E12LR closes its contact *a* in FIG. 6 in the circuit of main contactor ESH, closes its contact *b* and reopens its contact *c* to deenergize tripping coil T thereof.

The first article entering fully upon entry shuttle conveyor 12 engages limit switch 1LS1 to open contact *a* in FIG. 9 and to close contact *b* thereof in FIG. 10. Contact *a* of limit switch 1LS1 further interrupts the circuit of closing coil C of relay LLR1. Contact *b* of limit switch 1LS1 energizes relay 1LS1A across conductors L7 and L5. Contact *b* of limit switch 1LS1 also energizes closing coil C of relay LLR3 through contact *c* of relay LLR2 and contact *d* of relay LLR3. Contact *b* of limit switch 1LS1 further energizes closing coil C of relay LLR4 through contact *d* of the latter and contact *c* of relay EXCR. The aforementioned energization of relay 1LS1A causes opening of its contact *a* in FIG. 7 to prevent energization of tripping coil T of relay LLR4.

Relay LLR3 opens its contact *a* to prevent energization of closing coil C of relay LLR1, closes its contact *b* to complete a maintaining circuit in shunt of contact *a* of relay E1LR2 for main contactor LM, closes its contact *c* to complete a point in the circuit of its tripping coil T, opens its contact *d* to deenergize its closing coil C and closes its contact *e* to complete an energizing circuit for tripping coil T of relay LLR2 through contact *e* of the latter. Energization of closing coil C of relay LLR4 as aforementioned causes closure of contact *a* thereof in the circuit of its tripping coil T in FIG. 7 and opens contact *b* thereof to maintain the power disconnected from conductor L9 and the select circuits. Relay LLR4 also opens contact *c* in FIG. 9 to prevent energization of closing coil C of relay LLR1, opens contact *d* to deenergize its closing coil C, opens contact *e* to lock out entry cancel pushbutton switch PS22, closes contact *f* to complete a point in the circuit of closing coil C of relay E1LR1 and closes contact *g* in FIG. 9 to complete a point in the energizing circuit of relay LCR.

When the ram of loader transfer conveyor 10 leaves entry shuttle conveyor 12 and starts to return toward its normal position, limit switch LS5 in FIG. 9 is restored to the position shown wherein contact *a* is open and contact *b* thereof is closed. Contact *b* of limit switch LS5 completes an energizing circuit for relay LCR through contact *g* of relay LLR4 across conductors L6 and L5. Relay LCR closes its contact *a* in FIG. 6 to complete an energizing circuit for main contactor ESH. The circuit for contactor ESH extends from conductor L6 through contact *a* of relay X, contact *a* of relay ESLSA, contact *a* of relay ESLR, contact *a* of relay EXCR, contact *a* of relay E1CR, contact *a* of relay E2CR, contact *a* of relay E10CR, contact *a* of relay ELCR, contact *a* of relay RLR, contact *a* of relay ECCR, contact *a* of relay LCR, contact *a* of relay E12LR, contact *a* of relay ELRA, contact *a* of relay EPC, contact *e* of contactor ESDB and contact *a* of relay ESDLR. Contactor ESH closes its contacts *a*, *b* and *c* to connect high-speed winding HSW of motor MO10 to the three-phase power supply source thereby to start entry shuttle conveyor 12 running at a high speed. Relay LCR in FIG. 9 also opens its contact *b* to interrupt the original energizing circuit of main contactor LM of motor MO11 of loader transfer conveyor 10. Relay LCR also opens its contact *c* to interrupt the bypass circuit of tripping coil T of relay LLR3. When the ram of loader transfer conveyor 10 completes its cycle of operation and returns to its normal position, it reengages limit switch LS4 to open contact *a* and to close contact *b* thereof. Contact *a* of limit switch LS4 interrupts the maintaining circuit of main contactor LM whereupon the latter opens its contacts *a*, *b* and *c* to disconnect motor MO11 and stop loader transfer conveyor 10. Contact *b* of limit switch LS4 completes an energizing circuit for tripping coil T of relay LLR3 through contact *c* of relay LLR3. Tripping of relay LLR3 causes closure of contacts *a* and *d* and opening of contacts *b*, *c* and *e*.

The aforementioned energization of contact ESH in FIG. 6 opens contact *d* to interrupt energization of relay X, opens contact *e* to prevent energization of dynamic braking contactor ESDB and closes contact *f* to energize relay ESHA across conductors L6 and L5. Entry shuttle conveyor 12 now runs at high speed to convey the first article from a point opposite storage conveyor No. 1 to a point opposite storage conveyor No. 2. Deenergization of relay X opens contact *a* thereof to disconnect power from conductors L7, L8 and L9, thereby to maintain the selecting circuits locked out. Relay X also opens its contact *b* in the circuit of tripping coil T of relay ELR. The aforementioned closure of contact *f* of contactor ESH closes a point in the energizing circuit of closing coil C of relay ELR. Relay ESHCR energizes in parallel with contactor ESH and closes contact *a* thereof to complete a maintaining circuit for contactor ESH. This maintaining circuit extends from conductor L6 through contact *a* of relay ESHCR, contact *a* of relay ESCR, contact *b* of relay ESLR, contact *a* of relay EPC, contact *e* of relay ESDB, and contact *a* of relay ESDLR. Relay ESHCR also opens contact *b* thereof to interrupt energization of relay ESLSA.

The aforementioned energization of relay ESHA effects closure of its contact *a* in FIG. 8 to complete an energizing circuit for add coil A of counter CTR5 thereby to step the counter one step in the clockwise direction and to register the assignment of one article to storage conveyor No. 10. Relay ESHA also closes its contact *b* in the entry shuttle conveyor index circuit at the lower left-hand portion of FIG. 9 without effect at this time. When the first article is moved by entry shuttle conveyor 12 from a point opposite storage conveyor No. 1, limit switch ESLS in FIG. 7 is disengaged to cause closure of contact *a* and opening of contact *b* thereof. Contact *a* of limit switch ESLS completes a maintaining circuit for contactor ESH in shunt of contact *a* of relay ESHCR until its contact *a* reopens. Contact *b* of limit switch ESLS further interrupts the energizing circuit of relay ESLSA.

When contactor ESH was energized to start entry shuttle conveyor 12 running, entry shuttle timing relay ESTR also energizes in parallel with contactor ESH and contact *a* of relay ESDLR. Relay ESTR opens its contacts *a* and *c* and closes its contact *b*.

The aforementioned deenergization of relay ESLSA opens its contacts *a*, *b*, *c* and *e* and closes its contact *d*. Its contact *a* maintains conductor L7 deenergized and the selecting circuits locked out. Its contact *b* locks out tripping coil T of relay ESDLR. Its contact *c* locks out relay ESCR. Its contact *e* at the lower portion of FIG. 9, locks out the entry shuttle conveyor manual index circuit. Its contact *d* completes an energizing circuit for closing coil C of relay ELR extending from conductor L6 through contact *f* of contactor ESH and contact *a* of relay ELR to conductor L5. Relay ELR opens its contact *a* to deenergize its closing coil C, closes its contact *b* to complete a point in the circuit of its tripping coil T, closes its contact *c* to energize relay ELRA across conductors L4 and L5 and opens its contact *d* in FIG. 8 to interrupt energization of add coil A of counter CTR5. Relay ELRA opens its contact *a* in FIG. 6 to interrupt the original energizing circuit of contactor ESH, opens its contact *b* to interrupt energization of relay EHTR, opens its contact *c* to maintain the selecting circuits locked out, closes its contact *d* in the circuit of tripping coil T of relay E10LR and closes its contact *f* to complete a point in the circuit of drive motor DM1 of entry memory device EMD.

The aforementioned deenergization of relay EHTR effects closure of its contact *b* at the lower portion of FIG. 8 to complete an energizing circuit for driving motor DM1 of entry memory device EMD. This circuit extends from conductor L6 through contacts *b* and *c* of relay EHTR, contact *e* of relay ELRA, contact *f* of relay ESLR and drive motor DM1 to conductor L5. As a result, entry memory device EMD is driven in the direction of the arrow from operating position 1 toward operating position 2. When entry memory device EMD starts to rotate, its limit switch EMDLS closes a maintaining circuit for its drive motor DM1. Limit switch EMDLS maintains operation of drive motor DM1 until entry memory device EMD reaches its next operating position whereupon limit switch EMDLS is opened thereby to stop its rotation. After a predetermined time interval sufficient for limit switch EMDLS to have closed the aforementioned maintaining circuit, timed opening contact *c* of relay EHTR opens to interrupt the original energizing circuit of drive motor DM1. When drive motor DM1 starts to rotate entry memory device EMD, its switch *a* is opened to prevent tripping of select relay E10LR and remains open until the memory device reaches its next operating position. When entry memory device EMD starts to rotate, pin P of actuator block AB in column 1 engages the operating member of solenoid 10S to pivot or set the actuator block counterclockwise into its angular position as shown in FIG. 9. After the aforementioned time interval, timed closing contact *a* of relay EHTR closes. It will be apparent that contacts *b* and *c* of timing relay EHTR initiate operation of the entry memory device. Contact *a* of relay EHTR prevents tripping of the closed select relay until entry memory device EMD starts rotating. When entry memory device EMD reaches its operating position 2, switch *a* recloses to energize tripping coil T of select relay E10LR. The energizing circuit of tripping coil T of relay E10LR extends from conductor L6 through contact *a* of relay ESLRA, switch *a* of memory device EMD, contact *d* of relay ELRA, contact *a* of relay EHTR and contact *c* of relay E10LR to conductor L5. Such tripping of relay E10LR causes reclosure of its contacts *a*, *f* and *g* and reopening of its contacts *b*, *c*, *d* and *e*. Contact *a* of relay E10LR reconnects conductor L7 to conductor L8. Contact *b* thereof opens a point in the energizing circuit of add coil A of counter CTR5. Contact *c* thereof interrupts the energizing circuit of its tripping coil T. Contact *d* thereof opens a point in the circuit of solenoid 10S of memory device EMD. Contact *e* thereof interrupts energization of relay EXCR. Contact *f* closes a point in the energizing circuit of relay LCR and contact *g* thereof closes a point in the entry shuttle conveyor manual index circuit. Deenergization of relay EXCR causes opening of its contact *a* in FIG. 6 in the circuit of contactor ESH. Relay EXCR also opens its contact *b* in FIG. 9 in the circuit of closing coil C of relay LLR1. Relay EXCR further opens its contact *c* in FIG. 10 in the circuit of closing coil C of relay LLR4.

When entry shuttle conveyor 12 approaches a point opposite storage conveyor No. 2, it engages limit switch ESDLS in FIG. 6 and closes the latter to complete an energizing circuit for closing coil C of relay ESDLR through contact *c* of the latter across conductors L4 and L5. As a result, relay ESDLR opens its contact *a* to interrupt energization of contactor ESH and relay ESHCR and closes its contact *b* to energize contactor ESL. Contactor ESH opens its contacts *a*, *b* and *c* to disconnect high-speed winding HSW of the entry shuttle conveyor motor from the power supply source and contactor ESL closes its contacts *a*, *b* and *c* to connect low speed winding LSW of the entry shuttle conveyor motor to the power supply source thereby to run the motor at a low speed. Relay ESDLR also opens its contact c to interrupt energization of its closing coil C, closes its contact d to complete a point in the energizing circuit of its tripping coil T and closes its contact e in FIG. 7 to complete a point in the energizing circuit of relay ESCR. Contactor ESH also opens its contact d without effect as contact d of contactor ESL is open. Contactor ESH closes its contact e and opens its contact f, the latter interrupting energization of relay ESHA. Contactor ESL also opens its contact e to prevent energization of dynamic braking contactor ESDB at this time. Relay ESHA opens its contact a in FIG. 8 and opens its contact b in FIG. 9. Relay ESHCR opens its contact a to interrupt the first maintaining circuit of contactor ESL and closes its contact b to complete a point in the circuit of relay ESLSA.

When entry shuttle conveyor 12 has moved one space and conveyed the first article at slow speed almost to a point opposite storage conveyor No. 2, limit switch ESLS in FIG. 7 is reengaged by the entry shuttle conveyor to open contact a and to close contact b thereof. Contact b of limit switch ESLS completes an energizing circuit through contact b of relay ESHCR for relay ESLSA across conductors L4 and L5. Contact a of limit switch ESLS opens the maintaining circuit of contactor ESL to deenergize the latter and relay ESTR. Contact a of relay ESLSA closes a point in the original energizing circuit of contactor ESH. Contact b thereof closes a point in the circuit of tripping coil T of relay ESDLR. Contact c of relay ESLSA completes an energizing circuit for relay ESCR through contact e of relay ESDLR and contact d of relay ESLSA opens in the circuit of closing coil C of relay ELR. Relay ESCR opens its contact a to open a point in the maintaining circuit of contactor ESL and relays ESHCR and ESTR. Relay ESCR closes contact b to complete a point in the circuit of closing coil C of relay ESLR and closes its contact c to complete a self-maintaining circuit in shunt of contact c of relay ESLSA.

Deenergization of contactor ESL opens its contacts a, b and c to disconnect low-speed winding LSW of motor MO10 from the power supply source. Contactor ESL also closes its contact d in the circuit of relay X and closes its contact e to complete an energizing circuit for dynamic braking contactor ESDB through contact e of contactor ESH and contacts b and a of relay ESTR, the deenergization of the latter relay having caused its contact a to be closed. Contactor ESDB closes its contacts a, b and c to apply unidirectional power from lines L2 and L3 through transformer PT2 and rectifier bridge RB1 to low speed winding LSW of motor MO10 thereby to dynamically break the motor for a predetermined time interval and to stop the entry shuttle conveyor. At the end of such time interval, timed opening contact b of relay ESTR opens to interrupt energization of contactor ESDB. It will be apparent that during the energization of contactor ESDB its contact d maintains the circuit of relay X open. Also, contact e of contactor ESDB maintains the circuit of the entry shuttle conveyor main contactors open. A predetermined time interval after relay ESTR deenergizes, its contact c closes to complete an energizing circuit for tripping coil T of relay ESDLR through contact d of the latter and contact b of relay ESLSA across conductors L4 and L5, contact c of relay ESTR being timed closing as indicated by T.C. adjacent thereto. The aforementioned dynamic braking of the entry shuttle conveyor motor causes the entry shuttle conveyor to stop after having moved one space to a point wherein the first article is opposite storage conveyor No. 2. Upon deenergization, contactor ESDB closes its contact e in the circuit of entry shuttle conveyor main contactor ESH and closes its contact d to energize relay X. Relay X closes its contact a to energize conductor L7 and conductor L8 and closes its contact b to energize tripping coil T of relay ELR in FIG. 7 through contact b of the latter. Relay ELR restores its contacts to the positions shown and at contact c deenergizes relay ELRA. Energization of conductor L8 causes energization of tripping coil T of relay LLR4 in FIG. 7 through contact a of the latter and through contact a of relay 1LS1A. It will be apparent that relay 1LS1A was deenergized to close its contact a when the article was moved by entry shuttle conveyor 12 from the point opposite storage conveyor No. 1. Relay LLR4 restores its contacts to the positions shown.

The aforementioned tripping of relay ESDLR opens its contact e to deenergize relay ESCR whereupon the contacts of the latter restore to the positions shown. Relays ESCR and ESLR are provided to protect the system in the event limit switch ESLS is over-ridden. If the entry shuttle conveyor moves too far before stopping to override limit switch ESLS, contact a of the latter recloses and contact b thereof reopens. This will prevent relay ESDLR from tripping. Relay ESCR being energized and its contact b closed, closing coil C of relay ESLR will be energized. This circuit extends from conductor L6 through contact a of limit switch ESLS, contact b of relay ESCR, contact c of relay ESLR and closing coil C of relay ESLR to conductor L5. Relay ESLR closes its contact e to energize relay ESLRA. Relays ESLR and ESLRA thereupon will lock out the entry memory device, stop the entry shuttle conveyor and lock out the close and trip coils of the select relays. More specifically, contact a of relay ESLR opens to deenergize conductor L7 thereby to lock out closing coils C of select relays E1LR, E2LR, E10LR and ELLR, contact b opens to interrupt the circuit of the entry shuttle conveyor main contactor ESL and relay ESTR to stop the shuttle conveyor, contact c opens to deenergize closing coil C of relay ESLR, contact d closes a point in the circuit of its tripping coil T and contact f opens to interrupt the circuit of drive motor DM1 of entry memory device EMD. Relay ESLRA opens contact a in FIG. 8 to interrupt the circuits of tripping coils T of select relays E2LR, E10LR and ELLR. The entry shuttle conveyor must be repositioned to close contact a and to open contact b of limit switch ESLS in order to operate the system further.

When the entry shuttle conveyor is repositioned opposite the correct storage conveyor, limit switch ESLS is engaged to open contact a and to close contact b thereof. Contact b of limit switch ESLS energizes relay ESLSA which closes its contact b to trip relay ESDLR. Contact e of relay ESDLR opens to deenergize relay ESCR. Contact b of limit switch ESLS also energizes tripping coil T of relay ESLR through contact d of the latter and contact b of relay ESHCR. As a result, the system is restored to a condition wherein another article can be selected and assigned to a storage conveyor.

Each time an additional selection is made by pressing a select switch other than select switch PS8 to assign an additional article to a storage conveyor, the system operates in the manner hereinbefore described. That is, each selection operates the corresponding select relay E2LR, E10LR and ELLR to release an article from accumulator conveyor 8, to step memory device EMD one step and to operate entry shuttle conveyor 12 to move such article one space. When select switch PS8 is pressed to assign an article to storage conveyor No. 1, the operation is different as will hereinafter appear inasmuch as entry shuttle conveyor operation is not required.

When the first article which was assigned to storage conveyor No. 10 reaches a point opposite the latter, such article engages limit switch 10LS1 to close the same in FIG. 11. It will be apparent from the above description that under these conditions entry memory device EMD in FIG. 9 will have been stepped to its operating position 10 wherein actuator block AB which was pivoted on the first selection engages limit switch E10LS to close the same. As a result, closing coil C of relay E10LR1 in FIG. 11 is energized in a circuit extending from conductor L7 in FIG. 9 through limit switch E10LS of memory device EMD and then through the conductor extending down the right-hand side of FIG. 10, through closing coil C at the bottom of FIG. 11, contact *a* of relay E10LR1, contacts *a* of relays E10LR2 and E10LR3, respectively, and limit switch 10LS1 to conductor L5. Relay E10LR1 opens its contact *a* to deenergize its closing coil C, closes its contact *b* to complete a point in the circuit of its tripping coil T, opens its contact *c* to deenergize relay E10CR and closes its contact *d* to complete a point in the circuit of contactor E10M.

Deenergization of relay E10CR opens its contact *a* in FIG. 6 to prevent operation of entry shuttle conveyor 12, opens its contact *b* in FIG. 11 in the circuit of tripping coil T of relay E10LR1 and closes its contact *c* to energize main contactor E10M. Contactor E10M closes contact *a* to complete a point in its maintaining circuit and closes contacts *b*, *c* and *d* to connect motor MO14 to the three-phase power supply source to start transfer-in conveyor 18 running. As a result, transfer-in conveyor 18 conveys the first article from entry shuttle conveyor 12 toward storage conveyor No. 10.

When transfer-in conveyor 18 starts running, it disengages limit switch 10LS2 to close the same and thereby to complete a maintaining circuit for contactor E10M through contact *a* of the latter. Limit switch 10LS2 remains closed and maintains transfer in conveyor 18 running until the latter has completed its transfer function whereupon limit switch 10LS2 reopens to stop the transfer-in conveyor as hereinafter described.

When the article is moved by the transfer-in conveyor onto storage conveyor No. 10, it engages limit switch 10LS3 to close the same. This limit switch 10LS3 prevents transfer-in conveyor 18 from being restarted until the article is clear of this area and engages limit switch 10LS4 in the following manner. Limit switch 10LS3 completes an energizing circuit for closing coil C of relay E10LR2 and closing coil C of relay E10LR3. The circuit for closing coil C of relay E10LR2 extends through contact *b* of the latter and the circuit for closing coil C of relay E10LR3 extends through contact *c* of the latter. Relay E10LR2 opens its contact *a* to prevent operation of closing coil C of relay E10LR1, closes its contact *c* to complete a point in the circuit of tripping coil T of relay E10LR2 and opens its contact *b* to deenergize its closing coil C. Relay E10LR3 opens its contact *a* to prevent operation of closing coil C of relay E10LR1, closes its contact *b* in the circuit of tripping coil T of relay E10LR1, opens its contact *c* to deenergize its closing coil C, closes its contact *d* in the circuit of its tripping coil T and closes its contact *e* to energize relay E10CR. Relay E10CR closes contact *a* in FIG. 6 in the entry shuttle conveyor main contactor circuit to permit operation of the entry shuttle conveyor, closes contact *b* in FIG. 11 to engize tripping coil T of relay E10LR1 through contact *b* of the latter and contact *b* of relay E10LR3 and opens contact *c* to interrupt the original energizing circuit of contactor E10M, the latter being maintained by limit switch 10LS2.

When transfer-in conveyor 18 has completed its cycle of operation, limit switch 10LS2 is reopened to deenergize contactor E10M. The latter disconnects motor MO14 from the three-phase power supply source to stop transfer-in conveyor 18.

When the article is conveyed along storage conveyor No. 10, it engages limit switch 10LS4 to close the same and to energize tripping coil T of relay E10LR2 through contact *c* of the latter. Relay E10LR2 restores its contacts to the positions shown in FIGS. 11 and 12. The closure of contact *a* of relay E10LR2 conditions the circuit so that transfer-in conveyor 18 can be restarted to move another article onto storage conveyor No. 10.

The article moving along storage conveyor No. 10 engages limit switch 10LS8 in FIG. 17 to close the same and energize tripping coil T of relay X10LR1 through contact *d* of the latter. Relay X10LR1 closes contact *a* to energize up-solenoid UP5 and to raise stop ST5. As a result, the article is stopped and stored on storage conveyor No. 10 although the latter runs continuously. Relay X10LR1 also opens its contact *b* to deenergize down solenoid DN5 and permit the stop to be raised, closes contact *c* in the circuit of its closing coil C, opens it contact *d* to deenergize its tripping coil T and opens its contact *e* in the circuit of tripping coil T of relay X10LR3. Opening of contact *e* of relay X10LR1 also prevents operation of closing coil C of relay X10LR2 thereby to prevent operation of transfer-out conveyor 26 until an exit selection has been made as hereinafter described.

When the article engages stop ST5 on storage conveyor No. 10, it engages limit switch 10LS7 to close the same in FIG. 17 to complete a point in the circuit of closing coil C of relay X10LR1. This closure of limit switch 10LS7 is indicative of the presence of at least one article on storage conveyor No. 10 and permits withdrawal of such article under the control of exit memory device XMD when an exit selection is made as hereinafter described. It will be apparent that unless an article is present on the storage conveyor and limit switch 10LS7 is closed thereby, exit transfer-out conveyor 26 cannot be started.

When an article is selected and assigned for storage on the last storage conveyor No. L by pressing select switch PS11, the system operates under the control of select relay ELLR in the manner hereinbefore described. To this end, an article is released from accumulator conveyor 8 and loader transfer conveyor 10 is operated to move such article onto entry shuttle conveyor 12. The entry shuttle conveyor is operated to move such article to a point opposite storage conveyor No. 2. Also, entry memory device EMD is stepped one step to keep the same in step with the entry shuttle conveyor. When entry memory device EMD reaches such position, it closes limit switch ELLS to complete an energizing circuit for relay ELLSA from conductor L7 in FIG. 9 through limit switch ELLS of the memory device and then through the conductor extending along the right-hand sides of FIGS. 9 through 12 and the operating coil of relay ELLSA to conductor L5 at the lower portion of FIG. 12. Relay ELLSA opens contact *a* to prevent energization of closing coil C of relay RLR and opens contact *b* to deenergize relay ELCR.

Referring to FIG. 12, it will be apparent that limit switch LLS1 is connected through contact *f* of automatic control relay ACR directly to conductor L7 instead of through a limit switch of the entry memory device EMD. The manner in which the system operates to transfer an article from entry shuttle conveyor 12 to storage conveyor No. L will hereinafter be described in more detail.

When a sufficient number of storage selections have been made by pressing entry select pushbuttons PS9 through PS11 so that an article assigned to the last storage conveyor No. L reaches a point on entry shuttle conveyor 12 directly opposite the latter, the entry shuttle conveyor is stopped by slowing the same and by dynamic braking as hereinbefore described.

If the entry shuttle conveyor should convey the article beyond such point, it is stopped by the photocell type overtravel limit device shown in FIG. 6. Such overtravel of the article causes the light beam from lamp PCL1 to photocell PC1 to be interrupted. As a result, photocell PC1 interrupts current flow through resistors R1 and R2. This causes the voltage at base B of transistor TR1 to be brought to the same value as the voltage at emitter E to render the transistor non-conducting and to deenergize relay EPC. Relay EPC opens its contact *a* to deenergize main contactor ESL of motor MO10 to disconnect the motor from the power supply source. Relay ESTR also deenergizes to energize dynamic braking contactor ESDB and to stop entry shuttle conveyor 12 in the manner hereinbefore described.

When the article reaches a point opposite storage conveyor No. L, it actuates limit switch LLS1 in FIG. 12 to energize closing coil C of relay ELLR1 in a circuit extending from conductor L7 through contact f of relay ACR and contacts a of relays ELLR3, ELLR2 and ELLR1, respectively, to conductor L5.

Relay ELLR1 opens contact a to deenergize its closing coil C, closes contact b in the circuit of its tripping coil T, opens contact c to maintain deenergized relay ELCR and closes contact d to energize main contactor ELM through contact c of relay ELCR. Contactor ELM closes contact a in its maintaining circuit, and closes contacts b, c and d in FIG. 13 to connect motor MO15 to the three-phase power supply source and thereby to start transfer-in conveyor 20 running. Limit switches LLS2, LLS3 and LLS4 in FIG. 2 and limit switches LLS3, LLS7 and LLS6 in FIG. 18 then operate (in the manner hereinbefore described in connection with corresponding limit switches in storage conveyor No. 10) to control the system and to store the article against stop ST5 in storage conveyor No. L.

Relay RLR is provided to control the system in the event an unscheduled article reaches a point opposite storage conveyor No. L and to signal the operator at the main operator's station. Referring to FIG. 12, it will be apparent that if an unscheduled article is conveyed by entry shuttle conveyor 12 opposite storage conveyor No. L, limit switch ELLS of the entry memory device in FIG. 9 does not close as the associated actuator block AB has not been set. Therefore, relay ELLSA in FIG. 12 remains deenergized. However, limit switch LLS1 in FIG. 9 is closed by such unscheduled article to close relay ELLR1 as hereinbefore described. Limit switch LLS1 also energizes closing coil C of relay RLR in a circuit extending from conductor L7 thorugh contact f of relay ACR, limit switch LLS1, contact a of reset switch RSS, contact j of relay MCR, contact a of relay ELLSA and contact c of relay RLR to conductor L5. Relay RLR opens its contact a in FIG. 6 to stop the entry shuttle conveyor, closes contact b in FIG. 12 to energize unscheduled article lamp UAL, opens contact c to deenergize its closing coil C and closes contact d in the circuit of its tripping coil T. Lamp UAL indicates to the operator the presence of an unscheduled article at storage conveyor No. L. The operator having noted this, makes the necessary corrections to prevent additional unscheduled articles arriving thereat, and then presses reset switch RSS to trip relay RLR whereby this portion of the system is restored to normal condition.

When an article is assigned for storage to storage conveyor No. 1, the operation is different from that hereinbefore described because storage conveyor No. 1 is on the other side of entry shuttle conveyor 12 directly opposite the incoming conveyor. For this reason, it is not necessary to operate either the entry shuttle conveyor or the entry memory device.

When an article is to be stored on storage conveyor No. 1, select pushbutton switch PS3 at the lower left-hand portion of FIG. 7 is pressed to energize closing coil C of select relay E1LR. The circuit for this closing coil extends from conductor L9 through switch E1C of counter CTR3, contact a of select switch PS3, contact d of contactor 1SM, contact a of relay ACR and closing coil C to conductor L5. Relay E1LR opens its contact a to deenergize conductors L8 and L9 and its closing coil C, opens its contact b at the lower portion of FIG. 9 to lock out entry manual index switch PS21, closes its contact c in FIG. 10 to energize relay E1LRA and closes its contact d in the circuit of its tripping coil T.

Relay E1LRA opens its contact a in FIG. 9 to deenergize relay LCR and closes its contact b in FIG. 9 to energize closing coil C of relay LLR1. The circuit of closing coil C of relay LLR1 extends also through contact a of limit switch 1LS1 and limit switch LS1 contact c of relay LLR1, contacts a of relays LLR3 and LLR2, respectively, and contact c of relay LLR4. Relay E1LRA also closes its contact c in FIG. 10 in the circuit of closing coil C of relay LLR4, closes its contact d in the circuit of closing coil C of relay E1LR1 and opens its contact e to deenergize relay E1CR.

Relay E1CR opens its contact a in FIG. 6 to prevent operation of the entry shuttle conveyor.

In the manner hereinbefore described, relay LCR opens another point in the entry shuttle conveyor main contactor circuit, opens a point in the circuit of tripping coil T of relay LLR3 and closes a point in the circuit of the main contactor of the motor of the loader transfer conveyor. Relay LLR1 energizes relay LLR1A which in turn lowers stop ST1 and closes points in the loader transfer conveyor drive circuit and in the closing coil C circuit of relay LLR2. When stop ST1 is lowered, limit switch LS2 starts loader transfer conveyor 10 to move the article from accumulator conveyor 8 onto entry shuttle conveyor 12. Limit switch LS4 is released when the loader transfer conveyor starts and maintains the latter running until it is reengaged thereby to stop the loader transfer conveyor. When the article is moved toward the entry shuttle conveyor, limit switch LS6 energizes closing coil C of relay LLR2 and energizes relay LLS3A. Relay LLS3A steps counter CTR1 one step back whereafter the incoming conveyor is started to convey another article onto accumulator conveyor 8. When this article is counted in, the incoming conveyor is again stopped. Relay LLR2 maintains the loader transfer conveyor running, locks out closing coil C of relay LLR1 and closes a point in the circuit of closing coil C of relay LLR3. When the article moves onto the entry shuttle conveyor, limit switch LS5 is actuated to maintain relay LCR deenergized and to trip relay E12LR. Then, when the article is positioned fully on the entry shuttle conveyor, limit switch 1LS1 is engaged to open its contact a and to close its contact b. The details of the circuit functions described generally in this paragraph are the same as those heretofore described in connection with the storage of an article onto storage conveyor No. 10.

The manner in which the article resting on entry shuttle conveyor 12 is transferred onto storage conveyor No. 1 will now be described in detail.

The closure of contact b of limit switch 1LS1 in FIG. 10 energizes closing coil C of relay E1LR1 through contact a of the latter and contact d of relay E1LRA. Relay E1LR1 opens contact a to deenergize its closing coil C, closes contact b in the circuit of its tripping coil T, closes contact c to energize relay E1LR1A and open contact d to prevent operation of relay E1CR.

Relay E1LR1A opens contact a and closes contact b in FIG. 9 to deenergize up solenoid UP2 and to energize down solenoid DN2 thereby to lower stop ST2 and to release the article for travel toward storage conveyor No. 1. Relay E1LR1A also closes contact c in FIG. 10 in the circuit of tripping coil T of select relay E1LR and closes contact d in the circuit of closing coil C of relay E1LR2.

When stop ST2 reaches its lower position, it engages limit switch 1LS11 to close the same. Limit switch 1LS11 energizes closing coil C of relay E1LR2 through contact c of the latter and contact d of relay E1LR1A. Relay E1LR2 opens contact a at the top of FIG. 10 to lock out contactor LM and to prevent operation of loader transfer conveyor 10 while transfer-in conveyor 14 is running. Relay E1LR2 also closes contact b in the lower portion of FIG. 10 in the circuits of tripping coils T of relays E1LR and E1LR1, opens contact c to deenergize its closing coil C, closes contact d in the circuit of its tripping coil T and opens contact e to lock out relay E1CR. Relay E1LR2 further closes contact f to energize contact E1M through contact c of relay E1LR3.

Contactor E1M closes contact a at the lower left-hand portion of FIG. 7 to permit operation of add solenoid A of counter CTR3 as hereinafter described, opens contact b at the upper portion of FIG. 10 to lock out contactor LM and closes contact c at the upper portion of FIG. 11 in its maintaining circuit. Contactor E1M also closes contacts d, e and f to connect motor MO12 to the three-phase power supply source thereby to start transfer-in conveyor 14 running. Transfer-in conveyor 14 then engages the article and moves the same from entry shuttle conveyor 12 toward storage conveyor No. 1.

When transfer-in conveyor 14 starts, it releases limit switch 1SL2 to permit the latter to close in FIG. 11 and to complete a maintaining circuit for contactor E1M through contact c of the latter. Limit switch 1LS2 maintains the transfer-in conveyor running until it has completed its transfer function and reengages limit switch 1LS2 to stop the same.

As the transfer-in conveyor moves further, it engages limit switch 1LS12 in FIG. 10 to close the same and to energize relay 1LS12A. Limit switch 1LS12 also energizes tripping coil T of relay E1LR through contact d of the latter, contact c of relay E1LR1A and contact b of relay E1LR2. Relay E1LR restores its contacts to the positions shown in FIGS. 7, 9 and 10. Limit switch 1LS12 also energizes tripping coil T of relay E1LR1 through contact b of the latter and contact b of relay E1LR2. Contact c of relay E1LR deenergizes relay E1LRA. Tripping of relay E1LR1 restores its contacts to the positions shown in FIGS. 10 and 11. Contact c of relay E1LR1 deenergizes relay E1LR1A to cause the latter to close contact a and to open contact b in FIG. 9. As a result, down solenoid DN2 is deenergized and up solenoid UP2 is energized to raise stop ST2 to block the entry end of storage conveyor No. 1.

Relay 1LS12A closes its contact a at the lower left-hand portion of FIG. 7 to energize add coil A of counter CTR3 through contact a of contactor E1M and contact b of No. 1 add switch PS16. Add coil A steps counter CTR3 one step in the clockwise direction to count and register the storage of the article into storage conveyor No. 1. The stepping of counter CTR3 from its normal zero position to operating position 1 causes closure of its switch X1C in FIG. 14. As will be apparent, switch X1C conditions the exit select circuit so that an article can be withdrawn from storage conveyor No. 1 as hereinafter described. When storage conveyor No. 1 is empty, switch X1C is open to lock out the exit select circuit.

When the article moves onto storage conveyor No. 1, it engages limit switch 1LS3 in FIG. 11 to close the latter. Limit switch 1LS3 energizes tripping coil T of relay E1LR2 through contact d of the latter. Relay E1LR2 closes contact a at the top of FIG. 10 to condition loader transfer conveyor 10 main contactor LM for operation. Relay E1LR2 opens contact b without effect, closes contact c in its closing coil C circuit, opens contact d to deenergize its tripping coil T, closes contact e to reenergize relay E1CR and opens contact f to interrupt the original energizing circuit of contactor E1M. Limit switch 1LS3 also energizes closing coil C of relay E1LR3 through contact a of the latter. Relay E1LR3 opens contact a to deenergize its closing coil C, closes contact b in the circuit of its tripping coil T and opens contact c to open another point in the original energizing circuit of contactor E1M.

When transfer-in conveyor 14 has completed its cycle of operation and returns to its normal position, it reopens limit switch 1LS2 in FIG. 11 to interrupt energization of contactor E1M. The latter opens contact a at the lower left-hand position of FIG. 7 to deenergize add coil A of counter CTR3, closes contact b at the top of FIG. 10 to recondition contactor LM for operation, opens contact c in its maintaining circuit in FIG. 11, and opens contacts d, e and f to deenergize motor MO12 and stop transfer-in conveyor 14.

When limit switch 1LS12 in FIG. 10 is disengaged and allowed to open, it deenergizes relay 1LS12A whereupon the latter opens its contact a at the lower left-hand portion of FIG. 7. When the article disengages limit switch 1LS3, the latter opens in FIG. 11. When the article engages and closes limit switch 1LS4 at the top of FIG. 11, relay E1LR3 is tripped to restore its contact to the positions shown.

The article then travels along storage conveyor No. 1 and engages and closes limit switch 1LS8 in FIG. 16 to trip relay X1LR1 and raise stop ST3 at the exit end of the storage conveyor No. 1 and engages and closes limit switch 1LS7 in FIG. 16 to prepare for release of articles from storage conveyor No. 1. Limit switch 1LS6 opens when stop ST3 is raised. The system now remains in this condition with the article resting against the stop at the exit end of storage conveyor No. 1 until an exit selection is made to initiate withdrawal of an article therefrom as hereinafter described.

*Exit Cycle*

Let it be assumed that at least one article has been stored on each storage conveyor and that it is desired to withdraw articles therefrom onto exit shuttle conveyor 30 and then convey these articles along transfer-off conveyor 32, accumulator conveyor 34, intermediate conveyor 36 and accumulator conveyor 38 to outgoing conveyor 40 and along the latter to a production line or the like.

It will be recalled from the above description that storage conveyors Nos. 1, 2, 10 and L have been started and run continuously. As a result, the articles stored on these conveyors rest against stops ST3, ST4, ST5 and ST6, respectively. The articles resting against these stops actuate limit switches 1LS7, 2LS7, 10LS7 and 10LLS7 in FIGS. 16, 17 and 18 to close the same. These stops being in their raised positions, limit switches 1LS6, 2LS6, 10LS6 and LLS6 in FIGS. 16, 17 and 18 are open. It will also be recalled from the above description that accumulator conveyors 34 and 38 are running continuously and that intermediate conveyor 36 is running. Relays X1LR1, X2LR1, X10LR1 and XLLR1 are tripped and relays X1LR3, X2LR3, X10LR3 and XLLR3 are assumed to be initially in their closed conditions with their contacts in the positions shown. Relays XSLSA and ACR are energized.

When the exit cycle was started by pressing switch PS27 in FIG. 13, relays XCSR, XPC, XX, XHTR, X1CR, X2CR, X10CR, XLCR, X1CR1, X2CR1, X10CR1, XLCR1 and UCR energized. Relays X1LR1, X2LR1, X10LR1 and XLLR1 were tripped as hereinbefore described when articles entered the respective storage conveyors. This caused energization of up solenoids UP3, UP4, UP5 and UP6 to maintain storage conveyor stops ST3, ST4, ST5 and ST6 in their raised positions.

Let it be assumed that it is desired to withdraw an article from storage conveyor No. 1. For this purpose, select switch PS32 is pressed. Pressing of exit select switch PS32 in FIG. 14 completes an energizing circuit from conductor L13 through switch X1C of counter CTR3, closing coil C of select relay X1LR and contact h of relay ACR to conductor L5. Relay X1LR closes its contact a in FIG. 13 to energize contactor XSH and relay XSTR, opens its contact b in FIG. 14 in the circuit of relay XJCR, opens its contact c to disconnect power from conductor L13 thereby to lock out the select circuits and to deenergize its closing coil C, closes its contact d in FIG. 15 in the circuit of its tripping coil T and closes its contact e to energize solenoid 1S of exit memory device XMD. The circuit for contactor XSH extends from conductor L11 through contacts a of relays X1LR, ALR1, XLCR, X10CR, X2CR, X1CR, UCR, XLRA, XPC and XSDLR and contact d of contactor XSDB.

Energization of contactor XSH causes closure of its contacts a, b and c to connect high speed winding HSW of motor MO16 to the three-phase source and to start exit shuttle conveyor 30 running at a high speed. Contactor XSH also opens its contact d to prevent energization of dynamic braking contactor XSDB at this time, closes its contact e in FIG. 14 to energize relay XSHA and to complete a point in the circuit of closing coil C of relay XLR, and opens its contact f to deenergize relay XX.

Relay XSTR closes timed opening contact a, opens contact b and opens timed closing contact c in FIG. 14. Solenoid 1S in the lower portion of FIG. 15 upon being energized operates its actuator to prepare the same, when device XMD starts to rotate to act upon pin P of actuator block AB at the left end, that is in the column before column L of the lower row of actuator blocks to pivot the latter and thereby to prepare the same for closure of limit switch X1LS when it engages the latter as hereinafter described. Relay XSHA closes its contact a in FIG. 13 to complete a maintaining circuit for contactor XSH to maintain the exit shuttle conveyor running. This circuit extends also through contact a relay XSLSA in shunt of contacts a of relays X1CR, X2CR, X10CR and XLCR. Relay XSHA also closes its contact b in the manually operable exit shuttle index circuit in the upper portion of FIG. 14. Relay XX opens its contact a in the circuit of tripping coil T of relay XLR and opens its contact b to lock out the select circuits by deenergizing conductors L12 and L13.

When exit shuttle conveyor 30 starts running, it disengages limit switch XSLS in FIG. 13 to complete a second maintaining circuit at its contact a for main contactor XSH through contacts a of relays XSCR, XSLR, XPC and XSDLR and contact d of contactor XSDB. Limit switch XSLS remains closed until the exit shuttle conveyor has moved one space whereupon limit switch XSLS is reengaged to stop the exit shuttle conveyor. Contact b of limit switch XSLS in FIG. 14 opens to deenergize relay XSLSA.

Relay XSLSA opens its contact a in FIG. 13 to interrupt the first mentioned maintaining circuit of contactor XSH, opens its contact b in the circuit of tripping coil T of relay XSDLR, opens its contact c to lock out the manual index circuit in FIG. 14, opens its contact d to lock out relay XSCR, closes its contact e to energize closing coil C of relay XLR, opens its contact f to maintain the select circuits locked out, closes its contact g in FIG. 15 in the circuit of driving motor DM2 of exit memory device XMD, and opens its contact h in FIG. 18 to prevent energization of closing coil C of relay ALR1.

Relay XLR in FIG. 14 opens its contact a to deenergize its closing coil C, closes its contact b in the circuit of its tripping coil T and closes its contact c to energize relay XLRA. Relay XLRA opens its contact a in FIG. 13 in the original energizing circuit of contactor XSH, opens its contact b in FIG. 14 to maintain the select circuits deenergized, opens its contact c to deenergize relay XHTR, closes its contact d in FIG. 15 in the circuit of tripping coils T of select relays X1LR, X2LR, X10LR and XLLR, and closes its contact e in FIG. 15 in the circuit of drive motor DM2 of exit memory device XMD.

Relay XHTR closes its contact c in FIG. 15 to energize driving motor DM2 to rotate exit memory device XMD one step in the direction of the arrow. When exit memory device XMD starts to rotate, its limit switch XMDLS closes a maintaining circuit for its drive motor DM2. Limit switch XMDLS maintains operaton of drive motor DM2 until exit memory device XMD reaches its next operating position whereupon limit switch XMDLS is opened thereby to stop its rotation. After a predetermined time interval sufficient for limit switch XMDLS to have closed the aforementioned maintaining circuit, timed opening contact b of relay XHTR opens to interrupt the original energizing circuit of drive motor DM2. When drive motor DM2 starts to rotate exit memory device XMD, its switch a is opened to prevent tripping of select relay X1LR and remains open until the memory device reaches its next operating position. When exit memory device XMD starts to rotate, pin P of the first actuator block AB in the first column thereof engages the actuator member of solenoid 1S to pivot or set the actuator block counterclockwise into its angular position. After the aforementioned time interval, timed closing contact a of relay XHTR closes. It will be apparent that contacts b and c of timing relay XHTR initiate operation of the exit memory device. Contact a of relay XHTR prevents tripping of the closed select relay until exit memory device XMD starts rotating. When the exit memory device reaches its operating position 2, switch a recloses to energize tripping coil T of relay X1LR. Relay X1LR restores its contacts to the positions shown in FIGS. 13, 14 and 15, its contact e interrupting energization of solenoid 1S of exit memory device XMD.

The aforementioned pivoting of the actuator block of exit memory device XMD constituted a reservation of a space on the exit shuttle conveyor for an article to be received from storage conveyor No. 1. The space that is reserved each time a select switch is pressed is the space that is opposite storage conveyor No. L after the exit shuttle conveyor has moved one space. When a sufficient number of selections have been made so that this reserved space reaches the selected storage conveyor, an article is withdrawn therefrom onto the exit shuttle conveyor in the manner hereinafter described.

When exit shuttle conveyor 30 approaches the end of its one-space movement, it engages limit switch XSDLS at the upper left-hand portion of FIG. 14 to close the same. As a result, closing coil C of relay XSDLR is energized through contact c of the latter. Relay XSDLR opens its contact a to deenergize contactor XSH and closes its contact b to energize contactor XSL. As a result, high speed winding HSW is disconnected and low speed winding LSW of motor MO16 is connected to the three-phase source to reduce the speed of exit shuttle conveyor 30. Relay XSDLR also opens contact c to deenergize its closing coil C, closes contact d in the circuit of its tripping coil T and closes contact e in the circuit of relay XSCR. Exit shuttle conveyor 30 then reengages limit switch XSLS to open contact a and to close contact b of the latter. Contact a of limit switch XSLS deenergizes contactor XSL and relay XSTR and contact b thereof energizes relay XSLSA. Contactor XSL restores its contacts to the positions shown in FIGS. 13 and 14.

Relay XSTR closes its contact b to energize dynamic braking contactor XSDB through contact a of relay XSTR and contacts d of contactors XSH and XSL.

Contactor XSDB closes its contacts a, b and c to connect direct current to low speed windings LSW of motor MO16 to dynamically brake the motor and to stop the exit shuttle conveyor. Contactor XSDB also opens its contact d to prevent energization of contactors XSH and XSL and opens its contact e to prevent energization of relay XX.

Relay XSTR opens its contact a after a predetermined time interval sufficient to allow stopping of motor MO16 under dynamic braking thereby to deenergize contactor XSDB and restore its contacts to the positions shown. Contact e of contactor XSDB energizes relay XX through contacts f and e of contactors XSH and XSL, respectively. Relay XX closes contact a to energize tripping coil T of relay XLR in a circuit extending through contact b of the latter, contacts c of select relays X1LR, X2LR, X10LR and XLLR, contact b of relay XCCR and cancel switch PS31. Relay XLR at contact c deenergizes relay XLRA to cause the contacts of the latter to restore to the positions shown in FIGS. 13 and 14.

The aforementioned energization of relay XSLSA causes closure of its contact a in FIG. 13, closure of its contact b in the circuit of tripping coil T of relay XSDLR, closure of its contact c, closure of its contact d to energize relay XSCR, opening of its contact e, closure of its contact f and opening of its contact g in FIG. 15.

Relay XSCR opens its contact a in FIG. 13, closes its contact b in the circuit of closing coil C of relay XSLR, and closes its contact c in shunt of contact d of relay XSLSA to maintain itself energized. A predetermined time interval after deenergization of relay XSTR as aforedescribed, contact c thereof closes to energize tripping coil T of relay XSDLR. Relay XSDLR restores its contacts to the positions shown, its contact e deenergizing relay XSCR.

It will be apparent that relay XSCR was energized and deenergized without effect as described above. Relay XSCR is provided to control the system in the event the exit shuttle conveyor overrides limit switch XSLS as hereinafter described. If limit switch XSLS is overridden, relay XSDLR will not trip because contact b of relay XSLSA reopens. Closing coil C of relay XSLR in FIG. 13 will energize through contact a of limit switch XSLS, contact b of relay XSCR and contact b of relay XSLR. Contact d of relay XSLR will energize relay XSLRA. Relay XSLR will open contact a to stop the exit shuttle conveyor, open contact b to deenergize its closing coil C and close contact c in the circuit of its tripping coil T. Relay XSLRA will open its contact a to lock out the closing coils C of the select relays by deenergizing conductors L12 and L13, open its contact b in FIG. 15 to lock out tripping coils T of the select relays and open its contact c in FIG. 15 to lock out drive motor DM2 of the exit memory device. This will prevent operation of the system until the exit shuttle conveyor is repositioned to its proper position causing actuation of limit switch XSLS.

The system operates in the manner hereinbefore described each time a select switch is pressed. That is, the exit memory device is operated to reserve a space on the exit shuttle conveyor and the exit shuttle conveyor is operated to move one space in the right-hand direction as seen in FIG. 1.

When sufficient selections have been made so that the space reserved on the exit shuttle conveyor for an article to be withdrawn from storage conveyor No. 1 reaches a point directly opposite the latter, exit memory device XMD will also have been rotated or stepped in unison with the exit shuttle conveyor movements to a position wherein the pivoted actuator block AB in the lower row thereof engages and closes limit switch X1LS in FIG. 15. Limit switch 1LS7 in FIG. 16 having been closed by an article resting against stop ST3, closing coil C of relay X1LR1 is energized in a circuit extending from conductor L12 in FIG. 15 through limit switches X1LS, 1LS7 and 1LS10, contact a of relay X1LR2 in FIG. 16, contact c of relay X1LR1 and closing coil C to line L5.

Relay X1LR1 opens contact a to deenergize up solenoid UP3 and closes contact b to energize down solenoid DN3 to lower stop ST3 of storage conveyor No. 1 to release an article from the latter. Relay X1LR1 also opencontact c to deenergize its closing coil C, closes contact d in the circuit of this tripping coil T and closes its contact e in the circuit of closing coil C of relay X1LR2.

When stop ST3 reaches its lower position, it engages and closes limit switch 1LS6 in FIG. 16, to energize closing coil C of relay X1LR2 in a circuit extending from limit switch 1LS10 through contact e of relay X1LR1 and contact b of relay X1LR2. As storage conveyor No. 1 runs continuously, lowering of the stop also causes an article to be moved onto exit transfer-out conveyor 22. Closure of limit switch 1LS6 also causes energization of tripping coil T of relay X1LR3 through contact b of the latter, contact b of relay 1LS10A and contact e of relay X1LR1 to limit switch 1LS6. Limit switch 1LS7 opens.

Relay X1LR2 opens contact a in the circuit of closing coil C of relay X1LR1, opens contact b to deenergize its closing coil C, closes contact c in the circuit of its tripping coil T, opens contact d to deenergize relay X1CR and closes contact e to energize main contactor X1M across conductors L12 and L5. Relay X1LR3 closes contact a in the circuit of its closing coil C, opens contact b to deenergize its tripping coil T and opens contact c in the circuit of relay X1CR.

Relay X1CR opens its contact a in FIG. 13 to lock out and prevent operation of exit shuttle conveyor 30. Contactor X1M closes its contacts a, b and c to connect motor MO17 to the three-phase power supply source to start exit transfer-out conveyor 22 running. When exit transfer-out conveyor 22 starts moving, it disengages limit switch 1LS5 to cause the latter to close and complete a maintaining circuit for contactor X1M. When the ram of transfer-out conveyor 22 moves the article over exit shuttle conveyor 30, it engages limit switch 1LS9 to close contact a thereof in FIG. 14 and to open contact b thereof in FIG. 16. Contact a of limit switch 1LS9 energizes subtract coil S of counter CTR3 at the lower right-hand portion of FIG. 7, the circuit therefor extending through contact b of pushbutton switch PS36, and the conductor extending along the right-hand sides of FIGS. 8 through 14. As a result, counter CTR3 is stepped one step in the counterclockwise direction to register the withdrawal of one article from storage conveyor No. 1. Contact b of limit switch 1LS9 in FIG. 16 maintains relay X1CR deenergized. Contact a of limit switch 1LS9 also energizes tripping coil T of relay X1LR2 through contact c of the latter. Relay X1LR2 closes contacts a, b and d and opens contacts c and e.

As storage conveyor No. 1 moves the article onto exit transfer-out conveyor 22, the next article engages limit switch 1LS8 in FIG. 16 to energize tripping coil T of relay X1LR1 through contact d of the latter. Relay X1LR1 opens contact b to deenergize down solenoid DN3 and closes contact a to energize up solenoid UP3 to raise stop No. 1 and to stop the next article. Relay X1LR1 also closes contact c and opens contacts d and e. Raising of the stop causes limit switch 1LS6 to reopen.

When the first article reaches its position on exit shuttle conveyor 30, it engages limit switch 1LS10 in FIG. 16 to open contact a and to close contact b thereof. Contact a of limit switch 1LS10 prevents operation of closing coil C of relay X1LR1 and contact b thereof energizes relay 1LS10A. Relay 1LS10A closes contact a to energize closing coil C of relay X1LR3, opens contact b in the circuit of tripping coil T of relay X1LR3 and closes contact c in FIG. 19 in the circuit of closing coil C of relay ALR2. Relay X1LR3 opens contact a to deenergize its closing coil C, closes contact b in the circuit of its tripping coil T, closes contact c to energize relay X1CR, closes its contact d in FIG. 19 and opens its contact e. Relay X1CR closes its contact a in FIG. 13 to prepare the exit shuttle conveyor for operation.

When transfer-out conveyor 22 has completed its cycle of operation, it reengages limit switch 1LS5 to open the same and to deenergize contactor X1M. As a result, motor MO17 is disconnected from the power supply source to stop transfer-out conveyor 22.

When another exit selection has been made causing movement of exist shuttle conveyor 30 one space in the right-hand direction and movement of such first article to the right-hand end of the exit shuttle conveyor into registration with unload transfer-off conveyor 32 as shown in FIG. 1, the article that was withdrawn from storage conveyor No. 1 engages limit switch ULS2 in FIG. 19 to close contact a and to open contact b thereof. Contact a of limit switch ULS2 energizes closing coil C of relay ULR1 through contact m of relay ACR, contact a of relay ULR2 and contact a of relay ULR1. Contact b of limit switch ULS2 deenergizes relay UCR.

Relay UCR opens its contact a in FIG. 13 to lock out the exit shuttle conveyor drive circuit. Relay ULR1 opens contact a to deenergize its closing coil C, closes its contact c to maintain relay UCR deenergized and contact b in the circuit of its tripping coil T, opens its contact d to energize main contactor UM. The circuit of contactor UM extends through contact e of relay ULR2 and contact d of relay ULR1 and then in parallel through contact *d* of relay ULR3 and contact *d* of intermediate conveyor motor main contactor IM. Contactor UM closes contact *a* in its maintaining circuit and closes contacts *b*, *c* and *d* to connect motor MO21 to the three-phase power supply source thereby to start transfer-off conveyor 32 running.

When transfer-off conveyor 32 starts moving, it disengages limit switch ULS1 in FIG. 19 to cause closure thereof and to complete a maintaining circuit for contactor UM through contact *a* of the latter and then in parallel through contact *d* of relay ULR3 and contact *d* of contactor IM. Limit switch ULS1 maintains contactor UM energized until the transfer-off conveyor has completed its cycle of operation and reengages limit switch ULS1 to open the same and to deenergize contactor UM to stop the transfer-off conveyor.

When the article moves along transfer-off conveyor 32, it engages limit switch ULS3 in FIG. 19 to energize closing coil C of relay ULR2. Relay ULR2 opens contact *a* in the circuit of closing coil C of relay ULR1, closes contact *b* to energize tripping coil T of relay ULR1 through contact *b* of the latter and limit switch ULS3, opens contact *c* to deenergize its closing coil C, closes contact *d* in the circuit of its tripping coil T, opens contact *e* to interrupt the original energizing circuit of contactor UM and closes contact *f* in shunt of contacts *d* of relay ULR3 and contactor IM, respectively. Limit switch ULS2 is disengaged to open contact *a* and to close contact *b* thereof.

Accumulator conveyor 34 runs continuously and moves the article from unload transfer-off conveyor 32 toward intermediate conveyor 36. The article engages limit switch ULS4 to energize closing coil C of relay ULR3 through contact *b* of the latter. Relay ULR3 closes contact *a* to energize tripping coil T of relay ULR2 through contact *d* of the latter and limit switch ULS4, opens contact *b* to deenergize its closing coil C, closes contact *c* in the circuit of its tripping coil T and opens contact *d* in the original energizing circuit of contactor UM. Relay ULR2 restores its contacts to the positions shown in FIG. 19.

The article travels from accumulator conveyor 34 over the aforementioned idle portion onto intermediate conveyor 36 and closes and reopens limit switch ULS5 to trip relay ULR3. Also, when unload transfer-off conveyor 32 has completed its cycle of operation and returns to its normal position, it reengages limit switch ULS1 to open the same. As a result, limit switch ULS1 deenergizes contactor UM to stop the unload transfer-off conveyor. Contact *d* of contactor IM maintains contactor UM energized while relay ULR2 is tripping and relay ULR3 is closing.

If exit select switch PS33 at the lower portion of FIG. 14 is pressed, the system operates in the manner hereinbefore described except that the circuit elements associated with storage conveyor No. 2 operate instead of the circuit elements associated with storage conveyor No. 1. For example, solenoid 2S of exit memory device XMD in FIG. 15 pivots the actuator block AB then adjacent the solenoid to reserve a space on exit shuttle conveyor 30. And when sufficient selections have been made, the article is released from storage conveyor No. 2 and moved onto the exit shuttle conveyor under the control of the circuit shown in the lower portion of FIG. 16 and the upper portion of FIG. 17.

The system operates in a similar manner when switches PS34 and PS35 at the upper portion of FIG. 15 are pressed to withdraw articles from storage conveyors Nos. 10 and L. In each case, the exit shuttle conveyor moves one space in the right-hand direction as shown in FIG. 1 and exit memory device XMD is stepped once to retain a memory of the reserved space.

*Select All*

If it is desired to select an article from all of the storage conveyors, select all switch SA, portions of which are shown in FIGS. 13, 14 and 18, is turned from its SINGLE operating position to its ALL operating position wherein contacts *a* and *c* are closed and contacts *b* and *d* are opened. As a result, contactor XSH is energized in a circuit extending from conductor L11 in FIG. 13 through contact *a* of switch SA, contact *a* of relay ALR1, contacts *a* of relays XLCR, X10CR, X2CR, X1CR, UCR, XLRA, XPC and XSDLR and contact *d* of contactor XSDB to conductor L5. This causes operation of exit shuttle conveyor 30 as hereinbefore described. When the exit shuttle starts, limit switch XSLS operates relay XSLSA in FIG. 14 as hereinbefore described. Relay XSLSA closes its contact *h* in FIG. 18 in the circuit of closing coil C of relay ALR1. Exit memory device XMD in FIG. 15 is stepped once as hereinbefore described. When the exit shuttle conveyor moves, limit switch XSLSB in the lower right-hand portion of FIG. 18 closes to energize count coil CT of counter CTR7. Each time that the exit shuttle conveyor is stopped by dynamic braking contactor XSDB, it is restarted by contact *d* of the latter when contactor XSDB is deenergized as hereinbefore described. In this manner, the exit shuttle conveyor indexes or moves intermittently a number of times equal to the number of storage conveyors plus one. This causes counter CTR7 to close its switch *a* to energize closing coil C of relay ALR1. This circuit extends through contact *c* of switch SA, contact *b* of relay ALR1, switch *a* of counter CTR7 and contact *h* of relay XSLSA to closing coil C of relay ALR1.

Relay ALR1 opens its contact *a* in FIG. 13 to prevent operation of the exit shuttle conveyor, opens its contact *b* in FIG. 18 to prevent operation of count coil CT of counter CTR7, closes its contact *c* in the circuit of its trip coil T, closes its contact *d* and closes its contact *e* in FIG. 19.

It is then necessary to press all-transfer switch PS40 in FIG. 19 to energize relay A1CR through contacts *e* of relays X1LR3, X2LR3, X10LR3, XLLR3 and ALR1, contact *d* of relay XCCR and contact *d* of relay ALR2. Relay A1CR closes contacts *a*, *b*, *c* and *d* in FIGS. 16, 17 and 18 to lower stops ST3, ST4, ST5 and ST6 and to start exit transfer out conveyors 22, 24, 26 and 28 as hereinbefore described to transfer an article from each storage conveyor onto exit shuttle conveyor 30. In order to do this, it is necessary that there be an article against each stop ST3, ST4, ST5 and ST6 so that limit switches 1LS6, TLS6, 10LS6 and LLS6 in FIGS. 16, 17 and 18 are closed.

When the articles engage limit switches 1LS10, 2LS10, 10LS10 and LLS10, relays X1LR3, X2LR3, X10LR3 and XLLR3 close as hereinbefore described to energize closing coil C of relay ALR2 in FIG. 19 through contacts *d* of these relays, contact *d* of relay ALR1 and contact *b* of relay ALR2.

Relay ALR2 closes contact *a* in FIG. 13 to start exit shuttle conveyor 30 running. It will be apparent that contact *a* of relay ALR2 closes in shunt of contact *a* of switch SA and contact *a* of relay ALR1 in the circuit of contactor XSH. Relay ALR2 also opens contact *b* in FIG. 19 to deenergize its closing coil C, closes contact *c* in the circuit of its tripping coil T and opens contact *d* to prevent energization of relay A1CR, the latter having deenergized when relays X1LR3, X2LR3, X10LR3 and XLLR3 were hereinbefore closed.

The exit shuttle conveyor now indexes or intermittently moves in the right-hand direction as shown in FIG. 1 until all the articles are removed therefrom by unload transfer-off conveyor 32. It will be apparent that each time exit shuttle conveyor 30 moves one space to convey an article to the right-hand end thereof, limit switch ULS2 deenergizes relay UCR in FIG. 19 and the latter opens its contact *a* in FIG. 13 to stop the exit shuttle conveyor. When unload transfer-off conveyor 32 removes such article, relay UCR reenergizes to restart the exit shuttle conveyor.

When all the articles have been removed from the exit shuttle conveyor, limit switches 1LS10, 2LS10, 10LS10 and LLS10 in FIGS. 16, 17 and 18 are open and relays 1LS10A, 2LS10A, 10LS10A and LLS10A deenergize to trip relays X1LR3, X2LR3, X10LR3 and XLLR3. As a result, contacts e of the latter close in FIG. 19 to energize tripping coil T of relay ALR2. Relay ALR1 is tripped by contact d of switch SA when the latter is turned back to its SINGLE position. This restores the system to its normal condition.

In the event it is desired to cancel an entry selection after it has been made, entry cancel switch PS22 in FIG. 10 is pressed to energize entry cycle cancel relay ECCR. Relay ECCR opens contact a in FIG. 6 to lock out the entry shuttle conveyor, opens contact b in FIG. 7 to deenergize conductors L8 and L9 and thereby to lock out the select circuits, closes contact c in FIG. 8 to energize tripping coil T of select relay E2LR, E10LR or ELLR if such relay is closed, opens contact d in the lower portion of FIG. 9 to lock out entry index switch PS21, and closes contact e in FIG. 10 to trip select relay E1LR if it is closed. The selection can be canceled in this manner only before the article reaches entry shuttle conveyor 12 and actuates limit switch 1LS1. After limit switch 1LS1 is closed by an article, the selection can no longer be canceled. This is for the reason that limit switch 1LS1 initiates lowering of stop ST2 if storage conveyor No. 1 has been selected or initiates starting of entry shuttle conveyor 12 if one of the other storage conveyors has been selected in the manner hereinbefore described.

In the event it is desired to cancel an exit selection after it has been made, exit cancel switch PS31 in FIGS. 14 and 15 is pressed to open contact a and to close contact b thereof. Contact a of the cancel switch locks out the exit select circuits. Contact b of the cancel switch energizes exit cycle cancel relay XCCR. Relay XCCR opens contact a in FIG. 14 to lock out relay XJCR thereby to prevent operation of the exit shuttle conveyor from exit index switches PS29 or PS30. Relay XCCR opens contact b in FIG. 14 to lock out the select circuits and closes contact c in FIG. 15 to energize the tripping coil T of the closed select relay X1LR, X2LR, X10LR or XLLR and opens contact d in FIG. 19. This cancellation of a given exit selection can be made during the time following the stopping of the exit shuttle conveyor and while a previously selected article is being transferred from a storage conveyor onto the exit shuttle conveyor and while the exit shuttle conveyor is awaiting the all clear signal from the transfer-out conveyors, that is, reclosure of contacts a of relays X1CR, X2CR, X10CR and XLCR in FIG. 13, whereafter the exit shuttle conveyor can be restarted.

*Manual Operation*

When selector switch RS in FIG. 7 is turned to its MAN. operating position to close contact b and to open contact a, manual control relay MCR energizes. Relay MCR closes its contacts a and b in FIG. 9 in the circuits of contacts a and b of load start switch PS20. Relay MCR closes its contact c at the top of FIG. 10 to shunt contact b of relay LCR. Relay MCR closes its contact d in the middle of FIG. 10 to shunt contact c of relay EXCR. Relay MCR closes contact e in the lower portion of FIG. 10 in the circuit of No. 1 start switch PS23. Relay MCR closes contact f in the FIG. 11 in the circuit of start switches PS24, PS25 and PS26. Relay MCR closes its contact g in FIG. 13 in the circuit of exit cycle start switch PS28 to permit control of the exit cycle from exit manual operator's control station panel 4 in FIG. 3. Relay MCR closes contact h in FIG. 14 to bypass contacts b of the exit select relays. Relay MCR closes its contact i in the lower portion of FIG. 15 in the circuit of exit start switches PS41, PS42, PS43 and PS44 and unload start switch PS45 in FIGS. 16, 17, 18 and 19 and opens contact j in the lower portion of FIG. 12 to lock out relay RLR.

When relay MCR is energized as aforesaid, load start switch PS20 in FIG. 9 can be pressed to lower stop ST1 and to transfer an article from accumulator conveyor 8 to entry shuttle conveyor 12. Also, No. 1 start, No. 2 start, No. 10 start and No. L start switches PS23, PS24, PS25 and PS26 in FIGS. 10, 11 and 12 can be pressed to cause articles to be moved at appropriate times from entry shuttle conveyor 12 to the respective storage conveyors. It will be recalled that stop ST1 is normally in its lower position. When articles enter accumulator conveyor 8, limit switch LS3 in FIG. 9 closes to trip relay LLR1. This causes stop ST1 to be raised as hereinbefore described. When load start switch PS20 is pressed, contact b thereof closes relay LLR1 to cause stop ST1 to be lowered and to release an article from accumulator conveyor 8. It will be apparent that contact b of load start switch PS20 closes a circuit in shunt of contact b of relay EXCR, the latter being the relay which controls stop ST1 under automatic operation. Contact a of load start switch PS20 energizes relay E12LR to lock out the entry shuttle conveyor during operation of loader transfer conveyor 10. When stop ST1 reaches its lower position, loader transfer conveyor 10 is started by closure of limit switch LS2 in FIG. 10. Contactor LM energizes in a circuit extending through contact b of switch PS20 and contact b of relay MCR in FIG. 9 and then through limit switch LS2 in FIG. 10, contact c of relay MCR, contact c of relay LLR1A and contact a of relay E1LR2. Contactor LM starts motor MO11 to operate the loader transfer conveyor as hereinbefore described.

If it is desired to index entry shuttle conveyor 12, that is, to move the entry shuttle conveyor one space, entry index switch PS21 in the lower left-hand portion of FIG. 9 is pressed to energize relay EJCR. Relay EJCR closes contact a in FIG. 6 to complete a circuit in shunt of contact a of relay EXCR, contact a of relay ESLR, contact a of relay ESLSA and contact a of relay X. Relay EJCR also opens contact b in FIG. 7 to lock out the select circuits and closes contact c in FIG. 10 in shunt of switch PS21 to maintain itself energized. The entry shuttle conveyor is started when contact a of relay EJCR closes as aforesaid and then operates under the control of limit switches ESLS and ESDLS to move one space as hereinbefore described.

When the article is positioned on entry shuttle conveyor 10, one of the start switches PS24, PS25 or PS26 in FIGS. 11 and 12 may be pressed to operate the entry transfer-in conveyor circuits as hereinbefore described. It will be apparent that if No. 2 start switch PS24, for example, is pressed, a circuit is completed from conductor L7 through contact f of relay MCR to closing coil C of relay E2LR1 to energize the latter. This circuit is in shunt of limit switch E2LS of entry memory device EMD in FIG. 9 which controls starting of transfer-in conveyor 16 under automatic operation. The circuit in the mid-portion of FIG. 11 then operates in the manner hereinbefore described to operate motor MO13 and transfer-in conveyor 16 to transfer the article from entry shuttle conveyor 12 to storage conveyor No. 2. If No. 1 start switch PS23 in FIG. 10 is pressed, relays E1LR1 and E1LR1A control lowering of stop ST2. When stop ST2 is lowered, relay E1LR2 controls starting of entry transfer in conveyor 14 to move the article onto storage conveyor No. 1. During this time, relay E1CR locks out entry shuttle conveyor 12.

In FIG. 13, when contact g of manual control relay MCR is closed, start switch PS28 and emergency stop switch SS28 afford control of the exit cycle from exit manual operator's station control panel 4. When contact i of relay MCR in the lower left-hand portion of FIG. 15 is closed, No. 1 start switch PS41, No. 2 start switch PS42, No. 10 start switch PS43 and No. L start switch PS44 in FIGS. 16 and 17 can be pressed to cause lowering of the stop ST3, ST4, ST5 or ST6 of the corresponding storage conveyor and to control the associated transfer-out conveyor to move an article from the storage conveyor onto exit shuttle conveyor 30. For this purpose, the start switch closes a circuit in shunt of the limit switch of exit memory device XMD and the remainder of the transfer-out conveyor operation is similar to that hereinbefore described. When contact h of relay MCR in FIG. 14 is closed, the exit shuttle conveyor can be indexed or caused to be moved one space by pressing switch PS29 on main operator's station control panel 2 or switch PS30 on exit manual operator's station control panel 4 in FIGS. 2 and 3, these exit index switches being also shown in FIG. 14. Closure of either switch PS29 or PS30 which are connected in parallel causes energization of relay XJCR in a circuit extending through contact a of relay XCCR, contact h of relay MCR and contact c of relay XSLSA. Relay XJCR closes contact a in FIG. 13 in shunt of contacts a of exit select relays X1LR, X2LR, X10LR and XLLR, opens contact c in FIG. 14 to lock out the select circuits and closes contact b in FIG. 14 in shunt of switches PS29 and PS30 to maintain itself energized. The exit shuttle conveyor is started when contact a of relay XJCR is closed and then operates under the control of limit switches XSLS and XSDLS to move one space as hereinbefore described.

When exit shuttle conveyor 30 has been indexed so that an article reaches the right-hand end thereof at least one space beyond the point directly opposite storage conveyor No. 1 and such article actuates limit switch ULS2 to close contact a and to open contact b of the latter, unload transfer-off conveyor 32 can be started by pressing unload start switch PS45 on exit manual operator's station control panel 4 in FIG. 3, switch PS45 being also shown in FIG. 19. Closure of switch PS45 completes an energizing circuit from conductor L4 through contact i of relay MCR in the lower left-hand portion of FIG. 15 and then through conductor L14, switch PS45, contact a of limit switch ULS2, contacts a of relays ULR2 and ULR1 and closing coil C of relay ULR1 to conductor L5. The circuit in the lower portion of FIG. 19 then operates in the manner hereinbefore described to control motor MO21 and to operate unload transfer-off conveyor 32 to move the article from exit shuttle conveyor 30 toward accumulator conveyor 34.

It will be apparent that if an article should inadvertently overshoot the last space at the right-hand end of exit shuttle conveyor 30, limit stop control device LSC2 shown in FIGS. 1 and 13 operates to deenergize its relay XPC to stop the exit shuttle conveyor in the same manner as hereinbefore described in connection with limit stop control device LSC1.

The system hereinbefore described is especially adapted to provide a buffer zone ahead of assembly lines for a plurality of automobile bodies of different types such as two-door, four-door, hardtop, convertible, etc. In such use, bodies of only one type would be stored on a storage conveyor. Therefore, if one assembly line has to be closed down because of a shortage of parts or the like for one type of body, these bodies can be stored on the storage conveyors and other types of bodies can still be withdrawn so that the other assembly lines can continue operating.

I claim:

1. In a conveyor system having a buffer storage area including a plurality of storage conveyors for storing articles that are in transit between an incoming conveyor and an outgoing conveyor; means for routing successive articles from the incoming conveyor to selected storage conveyors for storage pending withdrawal thereof comprising:

an intermittently operable entry conveyor extending past the entry ends of the storage conveyors and having an article receiving position accessible to articles from the incoming conveyor and being effective in response to each operation thereof to move one increment;

the entry ends of the storage conveyors being spaced from the article receiving position of said entry conveyor according to whole number multiples of said increment so that said entry conveyor between movements thereof stops articles in registration with the storage conveyors;

a plurality of selectively operable entry control devices for initiating storage of articles and being operable to establish the storage conveyor destinations of successive articles in accordance therewith;

and storage control means controllable by said entry control devices comprising:

means responsive to operation of selected entry control devices in succession for causing movement of successive articles from the incoming conveyor into the article receiving position of said entry conveyor in accordance therewith;

means operable concurrently with the last mentioned means for registering the storage conveyor destinations of such articles;

means for causing operation of said entry conveyor one said increment after each article is moved thereon;

means operable when any article on said entry conveyor has been moved sufficient increments to reach its destination storage conveyor according to said destination registrations for moving such article onto the corresponding storage conveyor during the stopping period of the entry conveyor;

and said means responsive to operation of selected entry control devices in succession for causing movement of successive articles from the incoming conveyor into the article receiving position of said entry conveyor comprising:

means for causing said incoming conveyor to run continuously to supply articles to said entry conveyor in accordance with the operation of said entry control devices;

and means responsive to articles approaching said entry conveyor when said entry control devices are not being operated for stopping said incoming conveyor.

2. The invention defined in claim 1, wherein said means responsive to articles approaching said entry conveyor when said entry control devices are not being operated for stopping said incoming conveyor comprises:

an accumulator conveyor having an article stop thereon between said incoming conveyor and said entry conveyor and being normally effective to stop and accumulate a predetermined number of articles when said entry control devices are not being operated;

and means on said accumulator conveyor responsive to the last article of said predetermined number thereof for causing stopping of said incoming conveyor until an article is released by said stop.

3. In a conveyor system having a buffer storage area including a plurality of storage conveyors for storing articles that are in transit between an incoming conveyor and an outgoing convyeor; means for routing successive articles from the incoming conveyor to selected storage conveyors for storage pending withdrawal thereof comprising:

an intermittently operable entry conveyor extending past the entry ends of the storage conveyors and having an article receiving position accessible to articles from the incoming conveyor and being effective in response to each operation thereof to move one increment;

the entry ends of the storage conveyors being spaced from the article receiving position of said entry conveyor according to whole number multiples of said increment so that said entry conveyor between movements thereof stops articles in registration with the storage conveyors;

a plurality of selectively operable entry control devices for initiating storage of articles and being operable to establish the storage conveyor destinations of successive articles in accordance therewith;

and storage control means controllable by said entry control devices comprising:

means responsive to operation of selected entry control devices in succession for causing movement of successive articles from the incoming conveyor into the article receiving position of said entry conveyor in accordance therewith;

means operable concurrently with the last mentioned means for registering the storage conveyor destinations of such articles;

means for causing operation of said entry conveyor one said increment after each article is moved thereon;

means operable when an article on said entry conveyor has been moved sufficient increments to reach its destination storage conveyor according to said destination registrations for moving such article onto the corresponding storage conveyor during the stopping period of the entry conveyor;

and said means responsive to operation of selected entry control devices in succession for causing movement of successive articles from the incoming conveyor into the article receiving position of said entry conveyor comprising:

an article stop between said incoming conveyor and the article receiving position of said entry conveyor, said stop being normally effective to stop articles from entering the entry conveyor;

and means responsive to each operation of selected entry control devices for actuating said stop to admit an article to the entry conveyor.

4. In a conveyor system having a buffer storage area including a plurality of storage conveyors for storing articles that are in transit between an incoming conveyor and an outgoing conveyor; means for routing successive articles from the incoming conveyor to selected storage conveyors for storage pending withdrawal thereof comprising:

an intermittently operable entry conveyor extending past the entry ends of the storage conveyors and having an article receiving position accessible to articles from the incoming conveyor and being effective in response to each operation thereof to move one increment;

the entry ends of the storage conveyors being spaced from the article receiving position of said entry conveyor according to whole number multiples of said increment so that said entry conveyor between movements thereof stops articles in registration with the storage conveyors;

a plurality of selectively operable entry control devices for initiating storage of articles and being operable to establish the storage conveyor destinations of successive articles in accordance therewith;

and storage control means controllable by said entry control devices comprising;

means responsive to operation of selected entry control devices in succession for causing movement of successive articles from the incoming conveyor into the article receiving position of said entry conveyor in accordance therewith;

means operable concurrently with the last mentioned means for registering the storage conveyor destinations of such articles;

means for causing operation of said entry conveyor one said increment after each article is moved thereon;

means operable when any article on said entry conveyor has been moved sufficient increments to reach its destination storage conveyor according to said destination registrations for moving such article onto the corresponding storage conveyor during the stopping period of the entry conveyor;

counting means operable concurrently with each operation of said storage control means for maintaining a registration of the total number of articles on and enroute to each storage conveyor;

and means responsive to said counting means when it has registered a predetermined number of articles for a storage conveyor for preventing the initiation of movements of further articles to such storage conveyor until at least one article has been withdrawn from such storage conveyor.

5. In a conveyor system having a buffer storage area including a plurality of storage conveyors for storing articles that are in transit between an incoming conveyor and an outgoing conveyor; means for routing successive articles from the incoming conveyor to selected storage conveyors for storage pending withdrawal thereof comprising:

an intermittently operable entry conveyor extending past the entry ends of the storage conveyors and having an article receiving position accessible to articles from the incoming conveyor and being effective in response to each operation thereof to move one increment;

the entry ends of the storage conveyors being spaced from the article receiving position of said entry conveyor according to whole number multiples of said increment so that said entry conveyor between movements thereof stops articles in registration with the storage conveyors;

a plurality of selectively operable entry control devices for initiating storage of articles and being operable to establish the storage conveyor destinations of successive articles in accordance therewith;

and storage control means controllable by said entry control devices comprising:

means responsive to operation of selected entry control devices in succession for causing movement of successive articles from the incoming conveyor into the article receiving position of said entry conveyor in accordance therewith;

means operable concurrently with the last mentioned means for registering the storage conveyor destinations of such articles;

means for causing operation of said entry conveyor one said increment after each article is moved thereon;

means operable when any article on said entry conveyor has been moved sufficient increments to reach its destination storage conveyor according to said destination registrations for moving such article onto the corresponding storage conveyor during the stopping period of the entry conveyor;

the entry end of one storage conveyor being in registration with the article receiving position of the entry conveyor;

means responsive to a selected entry control operation indicative of said one storage conveyor for causing operation of said article moving means to move an article from said incoming conveyor to the article receiving position of said entry conveyor;

and means responsive to operation of the last mentioned means for preventing incremental movement of the entry conveyor and for moving the article onto the first storage conveyor.

6. In a conveyor system having a buffer storage area including a plurality of storage conveyors for storing articles that are in transit between an incoming conveyor and an outgoing conveyor; means for routing successive articles from the incoming conveyor to selected storage conveyors for storage pending withdrawal thereof comprising:

an intermittently operable entry conveyor extending past the entry ends of the storage conveyors and having an article receiving position accessible to articles from the incoming conveyor and being effective in response to each operation thereof to move one increment;

the entry ends of the storage conveyors being spaced from the article receiving position of said entry conveyor according to whole number multiples of said increment so that said entry conveyor between movements thereof stops articles in registration with the storage conveyors;

a plurality of selectively operable entry control devices for initiating storage of articles and being operable to establish the storage conveyor destinations of successive articles in accordance therewith;

and storage control means controllable by said entry control devices comprising:

means responsive to operation of selected entry control devices in succession for causing movement of successive articles from the incoming conveyor into the article receiving position of said entry conveyor in accordance therewith;

means operable concurrently with the last mentioned means for registering the storage conveyor destinations of such articles;

means for causing operation of said entry conveyor one said increment after each article is moved therefrom;

means operable when an article on said entry conveyor has been moved sufficient increments to reach its destination storage conveyor according to said destination registrations for moving such article onto the corresponding storage conveyor during the stopping period of the entry conveyor;

means responsive to the arrival of an unscheduled article at the entry end of the last storage conveyor for stopping the entry conveyor and for activating an indicator;

and a manually operable resetting switch for resetting said activating means to its normal non-indicating position thereby to permit reoperation of the entry conveyor.

7. In a conveyor system having a buffer storage area including a plurality of storage conveyors for storing articles that are in transit between an incoming conveyor and an outgoing conveyor; means for routing successive articles from the incoming conveyor to selected storage conveyors for storage pending withdrawal thereof comprising:

an intermittently operable entry conveyor extending past the entry ends of the storage conveyors and having an article receiving position accessible to articles from the incoming conveyor and being effective in response to each operation thereof to move one increment;

the entry ends of the storage conveyors being spaced from the article receiving position of said entry conveyor according to whole number multiples of said increment so that said entry conveyor between movements thereof stops articles in registration with the storage conveyors;

plurality of selectively operable entry control devices for initiating storage of articles and being operable to establish the storage conveyor destinations of successive articles in accordance therewith;

and storage control means controllable by said entry control devices comprising:

means responsive to operation of selected entry control devices in succession for causing movement of successive articles from the incoming conveyor into the article receiving position of said entry conveyor in accordance therewith;

means operable concurrently with the last mentioned means for registering the storage conveyor destinations of such articles;

means for causing operation of said entry conveyor one said increment after each article is moved thereon;

means operable when any article on said entry conveyor has been moved sufficient increments to reach its destination storage conveyor according to said destination registrations for moving such article onto the corresponding storage conveyor during the stopping period of the entry conveyor;

the entry end of one storage conveyor being in registration with the article receiving position of the entry conveyor;

a transfer-in conveyor between said article receiving position and said one storage conveyor;

an article stop normally preventing movement of articles from said article receiving position by said transfer-in conveyor;

means responsive to a selected entry control operation indicative of said one storage conveyor for causing operation of said article moving means to move an article from said incoming conveyor to the article receiving position of said entry conveyor and for conditioning said article stop for operation;

means responsive to arrival of said article on said entry conveyor for operating said article stop to permit movement of the article onto said one storage conveyor;

and means responsive to operation of said article stop for operating said transfer-in conveyor to move said article onto said one storage conveyor.

8. In a conveyor system having a buffer storage area including a plurality of storage conveyors for storing articles that are in transit between an incoming conveyor and an outgoing conveyor; means for routing successive articles from the incoming conveyor to selected storage conveyors for storage pending withdrawal thereof comprising:

an intermittently operable entry conveyor extending past the entry ends of the storage conveyors and having an article receiving position accessible to articles from the incoming conveyor and being effective in response to each operation thereof to move one increment;

the entry ends of the storage conveyors being spaced from the article receiving position of said entry conveyor according to whole number multiples of said increment so that said entry conveyor between movements thereof stops articles in registration with the storage conveyors;

a plurality of selectively operable entry control devices for initiating storage of articles and being operable to establish the storage conveyor destinations of successive articles in accordance therewith;

and storage control means controllable by said entry control devices comprising:

means responsive to operation of selected entry control devices in succession for causing movement of successive articles from the incoming conveyor into the article receiving position of said entry conveyor in accordance therewith;

means operable concurrently with the last mentioned means for registering the storage conveyor destinations of such articles;

means for causing operation of said entry conveyor one said increment after such article is moved thereon;

means operable when any article on said entry conveyor has been moved sufficient increments to reach its destination storage conveyor according to said destination registrations for moving such article onto the corresponding storage conveyor during the stopping period of the entry conveyor;

a manually operable cancel switch for canceling the storage of an article;

and means responsive to operation of said cancel switch following a selected entry control device operation and before an article has reached said entry conveyor for restoring said storage control means to normal position thereby to prevent movement of the selected article to the entry conveyor.

9. In a conveyor system comprising an incoming conveyor having access to a plurality of storage conveyors and an outgoing conveyor accessible from the storage conveyor:

first control means for controlling storage of articles from the incoming conveyor selectively onto the storage conveyors;

and second control means for controlling withdrawal of articles from selective ones of the storage conveyors onto the outgoing conveyor;

said first control means comprising a plurality of manual entry control devices indicative of the respective storage conveyors, and means responsive to operation of said manual entry control devices in a selected sequence for controlling storage of successive articles from the incoming conveyor onto the storage conveyors in a corresponding sequence;

said second control means comprising a plurality of manual exit control devices indicative of the respective storage conveyors, and means responsive to operation of said manual exit control devices in a given selected sequence for controlling withdrawal of articles from corresponding storage conveyors onto the outgoing conveyor in a sequence such that the articles are arranged in succession on the outgoing conveyor in said given selected sequence;

counting means for maintaining a registration of the total number of articles on each storage conveyor;

means responsive to said counting means when the latter has registered a predetermined number of articles for a given storage conveyor for preventing the initiation of movement of further articles to such storage conveyor;

and means responsive to said counting means when the latter has registered the absence of any articles on a storage conveyor for preventing the initiation of withdrawal of an article from such storage conveyor.

10. The invention defined in claim 9, together with a manual control device operable to effect cancellation of the storage of an article following initiation of storage thereof if such article has not been conveyed beyond a predetermined point toward the storage conveyors.

11. In a conveyor system comprising incoming conveyor means having access to an entry shuttle conveyor, a plurality of storage conveyors, said entry shuttle conveyor being arranged to travel past the entry ends of the storage conveyors to convey articles to the latter, and an exit shuttle conveyor arranged to travel past the exit ends of the storage conveyors to convey articles from the latter;

first control means for controlling storage of articles from the incoming conveyor means along said entry shuttle conveyor selectively onto the storage conveyors;

and second control means for controlling withdrawal of articles from selective ones of the storage conveyors onto the exit shuttle conveyor;

said first control means comprising a plurality of manually operable entry control switches indicative of the respective storage conveyors, means responsive to operation of said entry control switches in a selected order for controlling conveyance of articles from the incoming conveyor means onto said entry shuttle conveyor and for controlling movement of said entry shuttle conveyor a distance equal to the spacing of the storage conveyors therealong following the receipt of each article on the entry shuttle conveyor, and means responsive to the arrival of each article at the entry end of the storage conveyor to which it is assigned for controlling conveyance of such article to the assigned storage conveyor;

said second control means comprising a plurality of manually operable exit control switches indicative of the respective storage conveyors, means responsive to operation of said exit control switches in a selected order for controlling movement of said exit shuttle conveyor a distance equal to the spacing of the storage conveyors therealong once for each switch operation and for reserving sequential spaces on said exit shuttle conveyor for articles from the storage conveyors in the order of operation of said exit control switches, and means responsive to the arrival of each such reserved space at the exit end of the storage conveyor for which such space is reserved for controlling withdrawal of an article from the corresponding storage conveyor onto the exit shuttle conveyor;

a counter for each storage conveyor responsive to movement of the articles for adding the articles entering each storage conveyor and for subtracting the articles leaving each storage conveyor thereby to maintain a registration of the total number of articles on each storage conveyor;

means responsive to each counter when the associated storage conveyor is full for rendering the associated entry control switch ineffective;

and means responsive to each counter when the associated storage conveyor is empty for rendering the associated exit control switch ineffective.

12. In a conveyor system comprising an incoming conveyor for conveying articles therealong, an accumulator conveyor, an article stop on said accumulator conveyor for stopping the articles thereby to accumulate a predetermined number of articles thereon, a loader transfer conveyor for conveying articles from said accumulator conveyor, an entry shuttle conveyor for receiving articles from said loader transfer conveyor, a plurality of transfer-in conveyors spaced along said entry shuttle conveyor for transferring articles from said entry shuttle conveyor, a plurality of storage conveyors for receiving articles from the respective transfer-in conveyors for storage thereon, means for starting said incoming conveyor to convey articles to said accumulator conveyor, stop control means responsive to the first article entering said accumulator conveyor for raising said stop thereby to prevent movement of the articles therebeyond, a plurality of manually operable entry control switches indicative of the respective storage conveyors, control means responsive to operation of a selected one of said entry control switches for causing lowering of said stop to release one article from said accumulator conveyor, means responsive to lowering of said stop for causing operation of said loader transfer conveyor to convey said one article to said entry shuttle conveyor, means responsive to arrival of said one article on said entry shuttle conveyor for starting the latter to convey said one article to a position opposite the second transfer in conveyor, an entry memory device settable in response to operation of said selected entry control switch to register the storage conveyor destination of said one article, means for operating said entry memory device in step with said entry shuttle conveyor, and means operable when sufficient entry control switches have been operated so that said one article reaches the transfer-in conveyor corresponding to the destination of said one article for operating such transfer-in conveyor to convey said one article from said entry shuttle conveyor onto the associated storage conveyor, the last mentioned means being under the control of said entry memory device.

13. The invention defined in claim 12, together with a stop on each storage conveyor, and means responsive to an article entering each storage conveyor for causing the associated stop to be raised thereby to store articles on each storage conveyor.

14. The invention defined in claim 12, together with a counter for each storage conveyor, means responsive to each article entering each storage conveyor for operating the associated counter to register the total number of articles in the associated storage conveyor, and means responsive to each counter when the associated storage conveyor is full of articles for rendering the associated entry control switch ineffective.

15. The invention defined in claim 12, together with a manually operable selector switch having an automatic operating position and a manual operating position, and means responsive to operation of said selector switch to its automatic operating position for rendering said entry control switches effective.

16. The invention defined in claim 15, together with manual control circuit means, means responsive to operation of said selector switch to its manual operating position for rendering said entry control switches ineffective and for rendering said manual control circuit means effective, said manual control circuit means comprising a load start switch and an entry index switch and a plurality of start switches for the respective transfer-in conveyors, means responsive to manual operation of said load start switch for lowering said stop on said accumulator conveyor and for starting said loader transfer conveyor to convey an article to said entry shuttle conveyor, means responsive to manual operation of said entry index switch for causing movement of said entry shuttle conveyor one space, and means responsive to manual operation of one of said plurality of start switches when an article has reached the corresponding transfer-in conveyor for causing operation of the latter to convey such article to the associated storage conveyor.

References Cited in the file of this patent

UNITED STATES PATENTS

| | | |
|---|---|---|
| 927,168 | Robb | July 6, 1909 |
| 2,362,079 | McCann et al. | Nov. 7, 1944 |
| 2,627,941 | Skillman | Feb. 10, 1953 |
| 2,715,950 | Law | Aug. 23, 1955 |
| 2,717,086 | Bush | Sept. 6, 1955 |
| 2,728,466 | Postlewaite et al. | Dec. 27, 1955 |
| 2,851,146 | Sherill | Sept. 9, 1958 |
| 2,859,863 | Wallin | Nov. 11, 1958 |
| 2,880,891 | Carroll | Apr. 7, 1959 |

FOREIGN PATENTS

| | | |
|---|---|---|
| 528,189 | Great Britain | Oct. 24, 1940 |

UNITED STATES PATENT OFFICE
CERTIFICATE OF CORRECTION

Patent No. 3,118,549                                          January 21, 1964

Earl E. Hoellen

It is hereby certified that error appears in the above numbered patent requiring correction and that the said Letters Patent should read as corrected below.

Column 1, line 56, after "conveyor" insert -- control --; column 16, line 28, for "transisor conducing" read -- transistor conducting --; line 65, for "LLLR3" read -- LLR3 --; column 18, line 65, for "staton" read -- station --; column 19, line 53, for "therebetwen" read -- therebetween --; column 21, line 58, for "further" read -- fourth --; line 73, for "contact" read -- contactor --; column 32, line 33, for "10LLS7." read -- LLS7 --; column 36, lines 71 and 72, for "c to maintain relay UCR deenergized and closes contact b in the circuit of its tripping coil T, opens" read -- b in the circuit of its tripping coil T, opens its contact c to maintain relay UCR deenergized and closes --; column 38, line 48, for "TLS6" read -- 2LS6 --; column 45, line 24, for "therefrom" read -- thereon --.

Signed and sealed this 9th day of June 1964.

(SEAL)
Attest:

ERNEST W. SWIDER                                          EDWARD J. BRENNER
Attesting Officer                                          Commissioner of Patents